US012581553B2

(12) United States Patent
Chiba et al.

(10) Patent No.: US 12,581,553 B2
(45) Date of Patent: Mar. 17, 2026

(54) USER EQUIPMENT (UE)

(71) Applicant: SHARP KABUSHIKI KAISHA, Sakai City (JP)

(72) Inventors: Shuichiro Chiba, Sakai City (JP); Yasuo Sugawara, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 347 days.

(21) Appl. No.: 18/116,852

(22) Filed: Mar. 3, 2023

(65) Prior Publication Data

US 2024/0237093 A1 Jul. 11, 2024

(30) Foreign Application Priority Data

Jan. 6, 2023 (JP) ................................ 2023-000886

(51) Int. Cl.
*H04W 76/14* (2018.01)
*H04W 8/22* (2009.01)
*H04W 84/06* (2009.01)

(52) U.S. Cl.
CPC ............. *H04W 76/14* (2018.02); *H04W 8/22* (2013.01); *H04W 84/06* (2013.01)

(58) Field of Classification Search
CPC ....... H04W 76/14; H04W 8/22; H04W 84/06; H04W 4/40; H04W 76/11; H04W 4/30; H04W 76/10; H04W 76/30; H04W 8/24; H04W 92/18
See application file for complete search history.

(56) References Cited

U.S. PATENT DOCUMENTS

| | | | |
|---|---|---|---|
| 11,092,669 B1 * | 8/2021 | Wolford | G01S 7/295 |
| 2021/0314112 A1 * | 10/2021 | Balasubramanian | |
| | | | H04L 5/0076 |
| 2024/0420581 A1 * | 12/2024 | Xiang | H04W 48/18 |

FOREIGN PATENT DOCUMENTS

| | | | | |
|---|---|---|---|---|
| CN | 107438025 A | * | 12/2017 | H04L 69/26 |

OTHER PUBLICATIONS

3rd Generation Partnership Project; Technical Specification Group Services and System Aspects; "Study on enhanced Application Architecture for UAS applications; (Release 18)", 3GPP TR 23.700-55 V18.0.0 (Dec. 2022), pp. 1-34, 2022-12-23.
3GPP TS 23.256 V17.5.0 (Dec. 2022) 3rd Generation Partnership Project; Technical Specification Group Services and System Aspects; Support of Uncrewed Aerial Systems (UAS) connectivity, identification and tracking; Stage 2 (Release 17).
3GPP TS 23.501 V18.0.0 (Dec. 2022) 3rd Generation Partnership Project; Technical Specification Group Services and System Aspects; System architecture for the 5G System (5GS); Stage 2 (Release 18).

(Continued)

*Primary Examiner* — Michael A Keller
(74) *Attorney, Agent, or Firm* — ScienBiziP, P.C.

(57) ABSTRACT

A user equipment (UE) operates as an area airspace manager (AAM) to receive information, regarding Detect-And-Avoid (DAA) support of an uncrewed aerial vehicle (UAV), transmitted from the UAV or a network. A technique to perform appropriate processing of an establishment of a direct communication path for the DAA support with the UAV based on the reception of the information.

1 Claim, 15 Drawing Sheets

(56)              References Cited

OTHER PUBLICATIONS

3GPP TS 23.502 V18.0.0 (Dec. 2022) 3rd Generation Partnership Project; Technical Specification Group Services and System Aspects; Procedures for the 5G System (5GS); Stage 2 (Release 18).

3GPP TS 24.501 V18.0.1 (Sep. 2022) 3rd Generation Partnership Project; Technical Specification Group Core Network and Terminals; Non-Access-Stratum (NAS) protocol for 5G System (5GS); Stage 3; (Release 18).

3GPP TS 23.256 V17.4.0 (Sep. 2022) 3rd Generation Partnership Project; Technical Specification Group Services and System Aspects; Support of Uncrewed Aerial Systems (UAS) connectivity, identification and tracking; Stage 2 (Release 17).

3GPP TS 24.587 V17.7.0 (Sep. 2022) 3rd Generation Partnership Project; Technical Specification Group Core Network and Terminals; Vehicle-to-Everything (V2X) services in 5G System (5GS); Stage 3 (Release 17).

3GPP TR 23.700-58 V18.0.0 (Dec. 2022) 3rd Generation Partnership Project; Technical Specification Group Services and System Aspects; Study of further architecture enhancements for uncrewed aerial systems and urban air mobility (Release 18).

3GPP TS 23.304 V18.0.0 (Dec. 2022) 3rd Generation Partnership Project; Technical Specification Group Services and System Aspects; Proximity based Services (ProSe) in the 5G System (5GS) (Release 18).

3GPP TS 24.554 V17.2.1 (Sep. 2022) 3rd Generation Partnership Project; Technical Specification Group Core Network and Terminals; Proximity-services (ProSe) in 5G System (5GS) protocol aspects; Stage 3 (Release 17).

3GPP TS 23.247 V18.0.0 (Dec. 2022) 3rd Generation Partnership Project; Technical Specification Group Services and System Aspects; Architectural enhancements for 5G multicast-broadcast services; Stage 2 (Release 18).

* cited by examiner

USER EQUIPMENT (UE)

TECHNICAL FIELD

The present disclosure relates to user equipment (UE).

BACKGROUND ART

In the 3rd Generation Partnership Project (3GPP), the system architecture of a 5G System (5GS) that is a fifth generation (5G) mobile communication system has been under study, and support for new procedures and new functions has been discussed (see NPL 1 to NPL 9). In Release 17 of the 5G standard, a mobile communication system for drones is discussed (see NPL 6).

CITATION LIST

Non Patent Literature

NPL 1: 3GPP TS 23.501 V18.0.0 (2022-12); 3rd Generation Partnership Project; Technical Specification Group Services and System Aspects; System Architecture for the 5G System (5GS); Stage 2 (Release 18)

NPL 2: 3GPP TS 23.502 V18.0.0 (2022-12); 3rd Generation Partnership Project; Technical Specification Group Services and System Aspects; Procedures for the 5G System (5GS); Stage 2 (Release 18)

NPL 3: 3GPP TS 24.501 V18.0.1 (2022-09); 3rd Generation Partnership Project; Technical Specification Group Core Network and Terminals; Non-Access-Stratum (NAS) protocol for 5G System (5GS); Stage 3 (Release 18)

NPL 4: 3GPP TS 23.256 V17.5.0 (2022-12); 3rd Generation Partnership Project; Technical Specification Group Services and System Aspects; Support of Uncrewed Aerial Systems (UAS) Connectivity, Identification and Tracking; Stage 2 (Release 17)

NPL 5: 3GPP TS 24.587 V17.7.0 (2022-09); 3rd Generation Partnership Project; Technical Specification Group Core Network and Terminals; Vehicle-to-Everything (V2X) Services in 5G System (5GS); Stage 3 (Release 17)

NPL 6: 3GPP TR 23.700-58 V18.0.0 (2022-12); 3rd Generation Partnership Project; Technical Specification Group Services and System Aspects; Study of Further Architecture Enhancements for Uncrewed Aerial Systems and Urban Air Mobility (Release 18)

NPL 7: 3GPP TS 23.304 V18.0.0 (2022-12); 3rd Generation Partnership Project; Technical Specification Group Services and System Aspects; Proximity based Services (ProSe) in the 5G System (5GS) (Release 18)

NPL 8: 3GPP TS 24.554 V17.2.1 (2022-09); 3rd Generation Partnership Project; Technical Specification Group Core Network and Terminals; Proximity-Services (ProSe) in 5G System (5GS) Protocol Aspects; Stage 3 (Release 17)

NPL 9: 3GPP TS 23.247 V18.0.0 (2022-12); 3rd Generation Partnership Project; Technical Specification Group Services and System Aspects; Architectural Enhancements for 5G Multicast-Broadcast Services; Stage 2 (Release 18)

SUMMARY

Technical Problem

For the 5G system (5GS), a 5G core network (5GCN) that is a new core network has been studied in order to provide a wide variety of services. Furthermore, as a communication means for operating an uncrewed aerial vehicle or unmanned aerial vehicle (UAV), a communication unit using the 5GS has been studied.

As a means for performing communication between a UAV, a UAV controller, a relevant device, and a server (USS/UTM), direct communication for C2 or other types of communication through PC5 (also referred to as direct C2 communication, etc.), and new functions such as the function of broadcasting a UAV ID, the function of Detect-And-Avoid (DAA) of collisions utilizing direct communication, and the like as well as communication using a 5GCN have been studied. Furthermore, for the DAA function, user equipment (UE) that establishes a communication path for direct communication (also referred to as a direct communication path) with an UAV and operates as an area airspace manager (AAM) installed on the ground (also simply referred to as an AAM) to transmit and/or receive information required for the DAA function has also been studied.

On the other hand, a procedure in direct communication between a UAV and UE operating as an AAM and communication between each terminal and the network when the UAV does not support the new DAA function, information transmitted and/or received in the communication procedure, and actions and processing of each terminal are unclear.

An aspect of the present disclosure has been made in view of the above-described circumstances, and an object of the present disclosure is to provide a technique for UE operating as an AAM to receive information about UAV DAA support transmitted from a UAV or a network, and a technique for performing appropriate processing with respect to establishment of a direct communication path for DAA with the UAV based on reception of the information.

Solution to Problem

A user equipment (UE) according to an aspect of the present disclosure is UE including a transmission and/or reception unit and a controller in which the transmission and/or reception unit receives a message including first identification information from a network and/or an uncrewed aerial vehicle (UAV), the first identification information is capability information indicating that the UAV does not support Detect-And-Avoid (DAA), and the controller does not initiate a procedure for establishing a communication path for direct communication with the UAV based on reception of the first identification information. A user equipment (UE) according to an aspect of the present disclosure is UE including a transmission and/or reception unit and a controller in which the transmission and/or reception unit receives a message including second identification information from a network and/or an uncrewed aerial vehicle (UAV), the second identification information is capability information indicating that the UAV supports Detect-And-Avoid (DAA), and the controller initiates a procedure for establishing a communication path for direct communication with the UAV based on reception of the second identification information. A user equipment (UE) according to an aspect of the present disclosure is UE including a transmission and/or reception unit and a controller in which the transmission and/or reception unit receives a message including third identification information from a network and/or an uncrewed aerial vehicle (UAV), the third identification information is an ID of the UAV used in direct communication with the UAV, and the controller recognizes that the UE supports Detect-And-Avoid (DAA) based on the reception of the third identification information, and initiates a procedure for establishing a communication path for direct communication between the UE and the UAV by transmitting the message including the third identification information to the UAV.

Advantageous Effects

According to an aspect of the present disclosure, UE operating as an AAM can determine whether to establish a communication path for DAA with a UAV based on information indicating whether there is support for the DAA function by the UAV, and clarify a behavior based on the determination and information transmitted and/or received in the procedure.

DESCRIPTION OF EMBODIMENTS

The best mode for implementing an aspect of the present disclosure will be described below with reference to the drawings. Further as an example, an embodiment of a mobile communication system to which an aspect of the present disclosure is applied will be described in the present embodiment.

1. OVERVIEW OF SYSTEM

Figure 1:
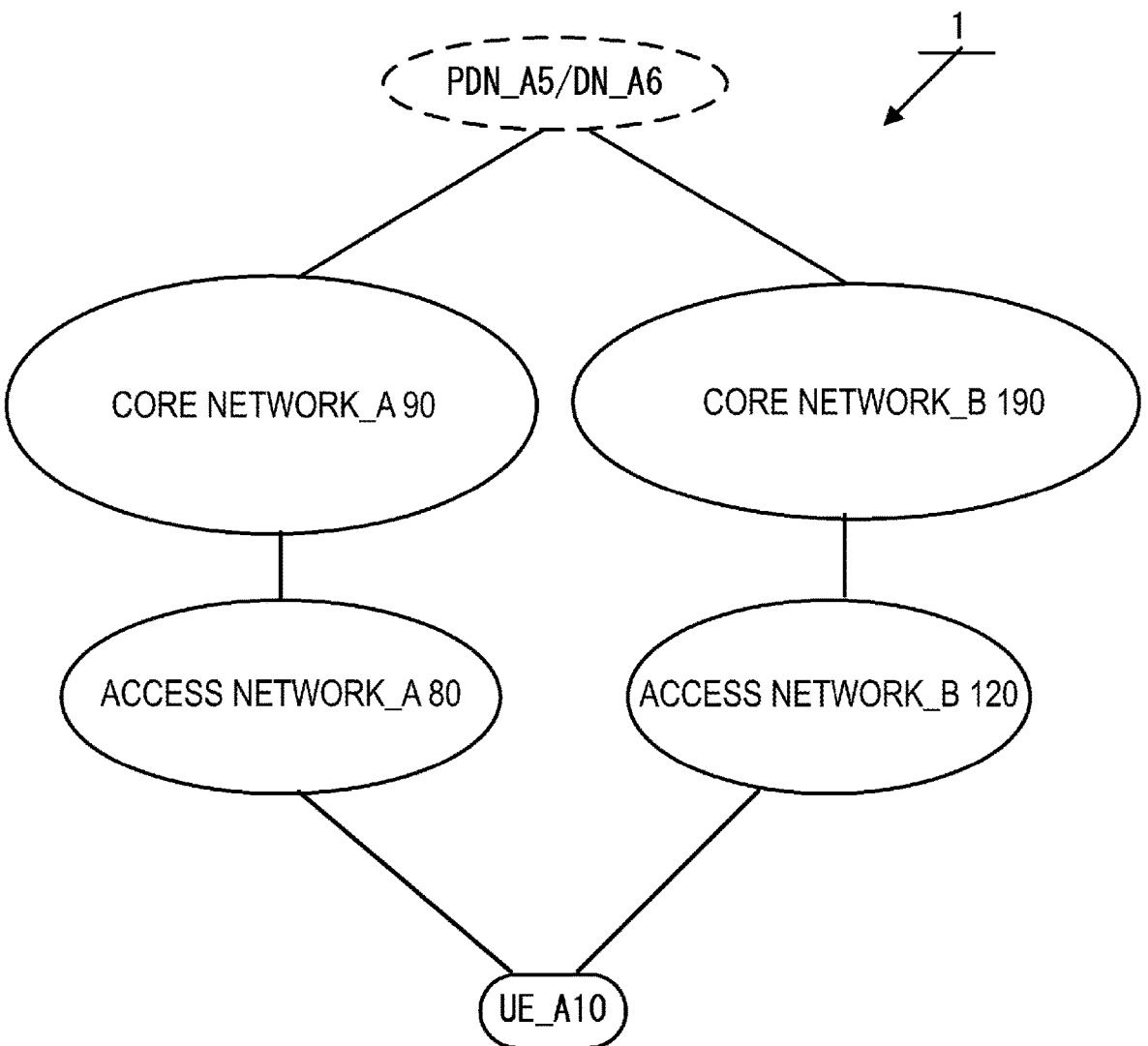
FIG. 1 is a diagram for describing an overview of a mobile communication system (EPS/5GS).
Figure 2:
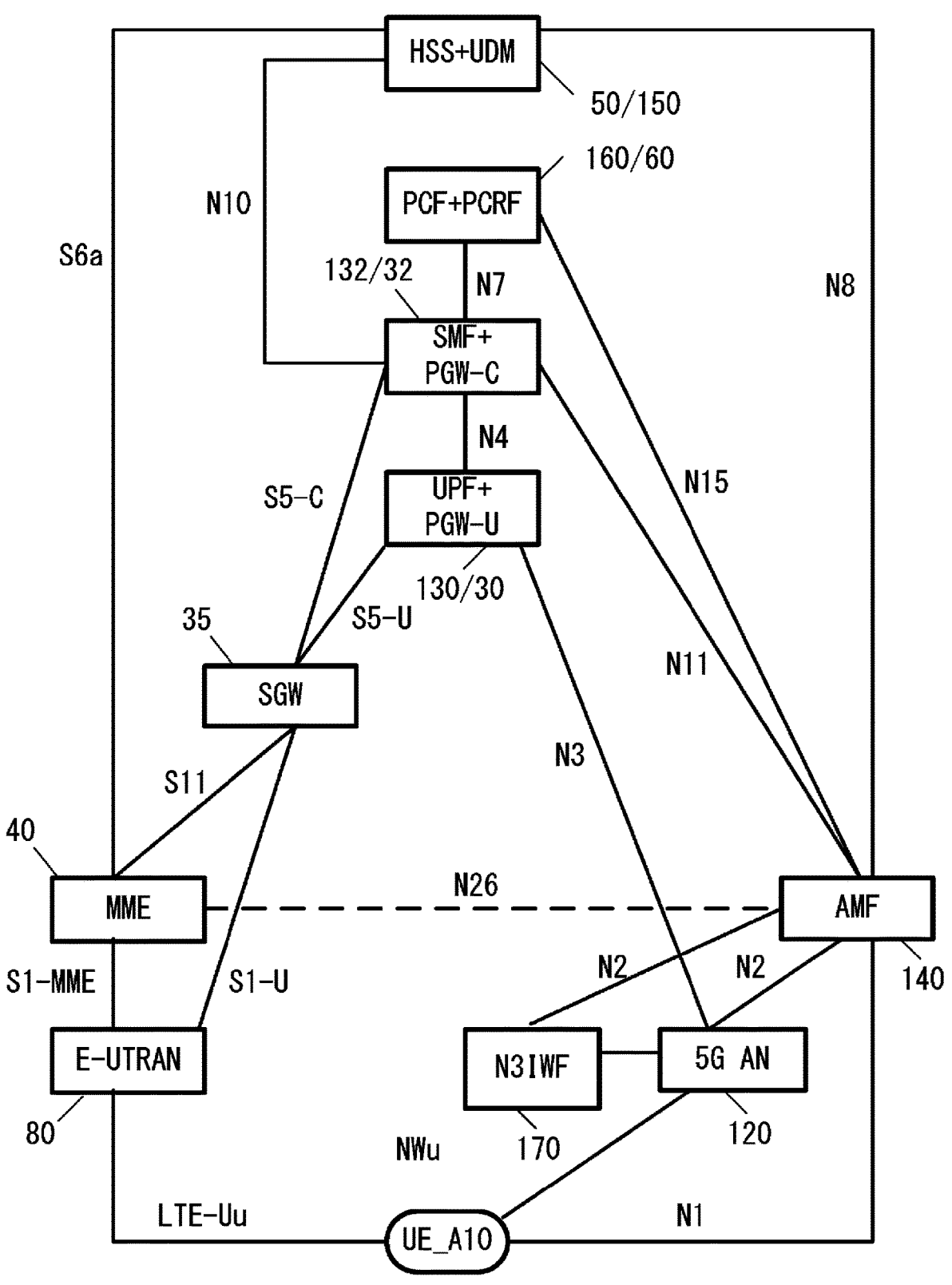
FIG. 2 is a diagram for describing a detailed configuration of the mobile communication system (EPS/5GS).

First, FIG. 1 is a diagram for describing an overview of a mobile communication system 1 used in each embodiment, and FIG. 2 is a diagram for describing a detailed configuration of the mobile communication system 1.

In FIG. 1, the mobile communication system 1 is described as including UE_A 10, an access network_A 80, a core network_A 90, a packet data network (PDN)_A 5, an access network_B 120, a core network_B 190, and a data network (DN)_A 6.

In the following description, the reference numerals may be omitted from these apparatuses and functions, as in UE, an access network_A, a core network_A, a PDN, an access network_B, a core network_B, and a DN.

In addition, FIG. 2 illustrates apparatuses and functions such as UE_A 10, an E-UTRAN 80, an MME 40, an SGW 35, a PGW-U 30, a PGW-C 32, a PCRF 60, an HSS 50, a 5G AN 120, an AMF 140, a UPF 130, an SMF 132, a PCF 160, a UDM 150, and an N3IWF 170, and interfaces for connecting these apparatuses and functions to each other.

In the following description, the reference numerals may be omitted from these apparatuses and functions, as in UE, an E-UTRAN, an MME, an SGW, a PGW-U, a PGW-C, a PCRF, an HSS, a 5G AN, an AMF, a UPF, an SMF, a PCF, a UDM, and an N3IWF.

Further, although an Evolved Packet System (EPS) that is a 4G system includes the access network_A and the core network_A, it may further include the UE and/or the PDN. In addition, although the 5G System (5GS) that is a 5G system includes the UE, the access network_B, and the core network_B, it may further include the DN.

The UE is an apparatus that can be connected to a network service over 3GPP access (also referred to as a 3GPP access network or a 3GPP AN) and/or non-3GPP access (also referred to as a non-3GPP access network or a non-3GPP AN). The UE may be a terminal apparatus capable of performing radio communication, such as a mobile phone or a smartphone, and may be a terminal apparatus that can be connected to both the EPS and the 5GS. The UE may include a Universal Integrated Circuit Card (UICC) and an Embedded UICC (eUICC). Further, the UE may be expressed as a user apparatus or a terminal apparatus.

In addition, the access network_A corresponds to an Evolved Universal Terrestrial Radio Access Network (E-UTRAN) and/or a radio LAN access network. In the E-UTRAN, one or more evolved Node Bs (eNBs) 45 are deployed. Further, in the following description, the reference numeral of the eNB 45 may be omitted, as in an eNB. In addition, in a case that there are multiple eNBs, the eNBs are connected to each other via, for example, an X2 interface. In addition, one or more access points are deployed on the radio LAN access network.

In addition, the access network_B corresponds to a 5G access network (5G AN). The 5G AN includes an NG Radio Access Network (NG-RAN) and/or a non-3GPP access network. One or more NR Node Bs (gNBs) 122 are deployed on the NG-RAN. Further, in the following description, the reference numeral of the gNB 122 may be omitted, as in a gNB. The gNB is a node that provides a New Radio (NR) user plane and control plane to the UE and is connected to a 5GCN via an NG interface (including an N2 interface or an N3 interface). In other words, the gNB is a base station apparatus newly designed for the 5GS and has functions different from those of the base station apparatus (eNB) used in the EPS that is a 4G system. In addition, in a case that there are multiple gNBs, the gNBs are connected to each other via, for example, an Xn interface.

In addition, a non-3GPP access network may be a non-3GPP (untrusted non-3GPP) access network that cannot be trusted or a non-3GPP (trusted non-3GPP) access network that can be trusted. Here, the untrusted non-3GPP access network may be a non-3GPP access network that is an access network in which security management is not performed, such as a public wireless LAN, for example. On the other hand, the trusted non-3GPP access network may be an access network defined by the 3GPP and may include a trusted non-3GPP access point (TNAP) and a trusted non-3GPP gateway function (TNGF).

In addition, in the following description, the E-UTRAN and the NG-RAN may be referred to as 3GPP access. Furthermore, the radio LAN access network and the non-3GPP AN may be referred to as non-3GPP access. In addition, the nodes deployed on the access network_B may also be collectively referred to as NG-RAN nodes.

Furthermore, in the following description, the access network_A, and/or the access network_B, and/or an apparatus included in the access network_A, and/or an apparatus included in the access network_B may be referred to as an access network or an access network apparatus.

In addition, the core network_A corresponds to an Evolved Packet Core (EPC). In the EPC, for example, a Mobility Management Entity (MME), a Serving Gateway (SGW), a Packet Data Network Gateway (PGW)-U, a PGW-C, a Policy and Charging Rules Function (PCRF), a Home Subscriber Server (HSS), and the like are deployed.

In addition, the core network_B corresponds to a 5G core network (5GCN). In the 5GCN, for example, an Access and Mobility Management Function (AMF), a User Plane Function (UPF), a Session Management Function (SMF), a Policy Control Function (PCF), a Unified Data Management (UDM), and the like are deployed. Here, the 5GCN may be expressed as a 5GC.

In addition, in the following description, the core network_A, and/or the core network_B, an apparatus included in the core network_A, and/or an apparatus included in the core network_B may be referred to as a core network, a core network apparatus, or an apparatus in a core network.

The core network (the core network_A and/or the core network_B) may refer to an IP mobile communication network operated by a mobile communication operator (Mobile Network Operator (MNO)) connecting the access network (the access network_A and/or the access network_B) and the PDN and/or the DN, a core network for a mobile communication operator that operates and manages the mobile communication system 1, or a core network for a virtual mobile communication operator or a virtual mobile communication service provider such as a Mobile Virtual Network Operator (MVNO) or a Mobile Virtual Network Enabler (MVNE).

Furthermore, although FIG. 1 illustrates a case where the PDN and the DN are the same, the PDN and the DN may be different. The PDN may be a data network (DN) that provides communication services to the UE. Further, the DN may be configured as a packet data service network or may be configured for each service. In addition, the PDN may include a connected communication terminal. Thus, "connecting to the PDN" may mean "connecting to a communication terminal and a server apparatus deployed in the PDN". In addition, "transmitting and/or receiving user data to and/or from the PDN" may mean "transmitting and/or receiving user data to and/or from a communication terminal and a server apparatus deployed in the PDN". Further, the PDN may be expressed as a DN, and the DN may be expressed as a PDN.

In addition, in the following, at least some of the access network_A, the core network_A, the PDN, the access network_B, the core network_B, and the DN, and/or one or more apparatuses included in these may be referred to as a network or a network apparatus. In other words, the expression "the network and/or the network apparatus transmits and/or receives a message and/or performs a procedure"

means "at least some of the access network_A, the core network_A, the PDN, the access network_B, the core network_B, and the DN, and/or one or more apparatuses included in these transmit and/or receive a message and/or perform a procedure".

In addition, the UE can be connected to the access networks. In addition, the UE can be connected to the core networks over the access networks. Furthermore, the UE can be connected to the PDN or the DN over the access networks and the core networks. In other words, the UE can transmit and/or receive (communicate) user data to and/or from (with) the PDN or the DN. When user data is transmitted and/or received, not only Internet Protocol (IP) communication but also non-IP communication may be used.

Here, IP communication refers to data communication using an IP, and data is transmitted and/or received using IP packets. An IP packet include the IP header and the payload part. In the payload part, data transmitted and/or received by the apparatuses and functions included in the EPS and the apparatuses and functions included in the 5GS may be included. In addition, non-IP communication refers to data communication not using an IP, in which data is transmitted and/or received in a form different from the structure of the IP packet. For example, non-IP communication may be data communication implemented through transmission and/or reception of application data to which an IP header is not given, or user data with another header such as a MAC header or an Ethernet (trade name) frame header given to be transmitted and/or received by the UE may be transmitted and/or received.

In addition, apparatuses which are not illustrated in FIG. 2 may be configured in the access network_A, the core network_A, the access network_B, the core network_B, the PDN_A, and the DN_A. For example, the core network_A and/or the core network_B may include an Authentication Server Function (AUSF) and an Authentication, Authorization, And Accounting (AAA) server (AAA-S).

Here, the AUSF is of a core network apparatus provided with an authentication function for 3GPP access and non-3GPP access. Specifically, the AUSF is a network function unit that receives an authentication request for 3GPP access and/or non-3GPP access from the UE and performs an authentication procedure.

In addition, the AAA server is an apparatus that is connected directly to the AUSF or indirectly to the AUSF via another network apparatus and has authentication, authorization, and billing functions. The AAA server may be a network apparatus within a core network. Further, the AAA server may not be included in the core network_A and/or the core network_B and may be included in a PLMN. In other words, the AAA server may be a core network apparatus, or may be an apparatus outside the core network. For example, the AAA server may be a server apparatus within the PLMN managed by a third party.

Further, although the number of the apparatuses and functions illustrated in FIG. 2 is one for simplified illustration, multiple similar apparatuses and functions may be configured in the mobile communication system 1. Specifically, multiple apparatuses and functions such as the UE_A 10, the E-UTRAN 80, the MME 40, the SGW 35, the PGW-U 30, the PGW-C 32, the PCRF 60, the HSS 50, the 5G AN 120, the AMF 140, the UPF 130, the SMF 132, the PCF 160, and/or the UDM 150 may be configured in the mobile communication system 1.

A UPF_A 235 is connected to the DN, the SMF, other UPFs and the access networks. The UPF_A 235 may play roles of an anchor to intra-RAT mobility or inter-RAT mobility, packet routing & forwarding, an Uplink Classifier (UL CL) function to support routing of multiple traffic flows for one DN, a branching point function to support a multi-homed PDU session, QoS processing for a user plane, verification of uplink traffic, buffering of downlink packets, a function of triggering downlink data notification, and the like. Furthermore, the UPF_A 235 may be a relay apparatus that transfers user data as a gateway between the DN and the core network_B 190. Further, the UPF_A 235 may serve as a gateway for IP communication and/or non-IP communication. Furthermore, the UPF_A 235 may have a function of transferring IP communication or a function to perform conversion between non-IP communication and IP communication. Furthermore, multiple gateways deployed may serve as gateways for connecting the core network_B 190 to a single DN. Further, the UPF_A 235 may have connectivity with another NF or may be connected to each apparatus via another NF.

Further, a UPF_C 239 (also referred to as a branching point or an uplink classifier) which is a UPF different from the UPF_A 235 may be present between the UPF_A 235 and the access network as an apparatus or an NF. In the case that the UPF_C 239 is present, the PDU session between the UE and the DN is established via the access network, the UPF_C 239, and the UPF_A 235

In addition, the UPF 130 may be an apparatus similar to the UPF_A 235. Further, the UPF 130 and UPF_A 235 may be described with the reference numerals omitted, as in a UPF.

2. CONFIGURATION OF EACH APPARATUS

Next, a configuration of each apparatus (the UE, and/or the access network apparatus, and/or the core network apparatus) used in each embodiment will be described with reference to the drawings. Further, each apparatus may be configured as physical hardware, may be configured as logical (virtual) hardware configured in general-purpose hardware, or may be configured as software. In addition, at least a part (including all) of the functions of each apparatus may be configured as physical hardware, logical hardware, or software.

Further, each storage unit (a storage unit_A 340, a storage unit_A 440, a storage unit_B 540, a storage unit_A 640, and a storage unit_B 740) in each apparatus and function to be described below includes, for example, a semiconductor memory, a solid state drive (SSD), a hard disk drive (HDD), or the like. In addition, each storage unit can store not only information originally configured at the time of shipping, but also various types of information transmitted and/or received to and/or from apparatuses and functions (for example, the UE, and/or the access network apparatus, and/or the core network apparatus, and/or the PDN, and/or the DN) other than the apparatus and functions of the storage unit. In addition, each storage unit can store identification information, control information, flags, parameters, and the like included in a control message transmitted and/or received in various communication procedures to be described below. In addition, each storage unit may store these types of information for each piece of UE. In addition, in a case that each storage unit performs interworking between the 5GS and the EPS, the storage unit can store a control message and user data transmitted and/or received to and/or from the apparatuses and functions included in the 5GS and/or the EPS. In this case, not only information transmitted and/or received over an N26 interface but also information transmitted and/or received without the N26 interface can be stored.

2.1. Apparatus Configuration of UE

Figure 3:
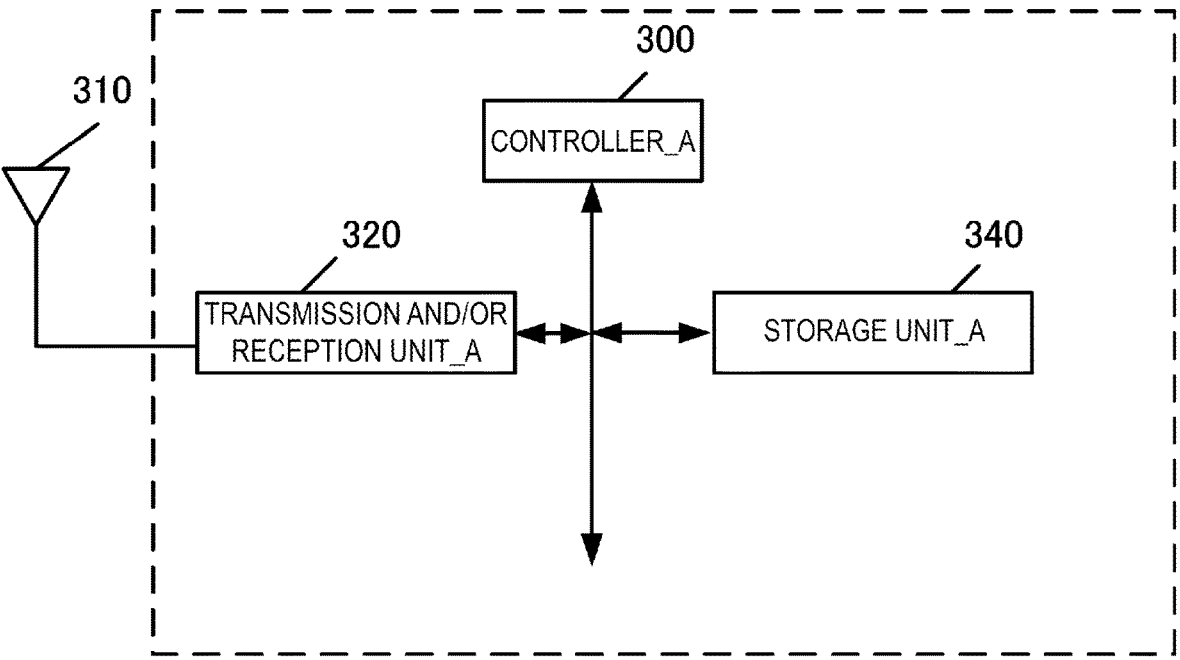
FIG. 3 is a diagram for describing an apparatus configuration of UE.

First, an apparatus configuration example of the user equipment (UE) will be described with reference to FIG. 3. The UE includes a controller_A 300, an antenna 310, a transmission and/or reception unit_A 320, and a storage unit_A 340. The controller_A 300, the transmission and/or reception unit_A 320, and the storage unit_A 340 are connected via a bus. The transmission and/or reception unit_A 320 is connected to the antenna 310.

The controller_A 300 is a function unit that controls overall operations and functions of the UE. The controller_A 300 reads and performs various programs stored in the storage unit_A 340 as necessary, and thereby implements various types of processing in the UE.

The transmission and/or reception unit_A 320 is a function unit for performing radio communication with a base station apparatus (the eNB or the gNB) in the access network via the antenna. In other words, using the transmission and/or reception unit_A 320, the UE can transmit and/or receive user data and/or control information to and/or from the access network apparatus, and/or the core network apparatus, and/or the PDN, and/or the DN.

To provide detailed description with reference to FIG. 2. using the transmission and/or reception unit_A 320, the UE can communicate with the base station apparatus (eNB) in the E-UTRAN over an LTE-Uu interface. In addition, the UE can communicate with the base station apparatus (gNB) in the 5G AN by using the transmission and/or reception unit_A 320. In addition, the UE can transmit and/or receive a Non-Access-Stratum (NAS) message to and/or from the AMF via an N1 interface by using the transmission and/or reception unit_A 320. However, the N1 interface is a logical interface, and thus communication between the UE and the AMF is actually performed via the 5G AN.

The storage unit_A 340 is a function unit for storing programs, user data, control information, and the like necessary for each operation of the UE.

2.2. Apparatus Configuration of gNB

Figure 4:
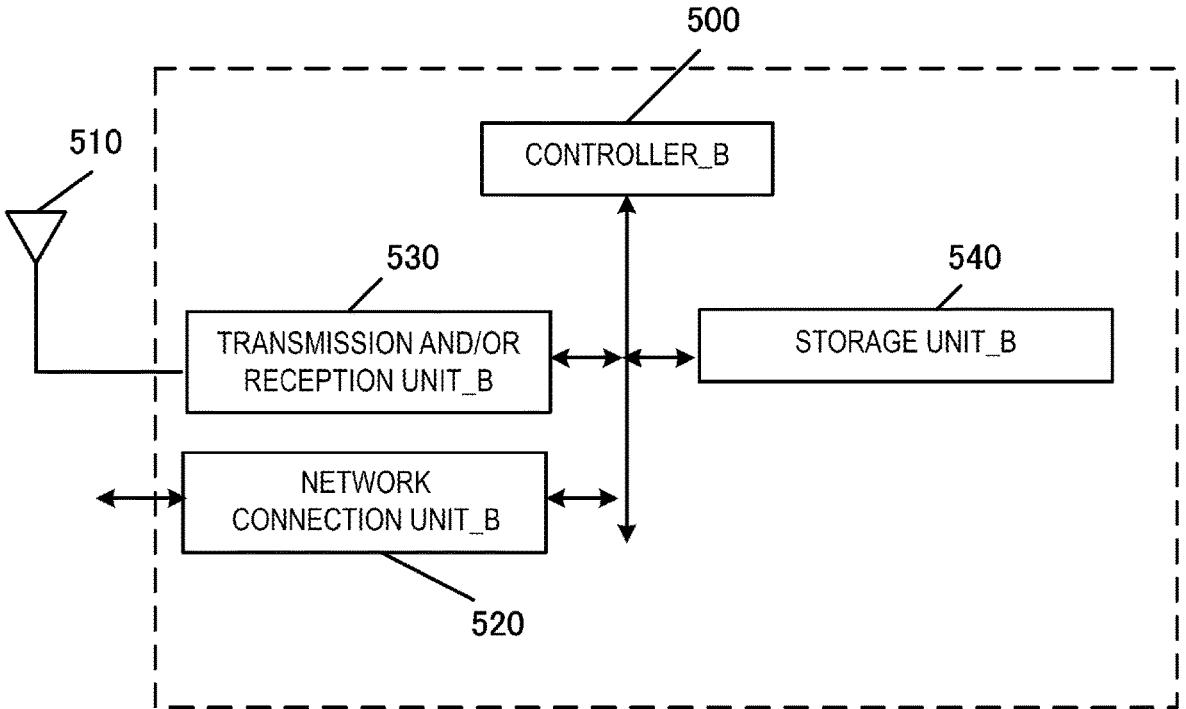
FIG. 4 is a diagram for describing a configuration of an access network apparatus (gNB) in a 5GS.

Next, an apparatus configuration example of the gNB will be described with reference to FIG. 4. The gNB includes a controller_B 500, an antenna 510, a network connection unit_B 520, a transmission and/or reception unit_B 530, and a storage unit_B 540. The controller_B 500, the network connection unit_B 520, the transmission and/or reception unit_B 530, and the storage unit_B 540 are connected via a bus. The transmission and/or reception unit_B 530 is connected to the antenna 510.

The controller_B 500 is a function unit that controls overall operations and functions of the gNB. The controller_B 500 reads and performs various programs stored in the storage unit_B 540 as necessary, and thereby implements various types of processing in the gNB.

The network connection unit_B 520 is a function unit for the gNB to communicate with the AMF and/or the UPF. In other words, using the network connection unit_B 520, the gNB can transmit and/or receive user data and/or control information to and/or from the AMF and/or the UPF.

The transmission and/or reception unit_B 530 is a function unit for performing radio communication with the UE via the antenna 510. In other words, using the transmission and/or reception unit_B 530, the gNB can transmit and/or receive user data and/or control information to and/or from the UE.

To provide detailed description with reference to FIG. 2. By using the network connection unit_B 520, the gNB in the 5G AN can communicate with the AMF via the N2 interface and can communicate with the UPF via the N3 interface. In addition, the gNB can communicate with the UE by using the transmission and/or reception unit_B 530.

The storage unit_B 540 is a function unit for storing programs, user data, control information, and the like necessary for each operation of the gNB.

2.3. Apparatus Configuration of AMF

Figure 5:
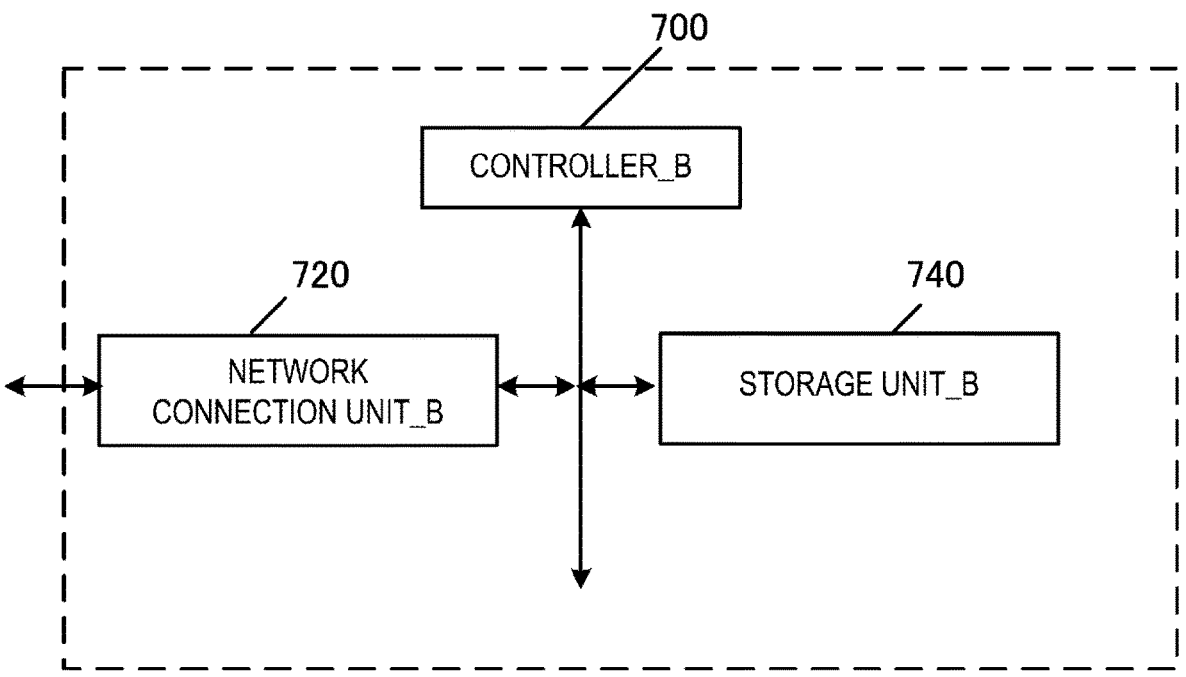
FIG. 5 is a diagram for describing a configuration of a core network apparatus (AMF/SMF/UPF) in the 5GS.

Next, an apparatus configuration example of the AMF will be described with reference to FIG. 5. The AMF includes a controller_B 700, a network connection unit_B 720, and a storage unit_B 740. The controller_B 700, the network connection unit_B 720, and the storage unit_B 740 are connected via a bus. The AMF may be a node that handles the control plane.

The controller_B 700 is a function unit that controls overall operations and functions of the AMF. The controller_B 700 reads and performs various programs stored in the storage unit_B 740 as necessary, and thereby implements various types of processing in the AMF.

The network connection unit_B 720 is a function unit for the AMF to connect to the base station apparatus (gNB), and/or the SMF, and/or the PCF, and/or UDM, and/or SCEF in the 5G AN. In other words, using the network connection unit_B 720, the AMF can transmit and/or receive user data and/or control information to and/or from the base station apparatus (gNB), and/or the SMF, and/or the PCF, and/or the UDM, and/or the SCEF in the 5G AN.

To provide detailed description with reference to FIG. 2, by using the network connection unit_A 620, the AMF in the 5GCN can communicate with the gNB via the N2 interface, can communicate with the UDM via an N8 interface, can communicate with the SMF via an N11 interface, and can communicate with the PCF via an N15 interface. In addition, the AMF can transmit and/or receive a NAS message to and/or from the UE via the N1 interface by using the network connection unit_A 620. However, the N1 interface is a logical interface, and thus communication between the UE and the AMF is actually performed via the 5G AN. In addition, in a case that the AMF supports an N26 interface, the AMF can communicate with the MME via an N26 interface by using the network connection unit_A 620.

The storage unit_B 740 is a function unit for storing programs, user data, control information, and the like necessary for each operation of the AMF.

Further, the AMF has a function of exchanging a control message with a RAN using the N2 interface, a function of exchanging a NAS message with the UE using the N1 interface, a function of performing encryption and integrity protection of a NAS message, a registration management (RM) function, a connection management (CM) function, a reachability management function, a mobility management function for the UE or the like, a function of transferring a session management (SM) message between the UE and the SMF, an access authentication (Access Authentication or Access Authorization) function, a security anchor function (Security Anchor Functionality (SEA)), a Security Context Management (SCM) function, a function of supporting the N2 interface for a Non-3GPP Interworking Function (N3IWF), a function of supporting transmission and/or reception of a NAS signal to and/or from the UE via the N3IWF, a function of authenticating the UE to be connected via the N3IWF, and the like.

In addition, in registration management, an RM state for each UE is managed. The RM state may be synchronized between the UE and the AMF. The RM state includes a de-registered state (RM-DEREGISTERED state) and a registered state (RM-REGISTERED state). In the RM-DEREGISTERED state, the UE is not registered in the network, and thus the AMF is in a state in which it is unable to reach the UE, because UE context for the AMF does not have valid position information or routing information about the UE. In addition, in the RM-REGISTERED state, the UE is registered in the network, and thus the UE can receive a service required to be registered in the network. Further, the RM state may be expressed as a 5GMM state. In this case, the RM-DEREGISTERED state may be expressed as a 5GMM-DEREGISTERED state, and the RM-REGISTERED state may be expressed as a 5GMM-REGISTERED state.

In other words, 5GMM-REGISTERED may be a state in which each apparatus has established 5GMM context, or may be a state in which each apparatus has established a PDU session context. Further, in a case that each apparatus is 5GMM-REGISTERED, the UE_A 10 may start transmission and/or reception of user data or a control message, or may respond to paging. In addition, in a case that each apparatus is 5GMM-REGISTERED, the UE_A 10 may perform a registration procedure other than a registration procedure for initial registration, and/or a service request procedure.

Furthermore, 5GMM-DEREGISTERED may be a state in which each apparatus has not established 5GMM context, may be a state in which the position information of the UE_A 10 is not known to the network, or may be a state in which the network is unable to reach the UE_A 10. Further, in a case that each apparatus is 5GMM-DEREGISTERED, the UE_A 10 may initiate the registration procedure, or may perform the registration procedure to establish 5GMM context.

In addition, in connection management, a CM state for each UE is managed. The CM state may be synchronized between the UE and the AMF. The CM state includes a non-connected state (CM-IDLE state) and a connected state (CM-CONNECTED state). In the CM-IDLE state, although the UE is in the RM-REGISTERED state, it does not have a NAS signalling connection established between the AMF via the N1 interface. In addition, in the CM-IDLE state, the UE does not have a connection to the N2 interface (N2 connection) and a connection to the N3 interface (N3 connection). In contrast, in the CM-CONNECTED state, the UE has a NAS signalling connection established in between the AMF via the N1 interface. In addition, in the CM-CONNECTED state, the UE may have a connection to the N2 interface (N2 connection) and/or a connection to the N3 interface (N3 connection).

Furthermore, in connection management, management may be performed separately for the CM state in 3GPP access and the CM state in non-3GPP access. In this case, the CM state in 3GPP access may include a non-connected state in 3GPP access (CM-IDLE state over 3GPP access) and a connected state in 3GPP access (CM-CONNECTED state over 3GPP access). Furthermore, the CM state in non-3GPP access may include a non-connected state in non-3GPP access (CM-IDLE state over non-3GPP access) and a connected state in non-3GPP access (CM-CONNECTED state over non-3GPP access). Further, the non-connected state may be expressed as an idle mode, and the connected state may be expressed as a connected mode Further, the CM state may be expressed as a 5GMM mode. In this case, the non-connected state may be expressed as a 5GMM non-connected mode (5GMM-IDLE mode), and the connected state may be expressed as a 5GMM connected mode (5GMM-CONNECTED mode). In addition, the non-connected state in 3GPP access may be expressed as a 5GMM non-connected mode in 3GPP access (5GMM-IDLE mode over 3GPP access), and the connected state in 3GPP access may be expressed as a 5GMM connected mode in 3GPP access (5GMM-CONNECTED mode over 3GPP access). Furthermore, the non-connected state in non-3GPP access may be expressed as a 5GMM non-connected mode in non-3GPP access (5GMM-IDLE mode over non-3GPP access), and the connected state in non-3GPP access may be expressed as a 5GMM connected mode in non-3GPP access (5GMM-CONNECTED mode over non-3GPP access). Further, the 5GMM non-connected mode may be expressed as an idle mode, and the 5GMM connected mode may be expressed as a connected mode.

In addition, one or more AMFs may be deployed in the core network_B. In addition, the AMF may be a Network Function (NF) that manages one or more network slice instances (NSIs). In addition, the AMF may be a common CP function (Common Control Plane Network Function (CPNF) (CCNF)) shared among multiple NSIs.

Further, in a case that the UE connects to the 5GS via non-3GPP access, the N3IWF is an apparatus and/or a function deployed between non-3GPP access and the 5GCN.

2.4. Apparatus Configuration of SMF

Next, an apparatus configuration example of the SMF will be described with reference to FIG. 5. The SMF includes a controller_B 700, a network connection unit_B 720, and a storage unit_B 740. The controller_B 700, the network connection unit_B 720, and the storage unit_B 740 are connected via a bus. The SMF may be a node that handles the control plane.

The controller_B 700 is a function unit that controls overall operations and functions of the SMF. The controller_B 700 reads and performs various programs stored in the storage unit_B 740 as necessary, and thereby implements various types of processing in the SMF.

The network connection unit_B 720 is a function unit for the SMF to connect to the AMF, and/or the UPF, and/or the PCF, and/or the UDM. In other words, using the network connection unit_B 720, the SMF can transmit and/or receive user data and/or control information to and/or from the AMF, and/or the UPF, and/or the PCF, and/or the UDM.

To provide a detailed description with reference to FIG. 2. By using the network connection unit_A 620, the SMF in the 5GCN can communicate with the AMF via the N11 interface, can communicate with the UPF via an N4 interface, can communicate with the PCF via an N7 interface, and can communicate with the UDM via an N10 interface.

The storage unit_B 740 is a function unit for storing programs, user data, control information, and the like necessary for each operation of the SMF.

The SMF has a session management function such as establishment, modification, and release of a PDU session, a function of IP address allocation to the UE and management thereof, a function of selection and control of the UPF, a function of configuring the UPF for routing traffic to an appropriate destination (transmission destination), a function of transmitting and/or receiving the SM part of a NAS message, a function of issuing a notification about arrival of downlink data (Downlink Data Notification), a function of providing SM information specific to an AN (for each AN) that is transmitted to the AN through the AMF via the N2 interface, a function of determining a Session and Service Continuity mode (SSC mode) for a session, a roaming function, and the like.

2.5. Apparatus Configuration of UPF

Next, an apparatus configuration example of the UPF will be described with reference to FIG. 5. The UPF includes a controller_B 700, a network connection unit_B 720, and a storage unit_B 740. The controller_B 700, the network connection unit_B 720, and the storage unit_B 740 are connected via a bus. The UPF may be a node that handles the control plane.

The controller_B 700 is a function unit that controls overall operations and functions of the UPF. The controller_B 700 reads and performs various programs stored in the storage unit_B 740 as necessary, and thereby implements various types of processing in the UPF.

The network connection unit_B 720 is a function unit for the UPF to connect to the base station apparatus (gNB), and/or the SMF, and/or the DN in the 5G AN. In other words, using the network connection unit_B 720, the UPF can transmit and/or receive user data and/or control information to and/or from the base station apparatus (gNB), and/or the SMF, and/or the DN in the 5G AN.

To provide a detailed description with reference to FIG. 2. using the network connection unit_A 620, the UPF in the 5GCN can communicate with the gNB via the N3 interface, can communicate with the SMF via the N4 interface, can communicate with the DN via an N6 interface, and can communicate with another UPF via an N9 interface.

The storage unit_B 740 is a function unit for storing programs, user data, control information, and the like necessary for each operation of the UPF.

The UPF has a function as an anchor point for intra-RAT mobility or inter-RAT mobility, a function as an external PDU session point to be mutually connected to the DN (that is, a function of transferring user data as a gateway between the DN and the core network_B), a function of routing and transferring packets, an Uplink Classifier (UL CL) function of supporting routing of multiple traffic flows for one DN, a branching point function of supporting a multi-homed PDU session, a quality of service (QOS) processing function for the user plane, a function of verifying uplink traffic, a function of triggering buffering of downlink packets and Downlink Data Notification, and the like.

In addition, the UPF may be a gateway for IP communication and/or non-IP communication. In addition, the UPF may have a function of transferring IP communication, or a function of conversion between non-IP communication and IP communication. Furthermore, multiple deployed gateways may be gateways for connecting to the core network_B and a single DN. Further, the UPF may have connectivity to another NF, and may connect to each apparatus via another NF.

Further, the user plane refers to user data that is transmitted and/or received between the UE and the network. The user plane may be transmitted and/or received by using a PDN connection or a PDU session. Furthermore, in a case of the EPS, the user plane may be transmitted and/or received by using an LTE-Uu interface, and/or an S1-U interface, and/or an S5 interface, and/or an S8 interface, and/or an SGi interface. Furthermore, in a case of the 5GS, the user plane may be transmitted and/or received via the interface between the UE and the NG RAN, and/or the N3 interface, and/or the N9 interface, and/or the N6 interface. The user plane may be hereinafter expressed as a U-Plane.

Furthermore, the control plane refers to a control message that is transmitted and/or received in order to perform communication control of the UE or the like. The control plane may be transmitted and/or received by using a non-access-stratum (NAS) signalling connection between the UE and the MME. Furthermore, in a case of the EPS, the control plane may be transmitted and/or received by using the LTE-Uu interface and an S1-MME interface. Furthermore, in a case of the 5GS, the control plane may be transmitted and/or received by using the interface between the UE and the NG RAN and the N2 interface. The control plane may be hereinafter expressed as a control plane, or as a C-Plane.

Furthermore, the user plane (U-Plane or UP) may be a communication path for transmitting and/or receiving user data, and may include multiple bearers. Furthermore, the control plane (C-Plane or CP) may be a communication path for transmitting and/or receiving a control message, and may include multiple bearers.

2.6. Description of Other Apparatuses and/or Functions

Next, other apparatuses and/or functions will be described.

The PCF has a function of providing a policy rule, and the like.

In addition, the UDM has an authentication information processing (authentication credential processing) function, a user identification processing function, an access authentication function, a registration/mobility management function, a subscriber information management (subscription management) function, and the like.

In addition, the PCRF is connected to the PGW and/or the PDN, and has a function of performing QoS management for data delivery and the like. For example, the PCRF performs management of the QoS of a communication path between the UE_A 10 and the PDN. Furthermore, the PCRF may be an apparatus that creates and/or manages a Policy and Charging Control (PCC) rule and/or a routing rule used by each apparatus when transmitting and/or receiving user data.

In addition, the HSS is connected to the MME and/or the SCEF, and has a function of performing management of subscriber information and the like. The subscriber information of the HSS is referred to in a case that, for example, access of the MME is controlled. Furthermore, the HSS may be connected to a position management apparatus different from the MME.

3. DESCRIPTION OF TERMS, IDENTIFICATION INFORMATION, AND PROCEDURE USED IN EACH EMBODIMENT

Next, terms, identification information, and procedures used in each embodiment will be described in advance.

3.1. Description of Terms Used in Each Embodiment

Next, highly technical terms and identification information used in procedures that are used in each embodiment will be described.

A network refers to at least some of the access network_B, the core network_B, and the DN. In addition, one or more apparatuses included in at least some of the access network_B, the core network_B, and the DN may be referred to as a network or a network apparatus. In other words, "a network transmits and/or receives a message and/or performs processing" may mean "an apparatus on a network (a network apparatus and/or a control apparatus) transmits and/or receives a message and/or performs processing". Conversely, "an apparatus on a network transmits and/or receives a message and/or performs processing" may mean "a network transmits and/or receives a message and/or performs processing".

A session management (SM) message (also referred to as a Non-Access-Stratum (NAS) SM message) may be a NAS message used in a procedure for SM, or may be a control message transmitted and/or received between the UE_A 10 and an SMF_A 230 via an AMF_A 240. Furthermore, the SM message may include a PDU session establishment request message, a PDU session establishment accept message, a PDU session establishment reject message, a PDU session modification request message, a PDU session modification command message, a PDU session modification complete message, a PDU session modification command reject message, a PDU session modification reject message, a PDU session release request message, a PDU session release reject message, a PDU session release command message, a PDU session release complete message, and the like. In addition, the procedure for SM or the SM procedure may include a PDU session establishment procedure, a PDU session modification procedure, and a PDU session release procedure (UE-requested PDU session release procedure). Further, each procedure may be a procedure initiated from the UE, or may be a procedure initiated from an NW.

A Mobility management (MM) message (also referred to as a NAS MM message) may be a NAS message used in a procedure for MM, or may be a control message transmitted and/or received between the UE_A 10 and the AMF_A 240. Furthermore, the MM message may include a registration request message, a registration accept message, a registration reject message, a de-registration request message, a de-registration accept message, a configuration update command message, a configuration update complete message, a service request message, a service accept message, a service reject message, a notification message, a notification response message, and the like. In addition, the procedure for MM or the MM procedure may include a registration procedure, a de-registration procedure, a generic UE configuration update procedure, an authentication and/or authorization procedure, a service request procedure, a paging procedure, and a notification procedure.

A 5G System (5GS) service may be a connection service provided by using the core network_B 190. Furthermore, the 5GS service may be a service different from an EPS service, or may be a service similar to the EPS service.

A non-5GS service may be a service other than the 5GS service, and may include an EPS service and/or a non-EPS service.

A Packet Data Network (PDN) type indicates a type of PDN connection, and includes IPv4, IPv6, IPv4v6, and non-IP. In a case that IPv4 is specified, it indicates that transmission and/or reception of data is performed by using IPv4. In a case that IPv6 is specified, it indicates that transmission and/or reception of data is performed by using IPV6. In a case that IPv4v6 is specified, it indicates that transmission and/or reception of data is performed by using IPv4 or IPv6. In a case that non-IP is specified, it indicates that communication is performed by using a communication method without an IP, rather than performing communication by using an IP.

Although a Protocol Data Unit/Packet Data Unit (PDU) session can be defined as a relationship between the DN that provides a PDU connectivity service and the UE, the PDU session may be connectivity established between the UE and an external gateway. In the 5GS, the UE establishes a PDU session via the access network_B and the core network_B, and can thereby perform transmission and/or reception of user data to and/or from the DN by using the PDU session. Here, the external gateway may be a UPF, an SCEF, or the like. The UE can perform transmission and/or reception of user data to and/or from an apparatus such as an application server deployed in the DN by using a PDU session. Further, each apparatus (the UE, and/or an access network apparatus, and/or a core network apparatus) may associate one or more pieces of identification information with a PDU session for management. Further, these pieces of identification information may include one or more of a DNN, a QoS rule, a PDU session type, application identification information, NSI identification information, access network identification information, and an SSC mode, and may further include other information. Furthermore, in a case that multiple PDU sessions are established, pieces of identification information associated with the PDU sessions may have the same or different contents.

A Data Network Name (DNN) may be identification information for identifying a core network and/or an external network such as a DN. Furthermore, a DNN can also be used as information for selecting a gateway such as a PGW or UPF connecting the core network_B 190. Furthermore, a DNN may correspond to an Access Point Name (APN).

A Protocol Data Unit/Packet Data Unit (PDU) session type indicates a type of PDU session and includes IPv4, IPV6, Ethernet, and Unstructured. In a case that IPv4 is specified, it indicates that transmission and/or reception of data is performed by using IPv4. In a case that IPv6 is specified, it indicates that transmission and/or reception of data is performed by using IPV6. In a case that Ethernet is specified, it indicates that transmission and/or reception of an Ethernet frame is performed. In addition, Ethernet may indicate communication performed without using the IP. In a case that Unstructured is specified, it indicates that data is transmitted and/or received to and/or from an application server in the DN or the like by using a point-to-point (P2P) tunneling technique. For the P2P tunneling technique, for example, a UDP/IP encapsulation technique may be used. Further, a PDU session type may include the IP, in addition to the above. The IP can be specified in a case that the UE can use both IPV4 and IPv6.

A public land mobile network (PLMN) is a communication network that provides mobile radio communication services. The PLMN is a network managed by an operator who is a communication service provider, and the operator can be identified by a PLMN ID. A PLMN that matches a Mobile Country Code (MCC) and a Mobile Network Code (MNC) of an International Mobile Subscriber Identity (IMSI) of the UE may be a Home PLMN (HPLMN). Furthermore, the UE may hold, in its USIM, an Equivalent HPLMN list for identifying one or multiple Equivalent HPLMNs (EPLMNs). A PLMN different from an HPLMN and/or an EPLMN may be a Visited PLMN (VPLMN). A PLMN in which the UE has successfully registered may be a Registered PLMN (RPLMN).

A tracking area is a single or multiple ranges that can be expressed by position information of the UE_A 10 managed by the core network. Further, a tracking area may include multiple cells. Furthermore, a tracking area may be a range in which a control message such as paging is broadcast, or may be a range in which the UE_A 10 can move without performing a handover procedure. Furthermore, the tracking area may be a routing area or a location area as long as the area is similar to these. A tracking area may be referred to as a TA below. A tracking area may be identified by a Tracking Area Identity (TAI) including a Tracking Area Code (TAC) and a PLMN.

A registration area is a set of one or multiple TAs allocated to the UE by the AMF. Further, while moving within one or multiple TAs included in the registration area, the UE_A 10 may be able to move without transmitting and/or receiving a signal for updating the tracking area. In other words, the registration area may be an information group indicating an area in which the UE_A 10 can move without performing a tracking area update procedure. The registration area may be identified by a TAI list composed of one or multiple TAIs.

A UE ID is information for identifying the UE. For example, the UE ID may be a Subscription Concealed Identifier (SUCI), or a Subscription Permanent Identifier (SUPI), or a Globally Unique Temporary Identifier (GUTI), or an International Mobile Subscriber Identity (IMEI), or an IMEI Software Version (IMEISV), or a Temporary Mobile Subscriber Identity (TMSI), for example. Alternatively, the UE ID may be other information configured by an application or within a network. Moreover, the UE ID may be information for identifying the user.

An always-on PDU session is a PDU session in which a user plane resource needs to be activated whenever the UE transitions from the 5GMM-IDLE state to the 5GMM-CONNECTED state. The UE can request a core network and/or a core network apparatus to establish a PDU session as an always-on PDU session based on an indication from an upper layer. The core network and/or the core network apparatus determines whether a PDU session can be established as an always-on PDU session. Here, the establishment of the always-on PDU session may mean establishment of a PDU session for C2 communication. Furthermore, the establishment of the always-on PDU session may mean establishment of a PDU session in which a QoS flow for C2 communication is handled. Here, the 5GMM-IDLE state may be a CM-IDLE state. Furthermore, the 5GMM-CONNECTED state may be a CM-CONNECTED state. Furthermore, the SMF may be a core network apparatus that determines whether a PDU session can be established as an always-on PDU session.

A service-level-AA container information element (IE) is an information element for transferring information for authentication and authorization between the UE and a network to an upper layer. In addition, a service-level-AA container information element may include a service-level device ID, and/or a service-level-AA server address, and/or a service-level-AA payload, and/or a service-level-AA response. Furthermore, the service-level-AA container information element may include a C2 authorization result, and/or C2 session security information, and/or identification information of UAV-C to pair, and/or flight authorization information. Furthermore, the service-level-AA container information element may include a service-level-AA pending indication. Further, the service-level-AA container information element may be referred to as a service-level-AA container.

A service-level device ID is an information element for carrying an identity required for authentication and authorization by an external DN. In addition, the service-level device ID may be included in the service-level-AA container information element. In addition, the service-level device ID may include a CAA-level UAV ID.

A service-level-AA server address is an information element for carrying an address of a service-level authentication and authorization server. In addition, the service-level-AA server address may be included in the service-level-AA container information element. In addition, the service-level-AA server address may include an uncrewed aerial system service supplier (USS) address.

A service-level-AA payload is an information element for carrying a payload for authentication and authorization between the UE and a service-level-AA server to an upper layer. In addition, the service-level-AA payload may be included in the service-level-AA container information element. In addition, the service-level-AA payload may include a UUAA aviation payload.

A service-level-AA response is an information element for providing information of a service-level authentication and authorization request. Specifically, the service-level-AA response is an information element indicating that authentication and authorization requests to a service-level authentication server is successful or not successful. In addition, the service-level-AA response may be included in the service-level-AA container information element.

An uncrewed aerial vehicle (UAV) is a flying drone. In addition, a UAV may be UE. In addition, a UAV may be a 3GPP UE that supports UE functions.

In addition, a UAV may also be managed by a USS. The UAV may be associated with a UAV controller. Furthermore, the UAV may be associated with a UAV controller and managed by a core network apparatus and/or Uncrewed Aerial System Traffic Management (UTM). Furthermore, in a case that the UAV is managed in association with the UAV controller, the UAV may be managed by the core network apparatus and/or UTM as an Uncrewed Aerial System (UAS). The UAV may have its own information (identification information, IP address, position information, etc.) managed by the core network apparatus and/or the UTM. In addition, the UE may be read as a UAV.

In addition, a UAV capable of using a UAS service may be a UAV capable of using C2 communication and/or direct C2 communication. In addition, a UAV capable of using C2 communication and/or direct C2 communication may be a UAV capable of using a UAS service.

An uncrewed aerial vehicle controller (UAV controller) is a controller for operating a UAV. In addition, the UAV controller may be UE. In addition, the UAV controller may be 3GPP UE that supports UE functions.

The UAV controller may be associated with a UAV. Furthermore, the UAV controller may be associated with a UAV and managed by a core network apparatus and/or UTM. Furthermore, in a case that the UAV controller is managed in association with a UAV, the UAV controller may be managed by the core network apparatus and/or UTM as a UAS. The UAV controller may have the core network apparatus and/or UTM to manage its own information (identification information, IP address, position information, etc.). Further, the UAV controller may be expressed as a UAC, a UAV-C, or a UAVC. In addition, in the present specification, the UE may be read as a UAV, UAV-C, or UAA.

In addition, a UAV-C capable of using a UAS service may be a UAV-C capable of using C2 communication and/or direct C2 communication. In addition, the UAV-C capable of using C2 communication and/or direct C2 communication may be a UAV-C capable of using a UAS service.

An uncrewed aerial system (UAS) may be constituted by a UAV and associated functions. Here, the associated functions may include a command and control (C2) link. Furthermore, the C2 link may be a link between the UAV and a control station, or a link between the UAV and a network. Furthermore, the C2 link may be a link for remote identification. In addition, the UAS may be constituted by one or more UAVs and one or more UAV controllers. In addition, the UAS may also be managed by a network apparatus and/or a USS.

The uncrewed aerial system service supplier (USS) is an apparatus having a function for managing the UAV and/or the UAV controller and/or the UAS. The USS may be an apparatus of the DN or an apparatus in the core network. In addition, the USS may also be an apparatus for autonomously piloting the UAV. In addition, the USS may have a function of managing identification information, an IP address, position information, and the like of the UAV and/or the UAV controller, or may have a function of managing information of a UAV and/or a UAV controller other than the above ones. Furthermore, the USS may manage the UAV and the UAV controller as a UAS in association with each other. In addition, the USS may transmit information for requesting a network service to a core network apparatus. Furthermore, the USS may be an apparatus that provides one or more functions or services for managing a range of motor vehicle operation. In addition, the USS may be a UAS application server.

In addition, the USS may be an apparatus having a function of UTM. In addition, the USS may be an apparatus included in the UTM. In addition, the USS may also be an apparatus in the UTM. Further, the USS may be expressed as USS/UTM or UTM/USS. In addition, the USS may be expressed as a network.

In addition, the USS may transmit information to the core network and/or the UE through an Uncrewed Aerial Systems Network Function (UAS-NF). In addition, information transmitted from the USS may be regarded as information transmitted from the UAS-NF. In addition, information received from the USS may be regarded as information received from the UAS-NF.

The Uncrewed Aerial System Traffic Management (UTM) may be an apparatus including the USS. The UTM may be an apparatus having the USS. In addition, the UTM may be read as a USS.

Command and Control (C2) communication may be a user plane link for delivering messages from the UAV controller or UTM to the UAV, the messages including commands and control information for operating the UAV.

In addition, Command and Control (C2) communication may be communication for delivering messages from the UAV controller or UTM to the UAV, the messages including commands and control information for operating the UAV. In addition, C2 communication may be a user plane link between the UAV controller and the UAV. In addition, C2 communication may be a link between the USS and the UAV. In addition, C2 communication may be communication between the UAV controller and the UAV. In addition, C2 communication may be communication between the USS and the UAV.

Furthermore, C2 communication may be a user plane link for reporting telemetric data from the UAV to the UAV controller or UTM. Furthermore, C2 communication may be a user plane link for delivering messages from the UAV controller via the UTM to the UAV, the messages including commands and control information for operating the UAV. Here, the C2 communication may be a link realized by a PDU session. Furthermore, the PDU session for C2 communication may be realized by an always-on PDU session. Furthermore, establishment of a PDU session for C2 communication may mean establishment of an always-on PDU session. Furthermore, establishment of a PDU session in which a QoS flow for C2 communication is handled may mean establishment of an always-on PDU session. In addition, a link may be a communication path or a transmission path. C2 communication may be referred to as C2. Further, a communication path established for C2 communication may be referred to as C2 connectivity.

In addition, C2 communication may be read as a communication path for C2 communication. In addition, a communication path for C2 communication may be read as C2 communication.

Direct C2 communication may be a link between the UAV and the UAV-C. In addition, direct C2 communication may be communication between the UAV and the UAV-C.

In addition, direct C2 communication may be a direct link between the UAV and the UAV-C. In addition, direct C2 communication may be a direct C2 link between the UAV and the UAV-C. In addition, direct C2 communication may be a communication path on the PC5. Direct C2 communication may be C2 communication.

Here, the UAV and/or UAV-C may be registered with a network. In addition, a link may be a communication path or a transmission path.

In addition, direct C2 communication may be read as a communication path for direct C2 communication. In addition, a communication path for direct C2 communication may be read as direct C2 communication or a direct communication for C2 communication. In addition, direct C2 communication may be read as a PC5 unicast link. In addition, a direct link may be read as a PC5 unicast link. A PC5 unicast link may be simply referred to as a unicast link.

A C2 authorization result may be a result of authorization for C2 communication. To be specific, it may be information indicating failure or success in authorization for C2 communication.

A result of authorization for C2 communication may also include a result of authorization for direct C2 communication. In this case, a C2 authorization result may be information indicating success in authorization for C2 communication using a PDU session, success in authorization for direct C2 communication, or success in authorization for both types of communication, or failure in authorization. Alternatively, the C2 authorization result may indicate success or failure in authorization for C2 communication, and a network may notify the UE of success or failure in authorization for C2 communication and direct C2 communication using the PDU session, and the UE may recognize the notification.

Alternatively, a service-level-AA container information element may include a direct C2 authorization result that is the authorization result of direct C2 communication, independently of the C2 authorization result. In this case, the direct C2 authorization result may be information indicating success or failure in authorization for the direct C2 communication.

In addition, a C2 authorization result may be read as a direct C2 authorization result.

A direct C2 authorization result may be a result of authorization for direct C2 communication. To be specific, it may be information indicating failure or success in authorization for direct C2 communication.

The result of authorization for direct C2 communication may also include a result of authorization for C2 communication. In this case, the direct C2 authorization result may be information indicating success in authorization for C2 communication using a PDU session, success in authorization for direct C2 communication, or success in authorization for both types of communication, or failure in authorization. Alternatively, the direct C2 authorization result may indicate success or failure in authorization for the direct C2 communication, and the UE may be notified of the success or failure in authorization for the direct C2 communication, and the UE may recognize the notification.

Authorization for C2 communication (authorization for C2) is an authorization and/or procedure that is required to be performed when the UAV and/or UAV-C establishes a user plane connection for a C2 operation. Here, the user plane connection for the C2 operation may be C2 communication. In other words, in order for the UAV and/or the UAV-C to establish C2 communication, authorization for C2 communication needs to be performed.

In authorization for the C2 communication, the UAV and/or the UAV-C may be authorized to establish a PDN connection and/or a PDU session for the C2 in the USS and/or to establish direct C2 communication. Furthermore, for authorization for C2 communication, authorization for pairing between the UAV and the UAV-C and/or flight authorization may be performed. The authorization for pairing between the UAV and the UAV-C and/or flight authorization may be performed by the USS.

The authorization for C2 communication may be performed during a UUAA procedure or may be performed in other procedures. To be specific, in a case that the UAV desires to separate C2 communication with the USS from C2 communication with the UAV-C, authorization for the C2 communication may be performed in the procedure for the UAV to establish a new PDU session and/or PDN connection.

The case where the UAV desires to separate C2 communication with the USS from C2 communication with the UAV-C may be, for example, a case that the UAV requests establishment of direct C2 communication.

In a case that the UAV and/or the UAV-C request establishment of direct C2 communication, authorization for C2 communication for direct C2 communication may be performed during the registration procedure and/or during the UUAA-MM procedure.

In addition, authorization for C2 communication may be referred to as authorization for direct C2 communication.

Authorization for pairing between the UAV and the UAV-C may be that the UAV is authorized to be paired with the UAV-C and/or that the UAV-C is authorized to be paired with the UAV, and may need to be performed before information is exchanged between the UAV and the UAV-C through C2 communication.

Flight authorization is authorization for the UAV to fly (flight). Flight authorization may also need to be performed before the UAV flies. Alternatively, flight authorization may be performed within the authorization procedure for C2 communication only in a case that the flight authorization is requested by the UAV. In other words, by authorizing C2 communication, pairing between the UAV and the UAV-C and/or a flight of the UAV may be authorized.

A CAA-level UAV ID is information allocated to the UAV by a function of an aviation domain such as a USS. In addition, the CAA-level UAV ID may be used for remote identification and tracking, or may be used to identify the UAV. In addition, the CAA-level UAV ID may be information provided by the UAV to the 3GPP system during the UUAA procedure.

In addition, the aviation domain may allocate a new CAA-level UAV ID for the UAV at any timing. In addition, the new CAA-level UAV ID may be provided to the UAV and 3GPP system during a UAS-related procedure.

The CAA-level UAV ID may be referred to as identification information of the UAV or may be referred to as information for identifying the UAV.

A 3GPP UAV ID is information associated with the UAV by the 3GPP system. In addition, the 3GPP UAV ID may be information used by the 3GPP system to identify the UAV. In addition, the USS may store association between the CAA-level UAV ID and the 3GPP UAV ID.

The 3GPP UAV ID may be referred to as identification information of the UAV or may be referred to as information for identifying the UAV.

A remote ID (RID) is identification information (ID) for identifying a UAV. A remote ID may be, for example, a CAA-level UAV ID. Furthermore, a remote ID may be an ID broadcast over a Uu interface and/or the PC5 interface.

In addition, a function of broadcasting a remote ID in consideration of legal regulations of each country on UAVs may include a function of a UAV to broadcast a remote ID via a PC5 interface and a function thereof to broadcast a remote ID via a Uu interface. Here, the function of a UAV to broadcast a remote ID via a PC5 interface is also referred to as a broadcast remote identification (BRID). In addition, the function of a UAV to broadcast a remote ID via a Uu interface is also referred to as network remote ID (NRID). Further, broadcasting of a remote ID via Uu interface may be performed based on a multicast/broadcast service (MBS) function of the 5GS and a procedure for the MBS function.

As UE that attempts to establish a communication path for direct communication, there may be initiating UE and target UE.

Initiating UE may be UE used in direct communication between two pieces of UE. In addition, initiating UE may transmit a message to target UE. In addition, initiating UE may receive a message transmitted from target UE. In addition, initiating UE may be used in a procedure for establishing direct C2 communication. In addition, initiating UE may be a UAV, a UAV-C, or an AAM.

Target UE may be UE used in direct communication between two pieces of UE. In addition, target UE may transmit a message to initiating UE. In addition, target UE may receive a message transmitted from initiating UE. In addition, target UE may be used in a procedure for establishing direct C2 communication. In addition, target UE may be a UAV, a UAV-C, or an AAM.

Further, the initiating UE and the target UE may establish a direct communication path in a procedure initiated by the initiating UE, and the established communication path may be a direct communication path through PC5. Furthermore, the direct communication path via PC5 established between the initiating UE and the target UE may be a communication path for direct C2 communication or may be a communication path for communication other than direct C2 communication.

Detect-And-Avoid (DAA) may be a function for avoiding collisions of aircrafts and UAVs. In addition, DAA may be implemented by broadcasting information for DAA through direct communication between UAVs via PC5 and/or broadcasting information for DAA via an AAM to be described below. Further, a communication path used in communication for DAA may be a direct communication path via a PC5 interface (PC5 reference point). Furthermore, a communication path used in communication for DAA may be a direct communication path through PC5 for C2 communication.

Alternatively, a communication path used in communication for DAA may be a direct communication path through PC5 for applications other than C2 communication. In the present specification, an application for DAA or to implement DAA is also referred to as a DAA application, a DAA function, or simply DAA. Furthermore, that UE supports the DAA function may indicate that the UE can use DAA or has a capability to use DAA.

In addition, DAA may be provided by transmitting and/or receiving information for DAA in broadcast or unicast through a PC5 direct communication path between UAVs, by giving a notification from USS about DAA information (information about DAA or DAA application) through a 3GPP network or other networks, or by transmitting and/or receiving information for DAA through a PC5 direct communication path between an AAM, which is UE for network-assisted (ground-based) DAA, and a UAV.

An area airspace manager (AAM) is one or more pieces of UEs installed in a specific area for providing a network-assisted (ground-based) DAA solution. In addition, the AAM may include a function of managing an area airspace and may further include a function of performing direct communication with UAV via PC5. In addition, the AAM may grasp detailed space information of facilities in a specific area and apply a local DAA rule defined based on the detailed space information to a UAV in a management target airspace.

The AAM may identify a UAV with a network BRID or NRID, and the AAM may perform ProSe Direct Discovery on a C5 reference point, designate AAM-UAS-control as an application service, and transmit a solicitation message with the detected remote ID as an application ID, thereby providing the Layer-2 ID of the target UAV to the AAM. Furthermore, the AAM may establish a PC5 direct communication path by using the provided Layer-2 ID.

Further, the AAM may be initiating UE in establishment of direct C2 communication to be described below (Section 3.3.5).

UAV-to-Everything (U2X) communication is communication supporting a U2X communication service through a Uu and/or a PC5 reference point (interface). Furthermore, U2X services are implemented in various types of U2U applications, such as between UAVs (U2N) and between a UAV and a network (U2X).

In addition, a U2X message may be a dedicated messaging type for U2X services and may include, for example, a broadcast remote ID message.

In addition, a U2X service type is a type of a U2X service identified by, for example, an ITS application identifier (ITS-AID), a provider service identifier (PSID), or an application identifier (AID).

A UAV-to-Everything (U2X) capability may be UE capability information of indicating whether U2X communication is being supported. In addition, U2X capability is capability information of UE indicating whether the UE supports the DAA function, and may further include DAA capability. In addition, having U2X capability may mean that the U2X function is supported.

In addition, the DAA capability may be UE capability information indicating whether communication for DAA or the DAA function is supported. Here, having DAA capability may mean that communication for DAA or the DAA function is supported. Here, UE having U2X capability may or may not further have the DAA capability. In addition, UE not having UAX capability may not have the DAA capability. In addition, in this specification, the DAA capability is also referred to as support for the DAA function.

PC5 capability may be UE capability information indicating whether direct communication between pieces of UE through PC5 is supported. Furthermore, the PC5 capability may be UE capability information indicating whether UE supports UE direct communication through PC5 in a UAS service. More specifically, the PC5 capability may be information indicating capability information of U2X communication through E-UTRA-PC5 of UE and/or capability information of U2X communication through NR-PC5 of UE. Unless otherwise specified in the present specification, the PC5 capability of UE may be capability information for U2X communication.

Here, NR-PC5 may be a PC5 reference point via NR. Further, in the present specification, NR-PC5 is also referred to simply as NR PC5 or simply as PC5.

Examples of mode of direct communication between UE in direct C2 communication via PC5 may include a unicast mode, a broadcast mode, and a groupcast mode.

Further, UE described in this section may be a UAV and/or a UAV-C and/or an AAM, or may be UE other than them unless otherwise specified.

3.2. Description of Identification Information in Present Embodiment

Various types of identification information in the present disclosure will be described below. Further, UE described in each piece of identification information may be a UAV and/or a UAV-C and/or an AAM, or may be UE other than them unless otherwise specified.

First identification information in the present disclosure is UE capability information. More specifically, the first identification information may be information indicating whether UE supports the DAA function. In addition, the first identification information may be information indicating that the DAA function is supported. In addition, the first identification information may be information indicating that the DAA function is not supported.

Here, the support for the DAA function may mean that a function for DAA communication is provided, and UE supporting the DAA function may be able to perform communication for DAA. Further, in the present specification, the DAA function is also referred to as a function for DAA communication, DAA capability, or the like.

Furthermore, the first identification information may be information indicating whether the DAA function is supported. For example, the UE may include the information indicating that the DAA function is supported or the information indicating that the DAA function is not supported in the first identification information based on the capability of the UE. Alternatively, for example, in a case that the UE supports the DAA function, the first identification information may be included in a message, and in a case that the UE does not support the DAA function, the first identification information may not be included in a message.

In addition, the first identification information may be information included in U2X capability indicating whether U2X is supported. More specifically, for example, the UE may transmit the first identification information to a network by including the first identification information in the U2X capability included in a 5GMM capability information element (IE) in an MM message. Alternatively, the first identification information may be identification information different from the U2X capability, and for example, the UE may include the first identification information in the 5GMM capability IE in the MM message as information different from the U2X capability and transmit the first identification information to the network.

Furthermore, in a case that the first identification information is included in the U2X capability, the first identification information may be included in the U2X capability only when the UE supports the U2X function. In other words, for example, in a case that the UE does not support U2X, the UE may not support the DAA function. Alternatively, for example, in the case that the UE supports U2X, there may be a case that the UE supports the DAA function and a case that the UE does not support the DAA function, and in this case, the UE may further include the first identification information indicating whether the DAA function is supported in the U2X capability indicating support for U2X.

The UE may include the first identification information in a message and transmit the message to the network, thereby indicating to the network what the first identification information indicates. Furthermore, the UE may include the first identification information in a message according to a network policy, or a UE policy, or a policy of USS/UTM to which the UE subscribes.

Second identification information in the present disclosure is a cause value indicated by a network to UE. The second identification information may be a cause value indicating that registration of the UE with a network or a UAS service has been rejected. In addition, the second identification information may be information included in a 5GMM cause IE in an MM message. In addition, the MM message including the second identification information may be, for example, a registration reject message.

A network may determine whether to include the second identification information in the MM message to be transmitted to the UE based on whether the DAA function and/or the direct communication function via the PC5 interface indicated by the capability information including the first identification information received from the UE are supported. More specifically, for example, when a network recognizes that the UE supports either or both of the DAA function and/or the direct communication function via the PC5 interface, the second identification information may not be included in the message to be transmitted to the UE. Conversely, for example, when a network recognizes that the UE does not support either the DAA function and/or the direct communication function via the PC5 interface or supports neither of them, the second identification information may be included in the message to be transmitted to the UE.

In other words, for example, the network may determine whether to include the second identification information in the message based on the UE capability information including the first identification information included in a registration request message by the UE. Furthermore, the network may determine whether to include the second identification information in the message based on an operator policy, a network policy, or a policy of a UAS service.

Here, the information indicating support for the direct communication function via the PC5 interface transmitted by the UE together with the first identification information may be PC5 capability and/or ProSe capability, or may be information included in 5GMM capability information elements in an MM message received from the UE by the network.

In addition, for example, the second identification information may be a 5GMM cause value of #79(UAS services not allowed), or may be a cause value other than that. The UE that has received the second identification information may recognize the matter indicated by the second identification information or may perform an action based on the second identification information.

Eleventh identification information in the present disclosure is a cause value indicated by a network to UE. The eleventh identification information may be a cause value indicating that the UE has been rejected to establish a communication path to a network and/or a UAS service. Here, the communication path from the UE to the network and/or the UAS service may be a PDU session. In addition, the PDU session may be a normal PDU session or may be a PDU session for C2 communication.

In addition, the eleventh identification information may be information included in a 5GSM cause IE in an SM message. Furthermore, the SM message including the eleventh identification information may be, for example, a PDU session establishment reject message, or a PDU session modification reject message.

A network may determine whether to include the eleventh identification information in the MM message to be transmitted to the UE based on whether the DAA function and/or the direct communication function via the PC5 interface indicated by the capability information including the first identification information received from the UE is supported. More specifically, for example, when the network recognizes that the UE supports either or both of the DAA function and/or the direct communication function via the PC5 interface, the eleventh identification information may not be included in the message to be transmitted to the UE. Conversely, for example, when the network recognizes that the UE does not support either the DAA function or the direct communication function via the PC5 interface or supports neither of them, the eleventh identification information may be included in the message to be transmitted to the UE.

Furthermore, in other words, for example, the network may determine whether to include the eleventh identification information in the message in the PDU session establishment procedure after the registration procedure is completed based on the UE capability information including the first identification information included in a registration request message by the UE. Furthermore, the network may determine whether to include the eleventh identification information in the message based on an operator policy, a network policy, or a policy of a UAS service.

Here, the information indicating support for the direct communication function via the PC5 interface transmitted by the UE together with the first identification information may be PC5 capability and/or ProSe capability, or may be information included in 5GMM capability information elements in an MM message received from the UE by the network.

In addition, for example, the eleventh identification information may be a 5GSM cause value of #86 (UAS services not allowed), or may be a cause value other than that.

The UE that has received the eleventh identification information may recognize the matter indicated by the second identification information or may perform an action based on the second identification information.

21st identification information in the present disclosure is UE capability information. More specifically, the 21st identification information may be information indicating whether the UE supports the DAA function. Furthermore, the 21st identification information may have content equivalent to the first identification information or content including the first identification information. Alternatively, the 21st identification information may include capability information related to support for the DAA function and/or the direct communication function via PC5 indicated by the UE to the network in the registration procedure. Furthermore, the 21st identification information may be transmitted together with the remote ID of the corresponding UE. Here, the remote ID of the UE may be a CAA-level UAV ID. In addition, the remote ID of the UE may be a UE ID. In addition, the 21st identification information may be associated with the remote ID of the UE.

Furthermore, the 21st identification information may be information broadcasted from the network through the gNB based on a multicast/broadcast service (MBS) function in the 5GS. Additionally or alternatively, the 21st identification information may be information broadcasted or unicasted between UAVs that are directly connected via the PC5 interface, or between the UE and the AAM.

Further, the broadcasting and/or unicasting including the 21st identification information may be performed based on the UE capability information including the first identification information indicated by the UE to the network in the registration procedure. More specifically, for example, the UE may include the information about the support for the DAA function and/or the direct communication function via the PC5 interface indicated by the UE to the network in the registration procedure in the 21st identification information, include the information in a broadcasted and/or unicasted message, and transmit the message.

In addition, the UE (the UAV or the AAM) that has received the 21st identification information may recognize that the UAV associated with the 21st identification information has the DAA function, establish a PC5 direct communication path for the DAA function, and perform communication for the DAA function via the communication path.

22nd identification information in the present disclosure is identification information of each piece of UE on a network to be used by the UE in direct communication via PC5. For example, the 22nd identification information may be required identification information by which respective pieces of UE can specify each other when the pieces of UE establish a direct communication link via PC5. For example, the 22nd identification information may be a destination Layer-2 ID, or may be other information for identifying UE.

Furthermore, the 22nd identification information may be transmitted together with the remote ID of the corresponding UE. Here, the remote ID of the UE may be a CAA-level UAV ID.

Furthermore, the 22nd identification information may be information broadcasted from the network through the gNB based on the multicast/broadcast service (MBS) function in the 5GS. Additionally or alternatively, the 22nd identification information may be information broadcasted or unicasted between UAVs that are directly connected via the PC5 interface, or between the UE and the AAM.

Here, since the 22nd identification information is included in a broadcast and/or unicast message, the network and/or the UE may indicate that the UE indicated by the 22nd identification information has the DAA function and/or the direct communication function via PC5. In other words, for example, since the 22nd identification information is included in the broadcast and/or unicast message, the information indicated by the 21st identification information, i.e., that the corresponding UE supports the DAA function and/or the function of direct communication via PC5, may be indicated. In other words, for example, by including the 22nd identification information in the broadcast and/or unicast message, the network may be able to indicate, without including the 21st identification information, that the corresponding UE supports the DAA function and/or the function of direct communication via PC5.

In addition, since the 22nd identification information is not included in a broadcast and/or unicast message, the network and/or the UE may indicate that the UE indicated by the 22nd identification information does not have the DAA function and/or the direct communication function via PC5.

Further, the broadcasting and/or unicasting including the 22nd identification information may be performed based on the UE capability information including the first identification information indicated by the UE to the network in the registration procedure. More specifically, for example, in the case that the DAA function and/or the direct communication function via the PC5 interface indicated by the UE to the network in the registration procedure is supported, the 22nd identification information may be included in the broadcasted and/or unicasted message, and transmitted.

In addition, the UE (the UAV or the AAM) that has received the 22nd identification information may recognize that the UAV associated with the 22nd identification information has the DAA function, establish a PC5 direct communication path for the DAA function based on information included in the 22nd identification information, and perform communication for the DAA function via the communication path.

Furthermore, the UE (the UAV or the AAM) that has received the 22nd identification information may transmit a message including the 22nd identification information to perform a procedure for establishing a direct communication path or a direct link for DAA communication with the UE (the UAV or the AAM). Here, the message transmitted by the AAM including the 22nd identification information may be a direct communication request (DCR).

3.3. Description of Procedures Used in Each Embodiment

Next, procedures used in each embodiment will be described. Further, procedures used in each embodiment include a registration procedure, a PDU session establishment procedure, a network-initiated session management procedure, a UE-initiated PDU session modification procedure, a procedure for establishing direct C2 communication, a procedure for releasing direct C2 communication, and a procedure initiated by a USS. Each procedure will be described below.

Further, in each embodiment, a case that each of the combinations including the HSS and the UDM, the PCF and the PCRF, the SMF and the PGW-C, and the UPF and the PGW-U is configured to form a single apparatus (that is, single physical hardware, or single logical hardware, or single software) as illustrated in FIG. 2 will be described as an example.

However, the content described in the present embodiment can also be applied to a case where each of the combinations is configured to form different apparatuses (that is, different pieces of physical hardware, or different pieces of logical hardware, or different pieces of software). For example, data may be directly transmitted and/or received between these apparatuses, data may be transmitted and/or received via an N26 interface between the AMF and the MME, or data may be transmitted and/or received via UE.

3.3.1. Registration Procedure

First, the registration procedure will be described with reference to FIG. 6. The registration procedure is a procedure in the 5GS. Hereinafter, the present procedure will refer to the registration procedure. The registration procedure is a procedure for registration with the access network_B, and/or the core network_B, and/or the DN as initiated by the UE. In a case that the UE has not been in a state of being registered with the network, for example, the UE can perform the present procedure at any timing such as the timing of power input. In other words, the UE can initiate the present procedure at any timing in a case that the UE is in the de-registered state (RM-DEREGISTERED state). In addition, each apparatus (in particular, the UE and the AMF) can transition to the registered state (RM-REGISTERED state) based on completion of the registration procedure.

In addition, the registration procedure may be initial registration started by the UE. In addition, the registration procedure may be mobility and periodic registration. In addition, the registration procedure may be an MM procedure.

Furthermore, the registration procedure may be a procedure for updating position registration information of the UE on the network, and/or periodically giving a notification of the state of the UE from the UE to the network, and/or updating a specific parameter related to the UE on the network.

In addition, registration in the present procedure or the registration procedure may be registration or a registration procedure for C2 communication, or registration or a registration procedure for direct C2 communication. In addition, a PDU session in the present procedure may be a PDU session for a UAS service or may be a PDU session for C2 communication.

Alternatively, registration in the present procedure or the registration procedure may be registration or a registration procedure for communication other than C2 communication, or registration or a registration procedure for communication other than direct C2 communication. In addition, a PDU session in the present procedure may be a PDU session for communication other than a UAS service or may be a PDU session for communication other than C2 communication.

The UE may initiate the registration procedure when the UE has mobility across a TA. In other words, the UE may initiate the registration procedure when the UE moves to a TA that is different from a TA indicated in a stored TA list. Furthermore, the UE may initiate the present procedure when the running timer expires. Furthermore, the UE may initiate the registration procedure when a context of each apparatus needs to be updated due to disconnection or invalidation of a PDU session. Furthermore, in a case that there is a change in capability information and/or a preference related to PDU session establishment of the UE, the UE may initiate the registration procedure. Furthermore, the UE may periodically initiate the registration procedure. Furthermore, the UE may initiate the registration procedure based on completion of a UE configuration update procedure. Note that these are not restrictive, and the UE can perform the registration procedure at any timing.

Furthermore, the UE may periodically initiate or perform the registration procedure even when the UE is in a registered state. In other words, the UE may initiate or perform the registration procedure based on expiration of the timer.

Further, the registration procedure performed based on the mobility of the UE and the registration procedure performed periodically may be expressed as a registration procedure for mobility and registration update. In other words, the registration procedure for mobility and registration update may be a registration procedure performed based on mobility of the UE, or may be a registration procedure performed periodically. Furthermore, the registration procedure for mobility and registration update may be a registration procedure performed based on configuration update of the UE. Furthermore, the registration procedure for mobility and registration update may be a registration procedure performed to establish a communication path on which user data is transmitted and/or received. Furthermore, the registration procedure for mobility and registration update may be a registration procedure performed based on a request from the network. Furthermore, in other words, the registration procedure for mobility and registration update may be a registration procedure other than the initial registration procedure. Hereinafter, the registration procedure for mobility and registration update may be expressed as the present procedure.

Next, each step of the registration procedure will be described. Further, the registration procedure described below may be the initial registration procedure, or may be the registration procedure for mobility and registration update.

First, the UE initiates the registration procedure by transmitting a registration request message to the AMF (S800), (S802), and (S804). Specifically, the UE transmits an RRC message including the registration request message to the 5G AN (or the gNB) (S800). Further, the registration request message is a NAS message. In addition, the RRC message may be a control message transmitted and/or received between the UE and the 5G AN (or the gNB). In addition, the NAS message is processed in the NAS layer, and the RRC message is processed in the RRC layer. Further, the NAS layer is a layer higher than the RRC layer.

Here, the UE may transmit the registration request message including the first identification information. Alternatively, the UE may transmit the NAS message including the first identification information.

Further, the UE may select or determine whether the first identification information is to be included in the registration request message based on the UE capability, and/or subscriber information, and/or user registration information, and/or a context stored in the UE, and/or the like.

In addition, the UE may indicate that the UE supports the DAA function or that the UE does not support the DAA function by transmitting the first identification information included in the registration request message.

In addition, in a case that the UE does not support the function indicated by the first identification information, the UE may not transmit the registration request message. In addition, in a case that the UE does not support the DAA function, the UE may not transmit the registration request message.

By including an SM message in the registration request message and transmitting the message, or by transmitting an SM message together with the registration request message, the UE may initiate the PDU session establishment procedure during the registration procedure. Here, the SM message may be a PDU session establishment request message.

After the 5G AN (or the gNB) receives the RRC message including the registration request message, the 5G AN (or the gNB) selects an AMF to which the registration request message is to be transferred (S802). Further, the 5G AN (or the gNB) can select the AMF based on information included in the registration request message and/or the RRC message. The 5G AN (or the gNB) extracts the registration request message from the received RRC message, and transfers the registration request message to the selected AMF (S804).

In a case that the AMF has received the registration request message, the AMF can perform first condition judgment. The first condition judgment is judging whether the network (or the AMF) accepts the request from the UE. In a case that the first condition judgment is true, the AMF initiates the procedure of (A) of FIG. 6, whereas in a case that the first condition judgment is false, the AMF initiates the procedure of (B) of FIG. 6.

Further, the first condition judgment may be performed based on reception of the registration request message, and/or each piece of identification information included in the registration request message, and/or subscriber information, and/or network capability information, and/or operator policy, and/or network state, and/or user registration information, and/or context stored in the AMF, and/or the like. For example, the first condition judgment may be true in a case that the network allows the request from the UE, and the first condition judgment may be false in a case that the network does not allow the request from the UE. In addition, in a case that the network with which the UE is to be registered and/or an apparatus in the network supports the function requested by the UE, the first condition judgment may be true, whereas in a case that the network and/or the apparatus does not support the function requested by the UE, the first condition judgment may be false. Furthermore, in a case that the transmitted and/or received identification information is allowed, the first condition judgment may be true, whereas in a case that the transmitted and/or received identification information is not allowed, the first condition judgment may be false. Further, conditions under which whether the first condition judgment is true or false is determined are not limited to the conditions described above.

First, the case where the first condition judgment is true will be described. In the procedure of (A) of FIG. 6, first, the AMF can perform fourth condition judgment. The fourth condition judgment is to judge whether the AMF should transmit and/or receive an SM message to and/or from the SMF.

Further, the fourth condition judgment may be performed based on whether the AMF has received an SM message. In addition, the fourth condition judgment may be performed based on whether the registration request message includes an SM message. For example, in a case that the AMF has received an SM message, and/or a case that the registration request message includes an SM message, the fourth condition judgment may be true, whereas in a case that the AMF has not received an SM message, and/or a case that the registration request message does not include an SM message, the fourth condition judgment may be false. Further, conditions under which whether the fourth condition judgment is true or false is determined may not be limited to the conditions described above.

Next, the AMF transmits a registration accept message to the UE via the 5G AN (or the gNB) as a response message to the registration request message, based on reception of the registration request message, and/or completion of transmission and/or reception of the SM message to and/or from the SMF (S808). For example, in a case that the 4th condition judgment is false, the AMF may transmit the registration accept message, based on reception of the registration request message from the UE. In addition, in a case that the 4th condition judgment is true, the AMF may transmit the registration accept message, based on completion of transmission and/or reception of the SM message to and/or from the SMF. Further, although the registration accept message is a NAS message transmitted and/or received on the N1 interface, the registration accept message is transmitted and/or received on an RRC message between the UE and the 5G AN (gNB).

Here, the network may indicate the content of the identification information to the UE by transmitting the registration accept message.

In addition, the AMF can either transmit an SM message included in the registration accept message, or transmit an SM message together with the registration accept message. However, the transmission method may be performed in a case that the SM message is included in the registration request message and the 4th condition judgment is true. In addition, the transmission method may be performed in a case that the SM message is included together with the registration request message and the 4th condition judgment is true. By performing such a transmission method as described above, the AMF can indicate that a procedure for SM has been accepted in the registration procedure. Here, the SM message may be a PDU session establishment request message, or a PDU session establishment accept message.

In addition, by transmitting the registration accept message based on each piece of the received identification information, and/or subscriber information, and/or network capability information, and/or operator policy, and/or network state, and/or user registration information, and/or context stored in the AMF, and/or the like, the AMF may indicate that the request from the UE has been accepted.

Furthermore, the AMF may transmit information indicating that a part of the request from the UE has been rejected included in the registration accept message, or may transmit information indicating that a part of the request from the UE has been rejected so as to indicate the reason for rejection of the part of the request from the UE. Furthermore, by receiving the information indicating that the part of the request of the UE has been rejected, the UE may recognize the reason for rejection of the part of the request from the UE. Further, the reason for rejection may be information indicating that contents indicated by the identification information received by the AMF are not allowed.

The UE receives the registration accept message from the AMF via the 5G AN (gNB) (S808). By receiving the registration accept message, the UE can recognize that the request from the UE on the registration request message has been accepted, and recognize contents of various pieces of identification information included in the registration accept message.

Furthermore, the UE can transmit a registration complete message to the AMF via the 5G AN (gNB) as a response message to the registration accept message (S810). Here, although the registration complete message is a NAS message transmitted and/or received via the N1 interface, the registration complete message is transmitted and/or received in an RRC message between the UE and the 5G AN (gNB).

The AMF receives the registration complete message via the 5G AN (gNB) (S810). In addition, each apparatus completes the procedure of (A) of FIG. 6, based on transmission and/or reception of the registration accept message and/or the registration complete message.

Next, a case where the first condition judgment is false will be described. In the procedure of (B) of FIG. 6, the AMF transmits a registration reject message to the UE via the 5G AN (gNB) as a response message to the registration request message (S812). Here, although the registration reject message is a NAS message transmitted and/or received over the N1 interface, the registration reject message is transmitted and/or received between the UE and the 5G AN (gNB) while being included in the RRC message.

Furthermore, the AMF may indicate that the request from the UE using the registration request message has been rejected by transmitting the registration reject message. Furthermore, the AMF may transmit information indicating the reason for rejection in the registration reject message, or may indicate the reason for rejection by transmitting the reason for rejection. Moreover, by receiving the information indicating the reason for rejection of the request from the UE, the UE may recognize the reason for rejection of the request from the UE. Further, the reason for rejection may be information indicating that contents indicated by the identification information received by the AMF are not allowed.

Here, the AMF may transmit the second identification information in the registration reject message. The AMF may determine whether to include the second identification information in a registration message based on the content of the first identification information received from the UE, and/or the subscriber information, and/or network capability information, and/or the operator policy, and/or the network state, and/or the user registration information, and/or the context stored in the AMF, and/or the like. Furthermore, for example, the AMF may indicate to the UE that the registration has been rejected based on the UE capability information indicated in the first identification information by including the second identification information in the registration reject message. In addition, the network may include the second identification information in the registration reject message based on the first identification information received from the UE indicating that the DAA function is not supported.

The UE receives the registration reject message from the AMF via the 5G AN (gNB) (S812). The UE can recognize that the request from the UE using the registration request message has been rejected and the content of various kinds of identification information included in the registration reject message by receiving the registration reject message. In addition, in a case that a prescribed time period has elapsed after transmitting the registration request message and the UE does not receive a registration reject message, the UE may recognize that the request from the UE has been rejected. Each apparatus completes the procedure of (B) in the present procedure, based on transmission and/or reception of the registration reject message.

In addition, in a case that the UE has received the registration reject message including the second identification information, the UE may recognize that the registration has been rejected based on the capability of the UE indicated by the first identification information transmitted by the UE to the network. Alternatively, the UE may recognize that the network has rejected the registration based on the fact that either the DAA function or the PC5 direct communication function indicated by the first identification information or neither of them are not supported.

In addition, in a case that the UE has received the registration reject message including the second identification information, the UE may newly perform the registration procedure. In addition, the UE may newly perform PLMN selection or SNPN selection in a case that the UE has received the registration reject message including the second identification information. In addition, in a case that the UE has received the registration reject message including the second identification information, the UE may not include the service-level device ID in which the CAA-level UAV ID is set in the Service-level-AA container IE of the registration request message.

Figure 6:
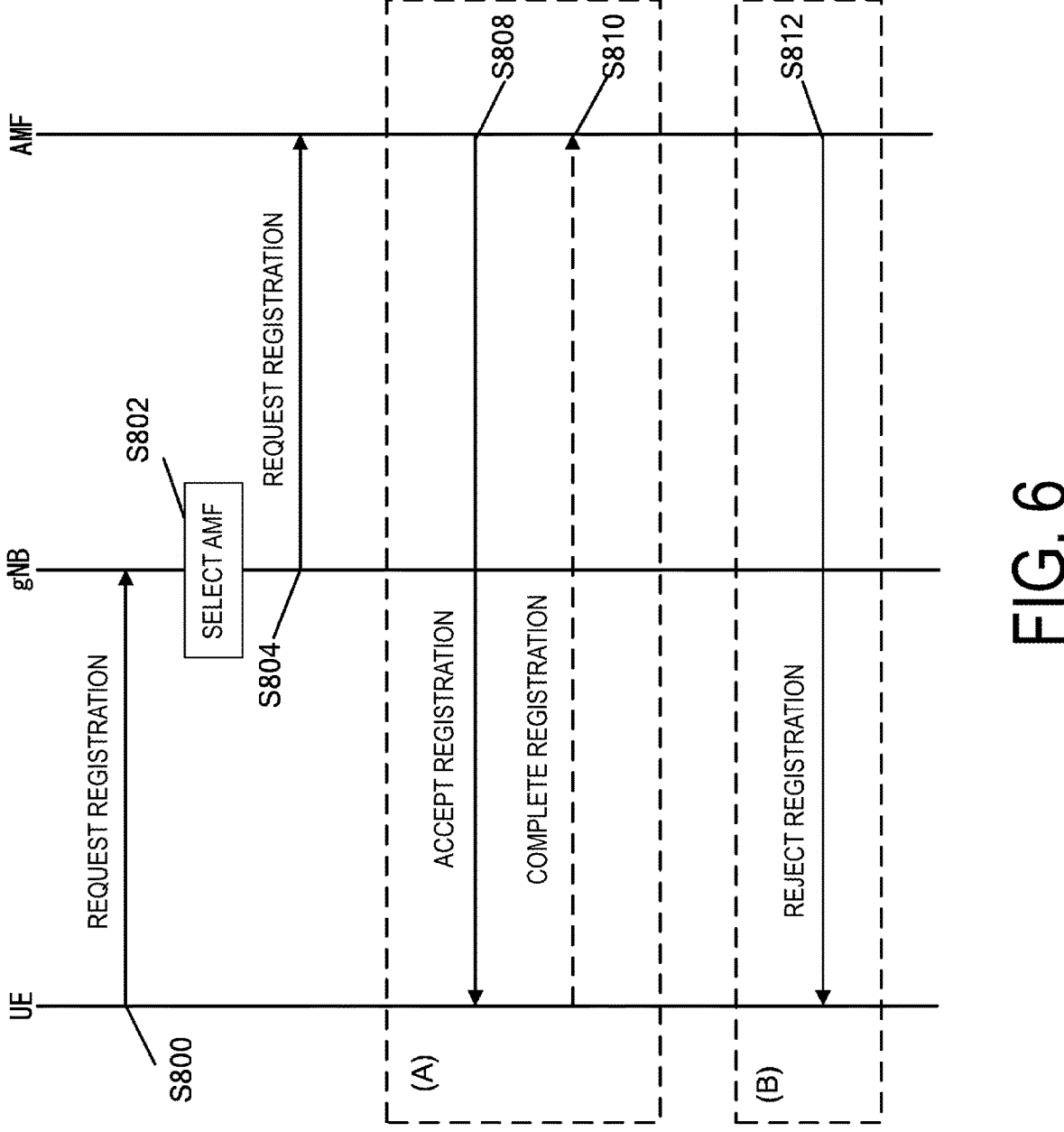
FIG. 6 is a diagram for describing a registration procedure.

Further, the procedure of (B) of FIG. 6 may be initiated in a case that the procedure of (A) of FIG. 6 is stopped.

Each apparatus completes the registration procedure, based on completion of the procedure of (A) or (B) of FIG. 6. Further, each apparatus may transition to a state in which the UE is registered with the network (RM_REGISTERED state) based on completion of the procedure of (A) of FIG. 6, may maintain a state in which the UE is not registered with the network (RM_DEREGISTERED state), or may transition to a state in which the UE is not registered with the network, based on completion of the procedure of (B) of FIG. 6. In addition, the transition of each apparatus to each state may be performed based on completion of the registration procedure, or may be performed based on establishment of a PDU session.

Alternatively, the UE may complete the registration procedure based on the reception of the registration accept message, or registration reject message.

Furthermore, each apparatus may perform processing based on information transmitted and/or received in the registration procedure based on completion of the registration procedure. For example, in a case that information indicating that a part of the request from the UE has been rejected is transmitted and/or received, the reason for rejection of the request from the UE may be recognized. Furthermore, each apparatus may perform the present procedure again or may perform the registration procedure on the core network_B or another cell based on the reason for the rejection of the request from the UE.

Moreover, the UE may store the identification information received along with the registration accept message and/or the registration reject message or may recognize determination of a network based on the completion of the registration procedure.

The UE may recognize the content of the identification information by receiving a registration accept message or a registration reject message.

Further, the behavior performed in a case that each piece of identification information is received may be performed based on the received identification information.

3.3.2. PDU Session Establishment Procedure

Figure 7:
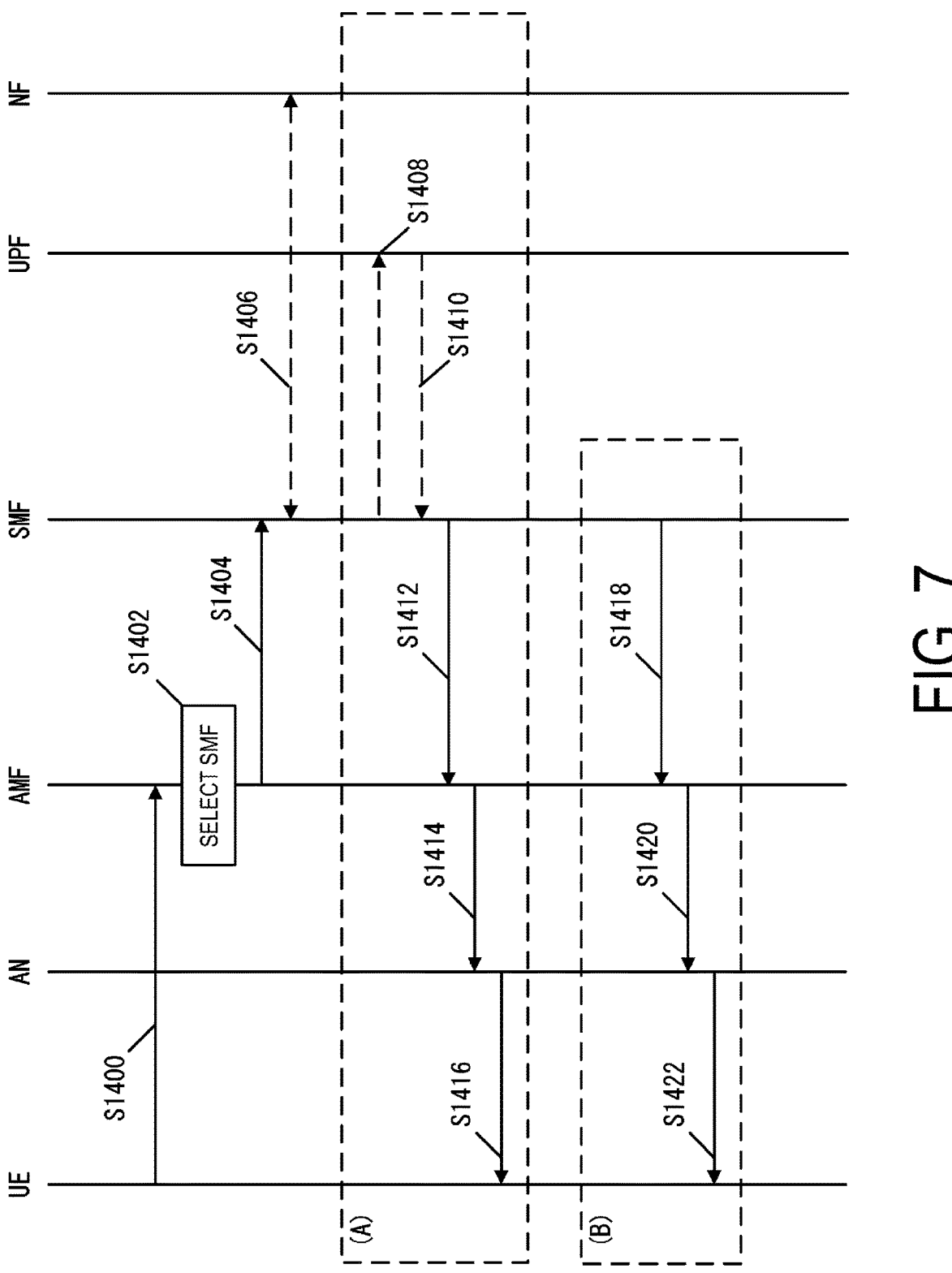
FIG. 7 is a diagram for describing a PDU session establishment procedure.

Next, the behavior of each apparatus in a case that the UE performs the PDU session establishment procedure will be described with reference to FIG. 7. The PDU session establishment procedure will also be referred to as the present procedure below. In addition, the PDU session establishment procedure may be an SM procedure.

In addition, a PDU session in the present procedure may be a PDU session for C2 communication or may be a PDU session for direct C2 communication. In addition, a PDU session in the present procedure may be a PDU session for a UAS service.

Alternatively, a PDU session in the present procedure may be a PDU session for communication other than C2 communication or may be a PDU session for communication other than direct C2 communication. In addition, a PDU session in the present procedure may be a PDU session for communication other than a UAS service.

Further, the present procedure may be performed after the registration procedure is performed one or more times.

First, the UE transmits a PDU session establishment request message to the SMF (S1400), (S1402), and (S1404), and initiates the PDU session establishment procedure. Then, the SMF receives the PDU session establishment request message from the UE.

Specifically, by transmitting a NAS message including an N1 SM container including the PDU session establishment request message to the AMF via the access network (S1400) via the access network (5 GAN or gNB), the UE starts the PDU session establishment procedure. The NAS message may be, for example, a message transmitted via the N1 interface, and may be an uplink NAS transport (UL NAS TRANSPORT) message.

Here, the UE may indicate the content of each piece of identification information to the network by transmitting a PDU session establishment request message or a NAS message.

In addition, the access network may be 3GPP access or non-3GPP access, and may include a base station apparatus. In other words, the UE transmit the NAS message to the AMF via the base station apparatus.

In addition, the UE may request establishment of a PDU session supporting C2 communication by transmitting a PDU session establishment request message. In other words, the UE may request establishment of a PDU session supporting a QoS flow for C2 communication by transmitting a PDU session establishment request message.

Furthermore, in a case that establishment of a PDU session for supporting C2 communication is requested, establishment of an always-on PDU session may be requested. Furthermore, in a case that establishment of a PDU session for supporting the QoS flow for C2 communication is requested, UE may request establishment of an Always-on PDU session.

Next, upon receiving a NAS message, the AMF can recognize what is requested by the UE, and/or the content of information and the like (a message, a container, and information) included in the NAS message.

Next, the AMF selects the SMF as a transfer destination of at least part of the information and the like included in the NAS message received from the UE (a message, a container, and information) (S1402). Further, the AMF may select the SMF that is a transfer destination, based on the information and the like included in the NAS message (a message, a container, and information), and/or subscriber information, and/or network capability information, and/or UE policy, and/or operator policy, and/or network state, and/or user registration information, and/or context stored by the AMF, and/or the like.

Next, the AMF transmits at least part of the information and the like (the message, the container, and the information) included in the NAS message received from the UE to the selected SMF via the N11 interface, for example (S1404).

Next, upon receiving the information and the like (the message, the container, and the information) transmitted from the AMF, the SMF can recognize what is requested by the UE, and/or the content of the information and the like (the message, the container, and the information) received from the AMF.

Here, the SMF may perform the second condition judgment. In addition, the second condition judgment may be to determine whether the network should accept the request from the UE. In a case that the second condition judgment is determined to be true, the SMF may initiate the procedure of (A) of FIG. 7, whereas in a case that the second condition judgment is determined to be false, the SMF may initiate the procedure of (B) of FIG. 7.

Further, the second condition judgment may be performed by an NF other than the SMF. The NF may be, for example, an NSSF, NWDAF, PCF, or NRF. In a case that the NF other than the SMF performs the second condition judgment, the SMF may provide the NF with at least part of information necessary for performing the second condition judgment, specifically, information received from the UE (S1406). Then, in a case that the NF determines that the second condition judgment is true or false based on the information received from the SMF, the NF may notify the SMF of information including the results of the second condition judgment (that is, whether the result is true or false). The SMF may determine the identification information and/or the control message to be transmitted to the UE, based on the result of the second condition judgment received from the NF.

Further, the second condition judgment may be performed based on the information and the like (a message, a container, and information) received from the AMF, and/or subscriber information (subscription information), and/or network capability information, and/or UE policy, and/or operator policy, and/or network state, and/or user registration information, and/or context stored by the SMF, and/or the like.

For example, in a case that the network allows the request from the UE, the second condition judgment may be determined to be true, whereas in a case that the network does not allow the request from the UE, the second condition judgment may be determined to be false. In addition, in a case that a network as a connection destination of the UE and/or an apparatus within the network supports the function requested by the UE, the second condition judgment may be determined to be true, whereas in a case that the network and/or the apparatus does not support the function requested by the UE, the second condition judgment may be determined to be false. In addition, in a case that the transmitted and/or received identification information is allowed, the second condition judgment may be determined to be true, whereas in a case that the transmitted and/or received identification information is not allowed, the second condition judgment may be determined to be false.

Further, a condition under which the second condition judgment is determined to be true or false needs not necessarily be limited to the conditions described above.

Next, each step of the procedure of (A) of FIG. 7 will be described.

The SMF may select the UPF for a PDU session to be established, and transmit an N4 session establishment request message to the selected UPF via the N4 interface, for example (S1408). The N4 session establishment request message may include at least some of PCC rules received from the PCF.

The SMF may determine whether to perform authorization for C2 communication in the present procedure based on the information and the like (a message, a container, and information) received from the AMF, and/or the information such as PCC rules received from the PCF, and/or subscriber information, and/or network capability information, and/or UE policy, and/or operator policy, and/or network state, and/or user registration information, and/or context stored by the SMF, and/or the like.

In a case that authorization for C2 communication is performed in the present procedure, the SMF may determine authorization for establishment of direct C2 communication and/or C2 communication using a PDU session based on at least one of the first and second identification information.

Here, the SMF may select one or more UPFs, based on the information and the like (a message, a container, and information) received from the AMF, and/or the information such as PCC rules received from the PCF, and/or the subscriber information, and/or network capability information, and/or UE policy, and/or operator policy, and/or network state, and/or user registration information, and/or context stored by the SMF, and/or the like. In addition, in a case that multiple UPFs are selected, the SMF may transmit an N4 session establishment request message to each UPF. Here, it is assumed that a UPF has been selected.

Next, upon receiving the N4 session establishment request message (S1408), the UPF can recognize the content of the information received from the SMF. In addition, the UPF may transmit an N4 session establishment response message to the SMF via the N4 interface, for example, based on the reception of the N4 session establishment request message (S1410).

Next, in a case that the SMF receives the N4 session establishment response message as a response message to the N4 session establishment request message, the SMF can recognize contents of the information received from the UPF.

Next, the SMF transmits a PDU session establishment accept message to the UE based on the reception of the PDU session establishment request message, and/or the selection of the UPF, and/or the reception of the N4 session establishment response message, and/or the like. Then, the UE receives the PDU session establishment accept message from the SMF (S1418) (S1420) (S1422).

Specifically, the SMF transmits an N1 SM container, and/or N2 SM information, and/or the PDU session ID to the AMF via the N11 interface, for example, based on the reception of the PDU session establishment request message, and/or selection of the UPF, and/or the reception of the N4 session establishment response message, and/or the like (S1412). Here, the N1 SM container may include the PDU session establishment accept message. Furthermore, the PDU session ID may be included in the PDU session establishment accept message.

Next, the AMF that has received the N1 SM container, and/or the N2 SM information, and/or the PDU session ID transmits a NAS message to the UE via a first base station apparatus included in the access network (S1414) (S1416). Here, the NAS message is transmitted via the N1 interface, for example. In addition, the NAS message may be a downlink NAS transport (DL NAS TRANSPORT) message.

Specifically, when the AMF transmits an N2 PDU session request message to the base station apparatus included in the access network (S1414), the base station apparatus that has received the N2 PDU session request message transmits the NAS message to the UE (S1416). Here, the N2 PDU session request message may include the NAS message and/or the N2 SM information. In addition, the NAS message may include the PDU session ID and/or the N1 SM container.

In addition, the PDU session establishment accept message may be a response message to the PDU session establishment request. In addition, the PDU session establishment accept message may indicate that establishment of the PDU session has been accepted.

Here, by transmitting the PDU session establishment accept message, and/or the N1 SM container, and/or the PDU session ID, and/or the NAS message, and/or the N2 SM information, and/or the N2 PDU session request message, the SMF and/or the AMF may indicate that at least part of the request from the UE by means of the PDU session establishment request message has been accepted.

Further, the SMF and/or the AMF may determine which piece of identification information is to be included in the PDU session establishment accept message, and/or the N1 SM container, and/or the NAS message, and/or the N2 SM information, and/or the N2 PDU session request message, based on each piece of the received identification information, and/or subscriber information, and/or network capability information, and/or UE policy, and/or operator policy, and/or network state, and/or user registration information, and/or context stored by the SMF and/or the AMF, and/or the like.

Next, upon receiving the NAS message via the N1 interface, for example (S1416), the UE can recognize that the request from the UE by means of the PDU session establishment request message has been accepted, and/or the content of the information and the like (the message, the container, and the information) included in the NAS message.

Next, each step of the procedure of (B) of FIG. 7 will be described.

First, the SMF transmits the N1 SM container, and/or the PDU session ID to the AMF via the N11 interface, for example, based on the reception of the PDU session establishment request message (S1418). Here, the N1 SM container may include a PDU session establishment reject message. Furthermore, the PDU session ID may be included in the PDU session establishment reject message.

Next, the AMF that has received the N1 SM container, and/or the PDU session ID transmits a NAS message to the UE via a base station apparatus included in the access network (S1420) (S1422). Here, the NAS message is transmitted via the N1 interface, for example. In addition, the NAS message may be a downlink NAS transport (DL NAS TRANSPORT) message. In addition, the NAS message may include the PDU session ID and/or the N1 SM container.

In addition, the PDU session establishment reject message may be a response message to the PDU session establishment request. In addition, the PDU session establishment reject message may indicate that establishment of the PDU session has been rejected.

Here, by transmitting the PDU session establishment reject message, and/or the N1 SM container, and/or the PDU session ID, and/or the NAS message, the SMF and/or the AMF may indicate that the request from the UE by means of the PDU session establishment request message has been rejected.

Further, by transmitting the PDU session establishment reject message, the SMF may indicate that the request from the UE has been rejected, that the request from the UE is not allowed, or information of a combination of these indications.

Here, the SMF and/or the AMF may include the eleventh identification information in the PDU session establishment reject message. The SMF and/or the AMF may include the eleventh identification information in the PDU session establishment reject message based on the first identification information indicated by the UE to the network in the registration request message. In addition, for example, the SMF and/or the AMF may include the eleventh identification information in the PDU session establishment reject message based on the fact that the UE does not support the DAA function and/or the PC5 direct communication function indicated by the first identification information.

Further, the SMF and/or the AMF may determine which piece of identification information is to be included in the PDU session establishment reject message, and/or the N1 SM container, and/or the NAS message, and/or the N2 SM information, and/or the N2 PDU session request message, based on each piece of the received identification information, and/or subscriber information, and/or network capability information, and/or UE policy, and/or operator policy, and/or network state, and/or user registration information, and/or context stored by the SMF and/or the AMF, and/or the like.

Next, upon receiving the NAS message via the N1 interface, for example (S1422), the UE can recognize that the request from the UE by means of the PDU session establishment request message has been rejected, and/or the content of the information and the like (the message, the container, and the information) included in the NAS message.

Further, the UE may perform the behavior after receiving the PDU session establishment accept message or the PDU session establishment reject message. In addition, the UE may perform the behavior after receiving one or more pieces of identification information among the 10th to 12th and the 15th to 18th identification information.

The UE may recognize the content of the identification information by receiving the NAS message, or the PDU session establishment accept message, or the PDU session establishment reject message.

Each apparatus may complete the present procedure based on transmission and/or reception of the PDU session establishment accept message. In addition, each apparatus may establish a PDU session based on completion of the present procedure. At this time, each apparatus may transition to a state in which it can communicate with the DN using the established PDU session.

Each apparatus may complete the present procedure based on transmission and/or reception of a PDU session establishment accept message or a PDU session establishment reject message. At this time, since each apparatus cannot establish a PDU session, it cannot communicate with the DN in a case that there is no PDU session already established.

Further, each processing operation performed by the UE based on reception of each piece of identification information described above may be performed during the present procedure or after completion of the present procedure or may be performed based on completion of the present procedure after completion of the present procedure.

3.3.3. Overview of Network-Initiated Session Management Procedure

Next, an overview of the network-initiated session management procedure will be described. Hereinafter, the network-initiated session management procedure will also be referred to as the present procedure. The present procedure is a procedure for session management initiated by a network on an established PDU session. In addition, the network-initiated session management procedure may be an SM procedure.

In addition, a PDU session in the present procedure may be a PDU session for C2 communication or may be a PDU session for direct C2 communication. In addition, a PDU session in the present procedure may be a PDU session for a UAS service.

Further, the present procedure may be a network-initiated PDU session modification procedure, and/or a network-initiated PDU session release procedure, and/or the like, or a network-initiated session management procedure that is not limited thereto may be performed. Further, each apparatus may transmit and/or receive a PDU session modification message in the network-initiated PDU session modification procedure or may transmit and/or receive a PDU session release message in the network-initiated PDU session release procedure.

In addition, in a case that the present procedure is the network-initiated PDU session modification procedure, a session management request message may be a PDU session modification command (PDU SESSION MODIFICATION COMMAND) message in the present procedure. In addition, in a case that the present procedure is the network-initiated PDU session release procedure, a session management request message may be a PDU session release command (PDU SESSION RELEASE COMMAND) message in the present procedure.

In addition, in a case that the present procedure is the network-initiated PDU session modification procedure, a session management complete message may be a PDU session modification complete (PDU SESSION MODIFICATION COMPLETE) message in the present procedure. In addition, in a case that the present procedure is the network-initiated PDU session release procedure, a session management complete message may be a PDU session release complete (PDU SESSION RELEASE COMPLETE) message in the present procedure.

3.3.3.1. Example of Network-Initiated Session Management Procedure

Figure 8:
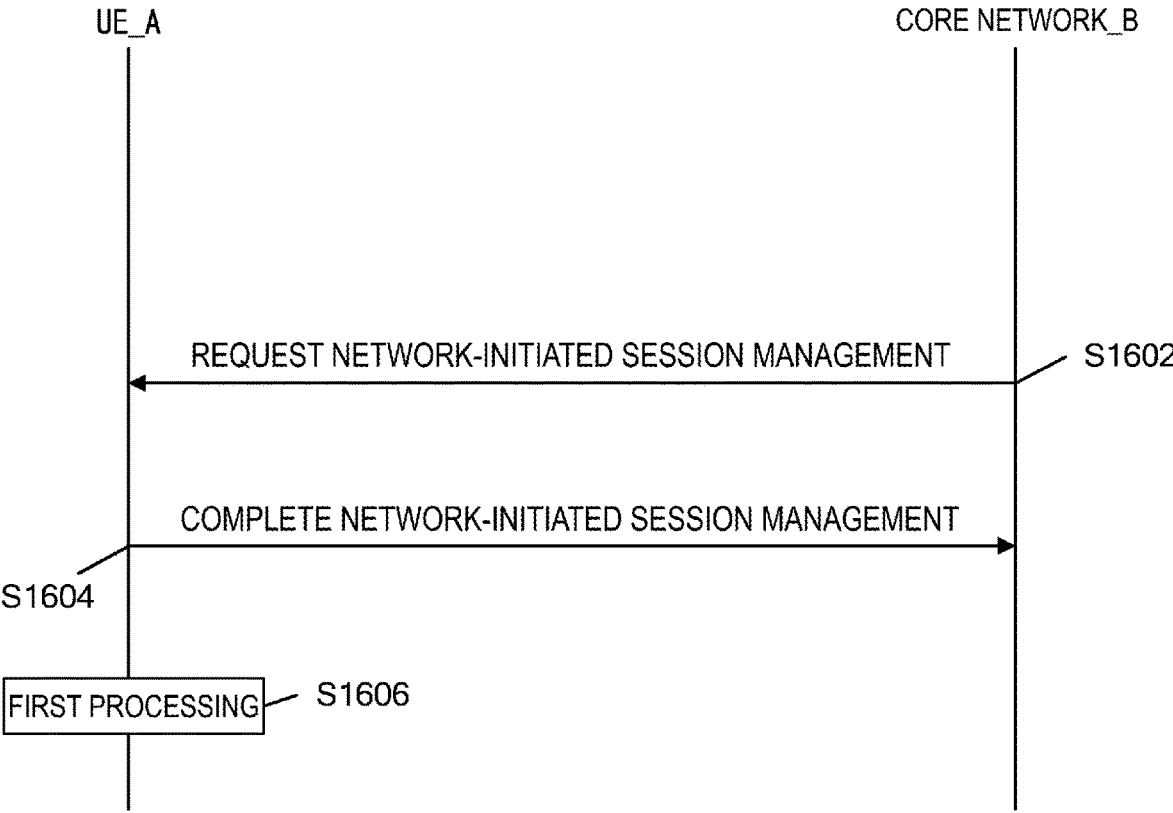
FIG. 8 is a diagram illustrating a network-initiated session management procedure.

Next, an example of the network-initiated session management procedure will be described with reference to FIG. 8. The present procedure refers to the network-initiated session management procedure below. Each step of the present procedure will be described below.

The UE and each apparatus on the core network_B 190 initiate the network-initiated session management procedure at any timing based on completion of the registration procedure and/or the PDU session establishment procedure.

To be specific, the apparatus on the core network_B 190 may initiate the present procedure based on reception of a PDU session modification request message from the UE, or may initiate the present procedure based on reception of a PDU session release request message from the UE. Further, the present procedure may be a network-initiated PDU session modification procedure in a case that the present procedure is initiated based on reception of a PDU session modification request message. Furthermore, the present procedure may be a network-initiated PDU session release procedure in a case that the present procedure is initiated based on reception of a PDU session release request message.

Furthermore, an apparatus on the core network_B 190 initiate the present procedure based on a request from an apparatus on the DN or another apparatus on the core network.

Here, the apparatus on the core network_B 190 that initiates the present procedure may be the SMF and/or the AMF, and the UE may transmit and/or receive messages in the present procedure via the AMF and/or over the access network_B. Furthermore, the apparatus on the DN may be an Application Function (AF) of the DN.

The apparatus on the core network_B 190 transmits a network-initiated session management request message to the UE(S1602) and starts network-initiated session management. Furthermore, the UE receives the network-initiated session management request message from the apparatus on the core network_B 190.

Furthermore, the apparatus on the core network_B 190 may include the PDU session ID in the network-initiated session management request message, or may include the PDU session ID to request to make a change on the PDU session identified with the PDU session ID.

Further, the PDU session ID included in the PDU session modification request message may be the PDU session ID of the established PDU session. Further, in a case that the present procedure is performed based on a UE-initiated session management procedure, the PDU session ID included in the PDU session modification request message may be the same as the PDU session ID included in the PDU session modification request message or the PDU session release request message.

Next, the UE that has received the network-initiated session management request message transmits a network-initiated session management complete message (S1604). In addition, the UE may perform first processing based on completion of the present procedure.

Here, the UE may include the PDU session ID in the network-initiated session management complete message. Further, the PDU session ID included in the network-initiated session management complete message may be the same as the PDU session ID included in the network-initiated session management request message.

Hereinafter, an example of the first processing will be described.

The first processing may be processing for the UE to recognize what the core network_B 190 indicates, or to recognize a request from the core network_B 190. Moreover, the first processing may be processing of the UE to store received identification information as a context or may be processing of the UE to transfer the received identification information to an upper layer and/or a lower layer.

In addition, the UE may perform, as the first processing, the behavior made in a case that each piece of identification information described above is received.

Furthermore, each apparatus may perform processing based on identification information transmitted and/or received in the present procedure, based on completion of the present procedure. In other words, the UE may perform the first processing based on completion of the present procedure or may complete the present procedure after completion of the first processing.

Furthermore, each apparatus completes the network-initiated session management procedure based on completion of the above-described processing, and/or transmission and/or reception of the network-initiated session management request message and/or the network-initiated session management complete message.

Further, each apparatus may modify the existing PDU session or release the existing PDU session based on the completion of the network-initiated session management procedure. In other words, each apparatus may modify the existing PDU session based on completion of the PDU session modification procedure. Similarly, in other words, each apparatus may release the existing PDU session based on completion of the PDU session release procedure.

3.3.4. Overview of UE-Initiated Session Management Procedure

Next, an overview of the UE-initiated session management procedure will be described. Hereinafter, the UE-initiated session management procedure will also be referred to as the present procedure. The present procedure is a procedure for session management initiated and performed by the UE in an established PDU session. In addition, the UE-initiated session management procedure may be an SM procedure.

In addition, a PDU session in the present procedure may be a PDU session for C2 communication or may be a PDU session for direct C2 communication. In addition, a PDU session in the present procedure may be a PDU session for a UAS service.

Further, the present procedure may be a UE-initiated PDU session modification procedure, and/or a UE-initiated PDU session release procedure, and/or the like, or a UE-initiated session management procedure that is not limited thereto may be performed. Further, each apparatus may transmit and/or receive the PDU session modification request message, and/or the PDU session modification command message, and/or the PDU session modification complete message, and/or the PDU session modification reject message in the UE-initiated PDU session modification procedure. In addition, each apparatus may transmit and/or receive a PDU session release request message, and/or a PDU session release command message, and/or a PDU session release complete message, and/or a PDU session release reject message in the UE-initiated PDU session release procedure.

Furthermore, each apparatus completes the UE-initiated session management procedure based on completion of the above-described processing, and/or transmission and/or reception of the UE-initiated session management request message and/or the UE-initiated session management complete message.

3.3.4.1. Example of UE-Initiated PDU Session Modification Procedure

Figure 9:
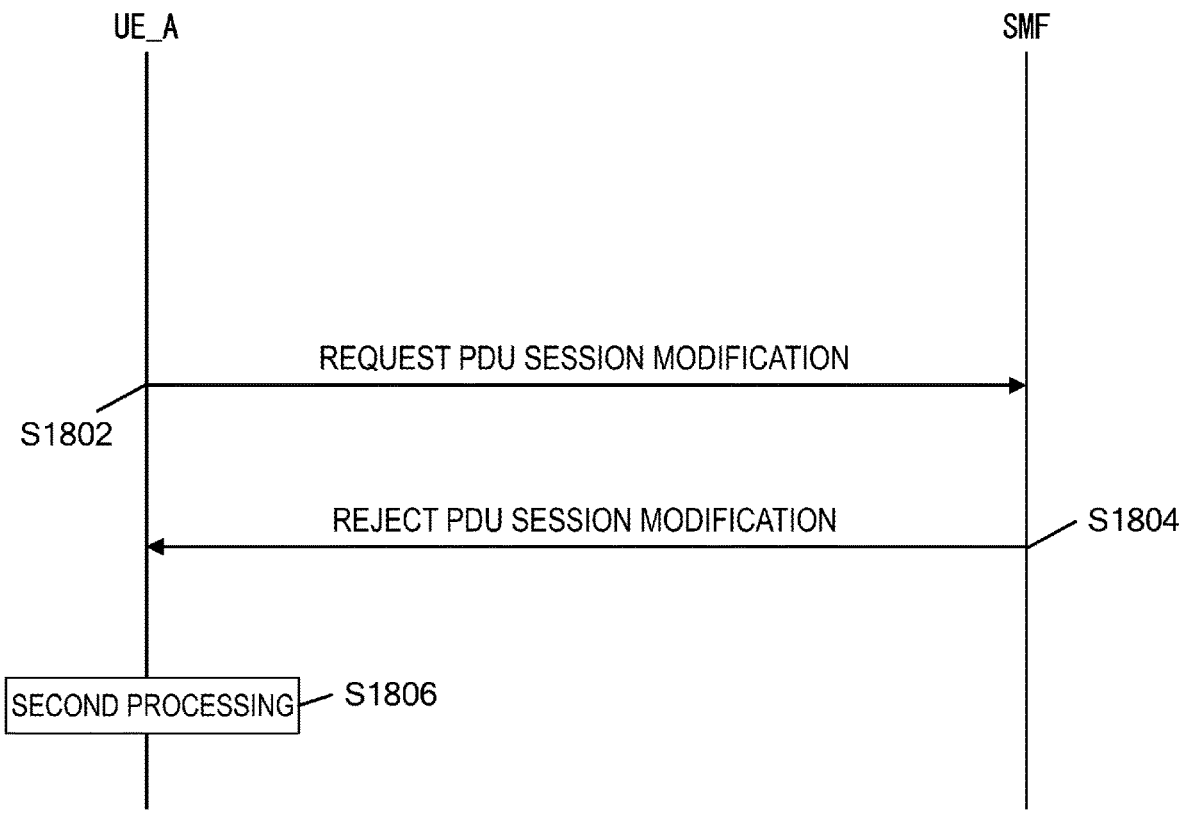
FIG. 9 is a diagram illustrating a UE-initiated session management procedure.

Next, each step of the present procedure will be described below with reference to FIG. 9. The present procedure refers to a UE-initiated PDU session modification procedure below.

Further, the UE can initiate a UE-initiated PDU session modification procedure at any timing based on completion of the registration procedure and/or the PDU session establishment procedure. In other words, the UE may initiate the UE-initiated PDU session modification procedure for an established PDU session at any timing. In other words, the UE may initiate the UE-initiated PDU session modification procedure using the same PDU session ID as that of the established PDU session at any timing.

First, the UE initiates the UE-initiated PDU session modification procedure by transmitting a PDU session modification request message to the SMF (S1802). Here, the UE may include the PDU session ID in the PDU session modification request message, or may include the PDU session ID to request to modify the PDU session identified with the PDU session ID.

Further, the PDU session ID included in the PDU session modification request message may be the PDU session ID of the established PDU session.

Next, the SMF receives the PDU session modification request message transmitted by the UE. In a case that the SMF accepts the request from the UE, the SMF initiates a network-initiated PDU session modification procedure. Conversely, in a case that the SMF rejects the request from the UE, the SMF transmits a PDU session modification reject message to the UE. A case where the SMF rejects a request from the UE will be described below.

The SMF transmits a PDU session modification reject message to the UE based on acceptance of the PDU session modification request message (S1804).

Here, the PDU session ID included in the PDU session modification reject message may be the same as the PDU session ID included in the PDU session modification request message. In other words, the PDU session ID included in the PDU session modification reject message may be the same as the PDU session ID provided by the UE during the present procedure.

The UE receives the PDU session modification reject message. Furthermore, each apparatus completes the present procedure based on the transmission and/or reception of the PDU session modification reject message and/or the completion of the network-initiated PDU session modification procedure.

Here, the UE may recognize that the request from the UE has been rejected based on the reception of the PDU session modification reject message. Furthermore, the UE may perform second processing based on the reception of the PDU session modification reject message (S1806). Further, the second processing may be performed based on completion of the present procedure.

Here, the second processing may be processing for the UE to recognize what the SMF indicates. Moreover, the second processing may be processing of the UE to store received identification information as a context or may be processing of the UE to transfer the received identification information to an upper layer and/or a lower layer. Moreover, the second processing may be processing of the UE to recognizes that the request of the present procedure has been rejected.

In addition, the PDU session modification procedure and/or the PDU session release procedure for the same PDU session may be a PDU session modification procedure and/or a PDU session release procedure using the same PDU session ID.

Furthermore, each apparatus completes the UE-initiated PDU session modification procedure based on completion of the above-described processing, and/or transmission and/or reception of the UE-initiated PDU session modification reject message.

3.3.4.2. Example of UE-Initiated PDU Session Release Procedure

Next, each step of the present procedure will be described below. The present procedure refers to a UE-initiated PDU session release procedure below.

The UE-initiated PDU session release procedure may be similar to the PDU session modification procedure described above.

Specifically, in a case that the present procedure is a UE-initiated PDU session release procedure, the above-described PDU session modification request message may be read as a PDU session release request message. Furthermore, in a case that the present procedure is a UE-initiated PDU session release procedure, the above-described PDU session modification request message may be read as a PDU session release request message, and the above-described PDU session modification reject message may be read as a PDU session release reject message. In addition, the behavior to change a PDU session may be read as an action to release a PDU session.

Furthermore, in a case that the present procedure is a UE-initiated PDU session release procedure, the behavior of the SMF performed based on reception of a PDU session release request message may be similar to the behavior of the SMF performed based on the reception of the above-described PDU session modification request message. Furthermore, in a case that the present procedure is a UE-initiated PDU session release procedure, the behavior of the UE performed based on reception of a PDU session release reject message may be similar to the behavior of the UE performed based on the reception of the above-described PDU session modification reject message.

Furthermore, in a case that the present procedure is a UE-initiated PDU session release procedure, the SMF may initiate the network-initiated PDU session release procedure based on the reception of the PDU session release request message, or may transmit a PDU session release rejection message to the UE.

Furthermore, each apparatus completes the UE-initiated PDU session release procedure based on completion of the above-described processing, and/or transmission and/or reception of the UE-initiated PDU session release reject message.

3.3.5. Procedure for Establishing Communication Path for Direct Communication

Figure 10:
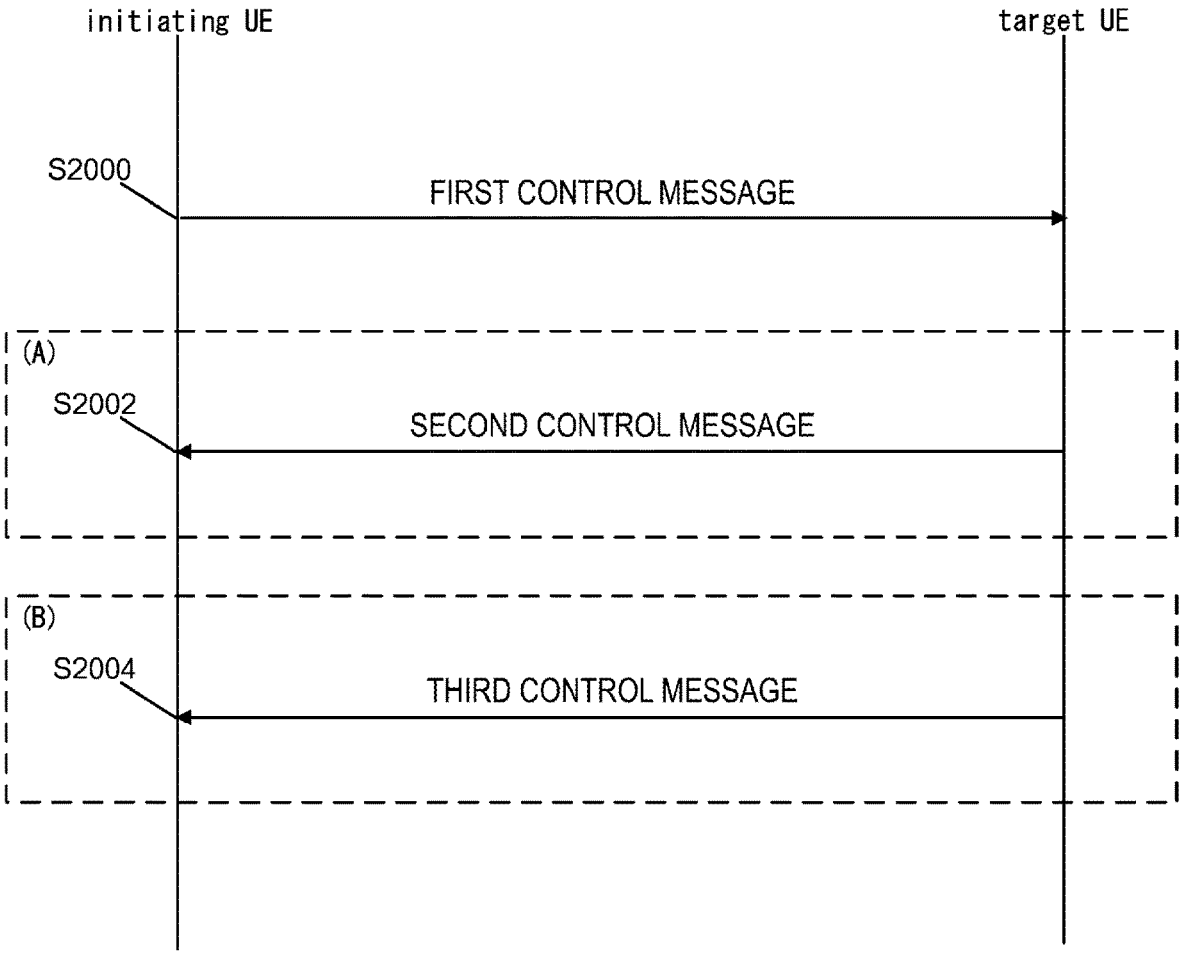
FIG. 10 is a diagram for describing a procedure for establishing a communication path for direct communication.

Next, actions of each apparatus when the UE performs a procedure for establishing a communication path for direct communication will be described with reference to FIG. 10. Hereinafter, the procedure for establishing a communication path for direct communication is also referred to as the present procedure. In addition, the procedure for establishing a communication path for direct communication may be referred to as a communication path establishment procedure for direct communication.

In addition, the present procedure may be a procedure for establishing a communication path for direct C2 communication or may be a procedure for establishing a communication path for communication other than direct C2 communication. Further, in a case that the present procedure is a procedure for establishing a communication path for communication other than direct C2 communication, the direct C2 communication described in this section may be read as a communication path for direct communication, a direct communication path, a direct link, or the like.

Further, the present procedure may be performed after performing the registration procedure, and/or the PDU session establishment procedure, and/or the network-initiated session management procedure, and/or the UE-initiated session management procedure one or more times. In addition, the present procedure may be performed during the registration procedure, and/or the PDU session establishment procedure, and/or the network-initiated session management procedure, and/or the UE-initiated session management procedure.

The present procedure may be performed in a case that the UE is authenticated and/or authorized for direct C2 communication from a network in the registration procedure, and/or the PDU session establishment procedure, and/or the network-initiated session management procedure, and/or the UE-initiated session management procedure. In addition, the UE may initiate the present procedure regardless of authorization for direct C2 communication from the network.

Further, as the UE, there may be initiating UE and target UE in the present procedure.

Further, in the present procedure, the initiating UE and the target UE may transmit and/or receive each control message on the PC5.

In addition, the present procedure includes a ProSe direct link establishment procedure, and a PC5 unicast link establishment procedure. Here, a ProSe direct link for direct C2 communication may be established through the ProSe direct link establishment procedure. In addition, a PC5 unicast link for direct C2 communication may be established through the PC5 unicast link establishment procedure. In other words, the present procedure may be a procedure for establishing a ProSe direct link or a PC5 unicast link for direct C2 communication.

Sections 3.3.5.1 and 3.3.5.2 will be described below.
3.3.5.1. ProSe Direct Link Establishment Procedure The ProSe direct link establishment procedure will be described. Further, an initiation of the present procedure is based on the description about Section 3.3.5.

First, the initiating UE transmits a first control message to the target UE (S2000) to initiate the present procedure.

Here, the first control message may be a message for requesting establishment of direct C2 communication. In addition, the first control message may be a ProSe direct link establishment request message. In addition, the first control message may be a direct communication request message.

Here, the initiating UE may transmit the first control message to indicate content of each piece of identification information included in the message to the target UE.

In addition, the initiating UE may request establishment of direct C2 communication by transmitting the first control message.

Next, the target UE receives the first control message from the initiating UE.

In a case that the target UE receives the first control message, the target UE may recognize the content requested by the initiating UE and/or the content of information (a message, a container, or identification information) included in the first control message.

Here, the target UE may perform third condition judgment. In addition, the third condition judgment may be performed to determine whether the request from the initiating UE is to be accepted by the target UE. In a case that the third condition judgment is determined to be true, the target UE may initiate the procedure of (A) of FIG. 10, whereas in a case that the third condition judgment is determined to be false, the target UE may initiate the procedure of (B) of FIG. 10.

Further, the third condition judgment may be performed based on the information and the like (the message, the container, and information) received from the initiating UE, and/or subscriber information (subscription information), and/or network capability information, and/or UE policy, and/or operator policy, and/or network state, and/or user registration information, and/or context stored by the target UE, and/or the like.

For example, in a case that the target UE allows the request from the initiating UE, the third condition judgment may be determined to be true, whereas in a case that the target UE does not allow the request from the initiating UE, the third condition judgment may be determined to be false. In addition, in a case that the target UE that is a connection destination of the initiating UE and/or an apparatus in the target UE supports the function requested by the initiating UE, the third condition judgment may be determined to be true, whereas in a case that the target UE and/or the apparatus does not support the function requested by the initiating UE, the third condition judgment may be determined to be false. In addition, in a case that the transmitted and/or received identification information is allowed, the third condition judgment may be determined to be true, whereas in a case that the transmitted and/or received identification information is not allowed, the third condition judgment may be determined to be false.

Further, a condition under which the third condition judgment is determined to be true or false needs not necessarily be limited to the conditions described above.

Next, each step of the procedure of (A) of FIG. 10 will be described.

The target UE transmits a second control message to the initiating UE based on the reception of the first control message (S2002).

Here, the second control message may be a message for accepting establishment of direct C2 communication. In addition, the second control message may be a ProSe direct link establishment accept message. In addition, the second control message may be a direct communication accept message.

In addition, the second control message may be a response message to the first control message. In addition, the second control message may indicate that the first control message has been accepted.

Here, the target UE may transmit the second control message to indicate that at least part of the request from the initiating UE made by means of the first control message has been accepted.

Further, by transmitting these pieces of identification information and/or the second control message, the target UE may indicate that the target UE supports each function, may indicate that the request from the initiating UE has been accepted, may indicate that the request from the initiating UE has not been allowed, or may indicate information obtained by combining the above-described pieces of information. Furthermore, in a case that multiple pieces of identification information are transmitted and/or received, two or more pieces of identification information of these pieces of identification information may include one or more pieces of the identification information. Further, information indicating support for each function and information indicating a request for use of each function may be transmitted and/or received as the same identification information, or may be transmitted and/or received as different identification information.

Further, the target UE may determine which identification information is to be included in the second control message based on each piece of the received identification information, and/or subscriber information, and/or network capability information, and/or UE policy, and/or operator policy, and/or network state, and/or user registration information, and/or context stored by the target UE, and/or the like.

Next, the initiating UE receives the second control message from the target UE.

Upon receiving the second control message, the initiating UE can recognize that the request from the UE made by means of the first control message has been accepted, and/or recognize the content of the information (the message, the container, or the identification information) included in the second control message.

Next, each step of the procedure of (B) of FIG. 10 will be described.

First, the target UE transmits a third control message to the initiating UE based on the reception of the first control message (S2004).

Here, the third control message may be a message for rejecting establishment of direct C2 communication. In addition, the third control message may be a ProSe direct link establishment reject message. In addition, the third control message may be a direct communication reject message.

In addition, the third control message may be a response message to the first control message. In addition, the third control message may indicate that establishment of direct C2 communication has been rejected.

Here, the target UE may transmit the third control message to indicate that the request from the initiating UE made by means of the first control message has been rejected.

Further, by transmitting the third control message, the target UE may indicate that the request from the initiating UE has been rejected, may indicate that the request from the initiating UE is not allowed, or may indicate information obtained by combining the pieces of information.

Further, the target UE may determine which identification information is to be included in the third control message based on each piece of the received identification information, and/or subscriber information, and/or network capability information, and/or UE policy, and/or operator policy, and/or network state, and/or user registration information, and/or context stored by the target UE, and/or the like.

Next, the initiating UE receives the third control message (S2004). Upon receiving the third control message, the initiating UE can recognize that the request from the initiating UE made by means of the first control message has been rejected, and/or recognize the content of the information (the message, the container, or identification information) included in the third control message.

Each apparatus may complete the present procedure based on the transmission and/or reception of the second control message. Each apparatus may establish a communication path for direct C2 communication based on the completion of the present procedure. At this time, each apparatus may transition to a state in which communication can be performed between the initiating UE and the target UE using the established direct C2 communication.

In addition, each apparatus may complete the present procedure based on the transmission and/or reception of the third control message. At this time, since each apparatus cannot establish direct C2 communication, in a case that there is no direct C2 communication already established, communication cannot be performed between the initiating UE and the target UE.

Further, each type of processing performed by the initiating UE based on reception of each piece of identification information described above may be performed during the present procedure or after completion of the present procedure, or may be performed based on completion of the present procedure after completion of the present procedure. The initiating UE and the target UE that have established direct C2 communication based on the completion of the present procedure may start exchanging information using the direct C2 communication by a ProSe direct link.

3.3.5.2. PC5 Unicast Link Establishment Procedure

A PC5 unicast link establishment procedure will be described. Further, an initiation of the present procedure is based on the description about Section 3.3.5. First, the initiating UE transmits a first control message to the target UE (S2000) to initiate the present procedure.

Here, the first control message may be a message for requesting establishment of direct C2 communication. In addition, the first control message may be a direct link establishment request message. In addition, the first control message may be a direct communication request message.

Here, the initiating UE may transmit the first control message to indicate content of each piece of identification information included in the message to the target UE.

In addition, the initiating UE may request establishment of direct C2 communication by transmitting the first control message.

Next, the target UE receives the first control message from the initiating UE.

In a case that the target UE receives the first control message, the target UE may recognize the content requested by the initiating UE and/or the content of information (a message, a container, or identification information) included in the first control message.

Here, the target UE may perform third condition judgment. In addition, the third condition judgment may be performed to determine whether the request from the initiating UE is to be accepted by the target UE. In a case that the third condition judgment is determined to be true, the target UE may initiate the procedure of (A) of FIG. 10, whereas in a case that the third condition judgment is determined to be false, the target UE may initiate the procedure of (B) of FIG. 10.

Further, the third condition judgment may be performed based on the information and the like (the message, the container, and information) received from the initiating UE, and/or subscriber information (subscription information), and/or network capability information, and/or UE policy, and/or operator policy, and/or network state, and/or user registration information, and/or context stored by the target UE, and/or the like.

For example, in a case that the target UE allows the request from the initiating UE, the third condition judgment may be determined to be true, whereas in a case that the target UE does not allow the request from the initiating UE, the third condition judgment may be determined to be false. In addition, in a case that the target UE that is a connection destination of the initiating UE and/or an apparatus in the target UE supports the function requested by the initiating UE, the third condition judgment may be determined to be true, whereas in a case that the target UE and/or the apparatus does not support the function requested by the initiating UE, the third condition judgment may be determined to be false. In addition, in a case that the transmitted and/or received identification information is allowed, the third condition judgment may be determined to be true, whereas in a case that the transmitted and/or received identification information is not allowed, the third condition judgment may be determined to be false.

Further, a condition under which the third condition judgment is determined to be true or false needs not necessarily be limited to the conditions described above.

Next, each step of the procedure of (A) of FIG. 10 will be described.

The target UE transmits a second control message to the initiating UE based on the reception of the first control message (S2002).

Here, the second control message may be a message for accepting establishment of direct C2 communication. In addition, the second control message may be a direct link establishment accept message. In addition, the second control message may be a direct communication accept message.

In addition, the second control message may be a response message to the first control message. In addition, the second control message may indicate that the first control message has been accepted.

Here, the target UE may transmit the second control message to indicate that at least part of the request from the initiating UE made by means of the first control message has been accepted.

Further, by transmitting the second control message, the target UE may indicate that the target UE supports each function, may indicate that the request from the initiating UE has been accepted, may indicate that the request from the initiating UE has not been allowed, or may indicate information obtained by combining the above-described pieces of information. Furthermore, in a case that multiple pieces of identification information are transmitted and/or received, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

Further, the target UE may determine which identification information is to be included in the second control message based on each piece of the received identification information, and/or subscriber information, and/or network capability information, and/or UE policy, and/or operator policy, and/or network state, and/or user registration information, and/or context stored by the target UE, and/or the like.

Next, the initiating UE receives the second control message from the target UE.

Upon receiving the second control message, the initiating UE can recognize that the request from the UE made by means of the first control message has been accepted, and/or recognize the content of the information (the message, the container, or the identification information) included in the second control message.

Next, each step of the procedure of (B) of FIG. 10 will be described.

First, the target UE transmits a third control message to the initiating UE based on the reception of the first control message (S2004).

Here, the third control message may be a message for rejecting establishment of direct C2 communication. In addition, the third control message may be a direct link establishment reject message. In addition, the third control message may be a direct communication reject message.

In addition, the third control message may be a response message to the first control message. In addition, the third control message may indicate that establishment of direct C2 communication has been rejected.

Here, the target UE may transmit the third control message to indicate that the request from the initiating UE made by means of the first control message has been rejected.

Further, by transmitting the third control message, the target UE may indicate that the request from the initiating UE has been rejected, may indicate that the request from the initiating UE is not allowed, or may indicate information obtained by combining the pieces of information.

Further, the target UE may determine which identification information is to be included in the third control message based on each piece of the received identification information, and/or subscriber information, and/or network capability information, and/or UE policy, and/or operator policy, and/or network state, and/or user registration information, and/or context stored by the target UE, and/or the like.

Next, the initiating UE receives the third control message (S2004). Upon receiving the third control message, the initiating UE can recognize that the request from the initiating UE made by means of the first control message has been rejected, and/or recognize the content of the information (the message, the container, or the identification information) included in the third control message.

Each apparatus may complete the present procedure based on the transmission and/or reception of the second control message. Each apparatus may establish a communication path for direct C2 communication based on the completion of the present procedure. At this time, each apparatus may transition to a state in which communication can be performed between the initiating UE and the target UE using the established direct C2 communication.

In addition, each apparatus may complete the present procedure based on the transmission and/or reception of the third control message. At this time, since each apparatus cannot establish direct C2 communication, in a case that there is no direct C2 communication already established, communication cannot be performed between the initiating UE and the target UE.

Further, each type of processing performed by the initiating UE based on reception of each piece of identification information described above may be performed during the present procedure or after completion of the present procedure, or may be performed based on completion of the present procedure after completion of the present procedure.

The initiating UE and the target UE that have established direct C2 communication in the PC5 unicast link based on the completion of the present procedure may start exchanging information using the direct C2 communication.

3.3.6. Procedure for Releasing Communication Path for Direct Communication

Figure 11:
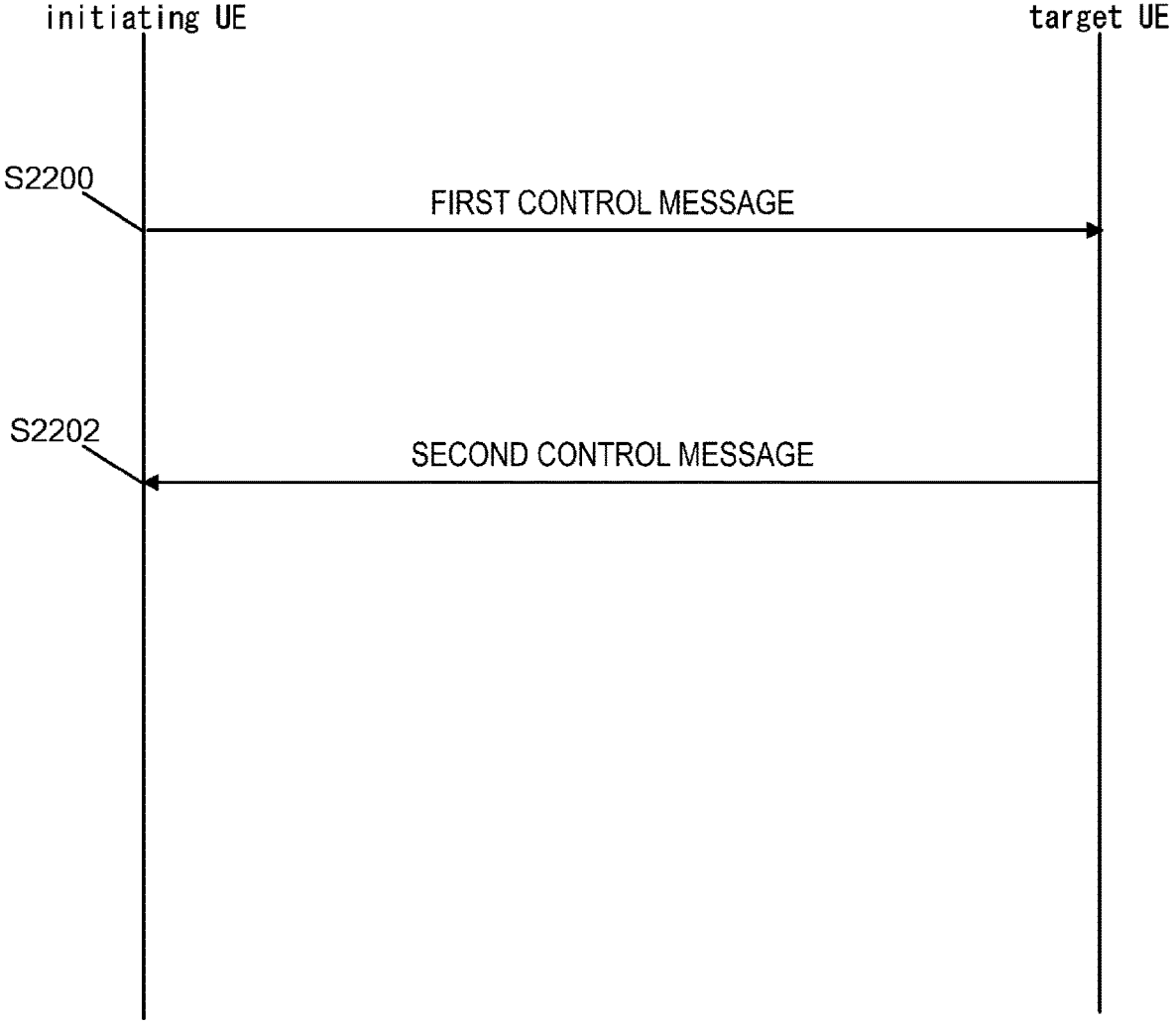
FIG. 11 is a diagram for describing a procedure for releasing a communication path for direct communication.

Next, actions of each apparatus when the UE performs a procedure for releasing a communication path for direct communication will be described with reference to FIG. 11. Hereinafter, the procedure for releasing direct C2 communication is also referred to as the present procedure. In addition, the procedure for releasing direct C2 communication may be referred to as a direct C2 communication release procedure. Further, the present procedure may be a procedure for releasing direct C2 communication established by any of the procedures described in Section 3.3.5.

Further, the present procedure may be performed after performing the registration procedure, and/or the PDU session establishment procedure, and/or the network-initiated session management procedure, and/or the UE-initiated session management procedure one or more times. In addition, the present procedure may be performed during the registration procedure, and/or the PDU session establishment procedure, and/or the network-initiated session management procedure, and/or the UE-initiated session management procedure.

The present procedure may be performed in a case that authentication and/or authorization of the UE for direct C2 communication is revoked by a network in the registration procedure, and/or the PDU session establishment procedure, and/or the network-initiated session management procedure, and/or the UE-initiated session management procedure. In addition, the UE may initiate the present procedure regardless of revocation of direct C2 communication by the network.

Further, as the UE, there may be initiating UE and target UE in the present procedure.

In addition, the present procedure may also be performed in a case that the UE receives, from a lower layer, an indication of radio link failure or an indication of PC5-RRC connection release.

In addition, the present procedure may be performed in a case that the initiating UE receives a request to release a 5G ProSe direct link or a PC5 unicast link from an upper layer. In addition, the present procedure may be performed in a case that the initiating UE receives a request to release the communication path of the direct C2 communication from the upper layer.

In addition, the present procedure may be performed in a case that the target UE is in a non-responsive state.

In addition, the present procedure may be performed in a case that the initiating UE reaches the maximum number of established 5G ProSe direct links and/or a case that a new 5G ProSe direct link needs to be established. In addition, the present procedure may be performed in a case that the initiating UE reaches the maximum number of communication paths of the established direct C2 communication and/or a case that a new 5G ProSe direct link or a new PC5 unicast link needs to be established.

In addition, the present procedure may be performed in a case that the initiating UE operates as a 5G ProSe layer-3 UE-to-network relay UE and/or in a case that the PDU session is released by the initiating UE or the network. More specifically, for example, the present procedure may be performed based on a PDU session release procedure performed in a procedure initiated by a USS to be described below. Alternatively, for example, the present procedure may be performed based on a PDU session modification procedure performed in a procedure initiated by the USS to be described below.

In addition, the present procedure may be performed in a case that the initiating UE operates as a 5G ProSe layer-2 remote UE or a 5G ProSe layer-3 remote UE and/or a case that the initiating UE is in a 5GMM-IDLE mode.

In addition, the present procedure may be performed in a case that the initiating UE operates as a 5G ProSe layer-2 remote UE or a 5G ProSe layer-3 remote UE or a 5G ProSe layer-2 UE-to-network relay UE, and/or a case that service authorization for the initiating UE is revoked after a setting parameter is received.

In addition, the present procedure may be performed in a case that the initiating UE operates as a 5G ProSe layer-3 UE-to-network relay UE, and/or a case that service authorization for the initiating UE is revoked after a setting parameter is received.

Further, the 5G ProSe layer-2 UE-to-network relay UE may be a UE capable of utilizing 5G ProSe or direct C2 communication that provides functionality to support connectivity to the network for the 5G ProSe layer-2 remote UE via layer 2 protocol.

In addition, the 5G ProSe layer-3 UE-to-network relay UE may be a UE capable of utilizing 5G ProSe or direct C2 communication that provides functionality to support connectivity to the network for the 5G ProSe layer-3 remote UE via layer 3 protocol. In addition, the 5G ProSe layer-2 remote UE may be a UE capable of using 5G ProSe or direct C2 communication, which communicates with the DN via the 5G ProSe layer-2 UE-to-network relay UE.

In addition, the 5G ProSe layer-3 remote UE may be a UE capable of using 5G ProSe or direct C2 communication, which communicates with the DN via the 5G ProSe layer-3 UE-to-network relay UE.

Further, in the present procedure, the initiating UE and the target UE may transmit and/or receive each control message on the PC5.

Further, the present procedure may be a procedure performed after or based on the completion of any of the procedures initiated by the USS to be described below (in Section 3.3.7). Furthermore, the present procedure may be performed based on a PDU session modification procedure performed in any of the various procedures initiated by the USS or the completion of any of the PDU session modification procedures.

In addition, the present procedure includes a ProSe direct link release procedure, and a PC5 unicast link release procedure. Here, the ProSe direct link release procedure may be a procedure for releasing a ProSe direct link established for direct C2 communication. In addition, the PC5 unicast link release procedure may be a procedure for releasing a PC5 unicast link established for direct C2 communication. In other words, the present procedure may be a procedure for releasing a ProSe direct link or a PC5 unicast link already established for direct C2 communication.

Sections 3.3.6.1 and 3.3.6.2 will be described below.

3.3.6.1. ProSe Direct Link Release Procedure

The ProSe direct link release procedure will be described. Further, an initiation of the present procedure is based on the description about Section 3.3.6.

First, the initiating UE transmits a first control message to the target UE (S2200) to initiate the present procedure.

Here, the first control message may be a message for requesting release of direct C2 communication. In addition, the first control message may be a ProSe direct link release request message.

Here, the initiating UE may select or determine whether each type of the identification information is to be included in the first control message based on subscriber information, and/or the network state, and/or the user registration information, and/or a context stored in the UE, and/or the like.

In addition, the initiating UE may request release of direct C2 communication with the target UE by transmitting the first control message.

Next, the target UE receives the first control message from the initiating UE.

In a case that the target UE receives the first control message, the target UE may recognize the content requested by the initiating UE and/or the content of information (a message, a container, or identification information) included in the first control message.

Next, the target UE transmits a second control message to the initiating UE based on the reception of the first control message (S2202).

Here, the second control message may be a message for accepting release of the direct C2 communication. In addition, the second control message may be a ProSe direct link release accept message.

In addition, the second control message may be a response message to the first control message. In addition, the second control message may indicate that the first control message has been accepted.

Here, the target UE may transmit the second control message to indicate that at least part of the request from the initiating UE made by means of the first control message has been accepted.

Further, by transmitting the second control message, the target UE may indicate that the target UE supports each function, may indicate that the request from the initiating UE has been accepted, may indicate that the request from the initiating UE has not been allowed, or may indicate information obtained by combining the above-described pieces of information.

Next, the initiating UE receives the second control message from the target UE.

Upon receiving the second control message, the initiating UE can recognize that the request from the UE made by means of the first control message has been accepted, and recognize the content of the information (the message, the container, and identification information) included in the second control message.

Each apparatus may complete the present procedure based on the transmission and/or reception of the second control message. Each apparatus may release the communication path for the direct C2 communication based on the completion of the present procedure. At this time, each apparatus may transition to a state in which communication between the initiating UE and the target UE is disabled.

3.3.6.2. PC5 Unicast Link Release Procedure

A PC5 unicast link release procedure will be described. Further, an initiation of the present procedure is based on the description about Section 3.3.7.

First, the initiating UE transmits a first control message to the target UE (S2200) to initiate the present procedure.

Here, the first control message may be a message for requesting release of direct C2 communication. In addition, the first control message may be a direct link release request message.

Here, the initiating UE may select or determine whether each type of the identification information is to be included in the first control message based on subscriber information, and/or the network state, and/or the user registration information, and/or a context stored in the UE, and/or the like.

In addition, the initiating UE may request release of direct C2 communication with the target UE by transmitting the first control message.

Next, the target UE receives the first control message from the initiating UE.

In a case that the target UE receives the first control message, the target UE may recognize the content requested by the initiating UE and/or the content of information (a message, a container, or identification information) included in the first control message.

Next, the target UE transmits a second control message to the initiating UE based on the reception of the first control message (S2202).

Here, the second control message may be a message for accepting release of the direct C2 communication. In addition, the second control message may be a direct link release accept message.

In addition, the second control message may be a response message to the first control message. In addition, the second control message may indicate that the first control message has been accepted.

Here, the target UE may transmit the second control message to indicate that at least part of the request from the initiating UE made by means of the first control message has been accepted.

Further, by transmitting the second control message, the target UE may indicate that the target UE supports each function, may indicate that the request from the initiating UE has been accepted, may indicate that the request from the initiating UE has not been allowed, or may indicate information obtained by combining the above-described pieces of information.

Next, the initiating UE receives the second control message from the target UE.

Upon receiving the second control message, the initiating UE can recognize that the request from the UE made by means of the first control message has been accepted, and recognize the content of the information (the message, the container, and identification information) included in the second control message.

Each apparatus may complete the present procedure based on the transmission and/or reception of the second control message. Each apparatus may release the communication path for the direct C2 communication based on the completion of the present procedure. At this time, each apparatus may transition to a state in which communication between the initiating UE and the target UE is disabled.

3.3.7. USS-Initiated Procedure

Next, a procedure initiated by the USS will be described. The procedure initiated by the USS is also referred to as the present procedure in this section. Further, "initiated by the USS" may mean "initiated by the USS or the UTM".

Here, the present procedure is a procedure initiated by the USS in a case that the USS is determined to satisfy the conditions of each procedure, and during the present procedure, a session management procedure initiated by a network or the UE may be performed. In addition, the session management procedure performed in the present procedure may be a network-requested PDU session release procedure, or may be a network-requested PDU session modification procedure.

Here, the procedure initiated by the USS may be specifically, but not limited to, a C2 connection revocation procedure (revocation of C2 connectivity procedure) or a UUAA revocation procedure. Alternatively, the present procedure may be, but not limited to, a UAV controller replacement procedure (UAV-C replacement procedure) or a C2 pairing policy configuration (C2 pairing policy configuration).

A UUAA procedure will be described in the next section as an example of the present procedure.

3.3.7.1. UUAA

An overview a USS-UAV Authorization/Authentication (UUAA) procedure will be described. Hereinafter, the UUAA procedure may be referred to as UUAA or the present procedure.

The present procedure is a procedure for authentication and/or authorization of UE by a USS. Further, authorization for C2 communication (Authorization for C2) may be performed in the UUAA procedure.

Further, the present procedure may be initiated by a network or by the UE.

In addition, UUAA may be a UUAA-MM procedure performed at the time of registration with the 5GS. In addition, UUAA may be a UUAA-SM procedure performed during establishment of a PDU session. In addition, UUAA may be an MM procedure or an SM procedure. In addition, the procedure used in UUAA may be an MM procedure or an SM procedure.

In addition, in a case that UUAA-MM is not performed, UUAA-SM may be performed.

In addition, a PDU session for the UAS service may be established only after the UAV is authenticated and authorized by the USS. This action may be performed during UUAA-MM or during UUAA-SM.

Further, success of UUAA may be read as authentication and authorization of the UAV having been allowed. In addition, failure of UUAA may be read as authentication and authorization of the UAV not having been allowed.

In addition, "authentication and authorization of the UAV having been allowed" may be read as "the UAV has been authenticated and authorized". In addition, "authentication and authorization of the UAV not having been allowed" may be read as "the UAV has not been authenticated and authorized".

In addition, "authentication and authorization of the UAV succeeded" may be read as "the UAV has been authenticated and authorized". In addition, "authentication and authorization of the UAV failed" may be read as "the UAV has not been authenticated and authorized".

In addition, "authentication and authorization by the USS having been allowed" may be read as "the UAV has been authenticated and authorized". In addition, "authentication and authorization by the USS not having been allowed" may be read as "the UAV has not been authenticated and authorized".

3.3.7.1.1. UUAA-MM

Next, the UUAA-MM procedure will be described with reference to FIG. 12. Hereinafter, the UUAA-MM procedure is also referred to as UUAA-MM or the present procedure. The present procedure may be a procedure performed at the time of registration with the 5GS.

The UUAA-MM procedure may be performed during the registration procedure with the 5GS or after the registration procedure with the 5GS. In other words, a combination of first communication in the UUAA-MM procedure described below and the registration procedure described above may be referred to as a registration procedure, or the first communication in the UUAA-MM procedure described below may be a procedure independent from the registration procedure described above.

In addition, UUAA-MM may also be performed at the time of registration with the 5GS based on operator policies. In addition, in a case that there is a request from the operator, and/or the UE has an aerial UE subscription in access and mobility subscription data and provides the CAA-level UAV ID in the registration request message, UUAA-MM may be performed. In addition, in a case that UUAA-MM is not performed, the UE may be authenticated and/or authorized with establishment of a PDU session in UUAA-SM.

In addition, UUAA-MM may be optional. In addition, UUAA-MM may also be performed for the UE that requests authentication and authorization of the UAV by the USS when registering with the 5GS. In addition, UUAA-MM may also be performed by the AMF. In addition, in the case that the UE has an aerial UE subscription in the 5GS and the UE provides the CAA-level UAV ID of the UAV in the registration request message, UUAA-MM may be performed while the UE is registered based on the local network policy. In addition, UUAA-MM may be performed when the USS that has authenticated the UAV performs re-authentication.

In addition, the UE may also be authenticated and authorized by the USS by using the CAA-level UAV ID and the credential associated with the CAA-level UAV ID. In addition, while UUAA-MM is being performed, the AMF may communicate with the USS via the UAS NF and transfer authentication messages between the UE and the UAS NF.

Next, each step of UUAA-MM will be described.

First, the UE performs a registration procedure (S2400).

Then, first communication is performed between the UE, the AMF and the USS (S2402). In the first communication, messages for authentication and authorization used by the USS may be transmitted and received between the UE, the AMF, and the USS. Here, the UE and/or the AMF may recognize whether the UUAA-MM is successful through a message in the first communication. In other words, the UE and/or the AMF may recognize whether authentication and authorization of the UAV have been allowed through a message in the first communication.

Next, the AMF performs fifth condition judgment. The fifth condition judgment is for a network (or the AMF) to determine whether UUAA-MM has succeeded. The AMF may initiate a UE configuration update procedure (S2404) of (A) of FIG. 12 in a case that the fifth condition judgment is true. In addition, in a case that the fifth condition judgment is false, the AMF may initiate a de-registration procedure (S2406) of (B) of FIG. 12.

Further, the fifth condition judgment may be performed based on reception of the message used in the first communication, and/or subscriber information, and/or network capability information, and/or operator policy, and/or network state, and/or user registration information, and/or context stored in the AMF, and/or the like.

For example, in a case that the UUAA-MM has succeeded, the fifth condition judgment may be true, and in a case that the UUAA-MM has failed, the fifth condition judgment may be false. Furthermore, in a case that the transmitted and/or received identification information is allowed, the fifth condition judgment may be true, whereas in a case that the transmitted and/or received identification information is not allowed, the fifth condition judgment may be false. Further, conditions under which whether the fifth condition judgment is true or false may not be limited to the above-described conditions.

In addition, the AMF may indicate the result of the UUAA-MM to the UE in the procedure performed according to the fifth condition judgment being true or false.

In addition, each apparatus may also complete the present procedure based on the first communication, and/or the UE configuration update procedure, and/or the de-registration procedure being performed.

Figure 12:
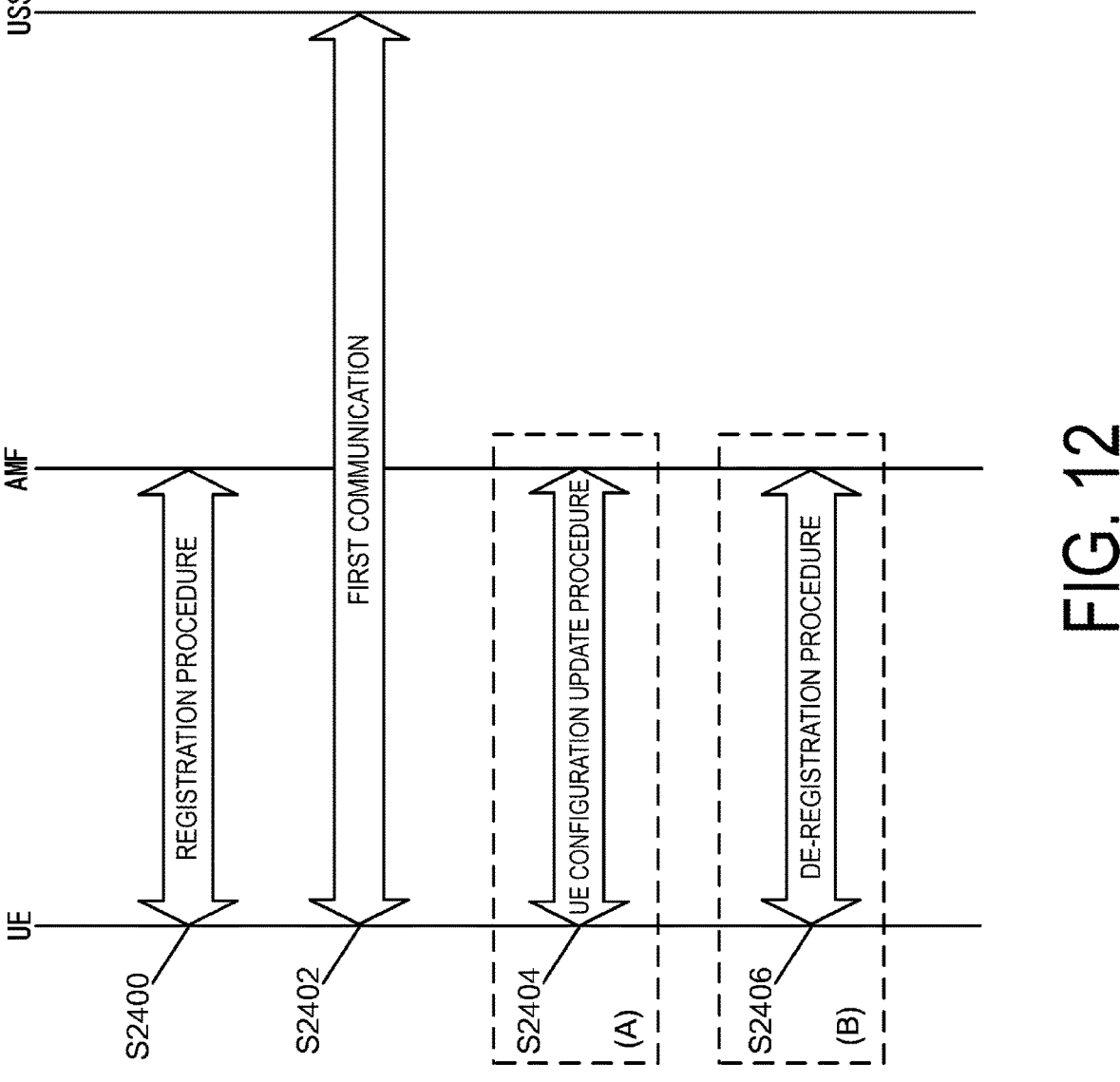
FIG. 12 is a diagram for describing a UUAA-MM procedure.

In addition, the UE may recognize the result of the UUAA-MM in the procedure of (A) or (B) of FIG. 12. In other words, the UE may recognize the result of the UUAA-MM by the message received in the procedure of (A) or (B) of FIG. 12. In addition, the UE may recognize the result of the UUAA-MM based on completion of the present procedure.

Further, in a case that C2 communication is authorized during the UUAA-MM procedure, the UE may recognize the results of the authorization of the C2 communication, and/or pairing of the UAV and the UAV-C, and/or authorization of a flight of the UAV.

The UE may be prohibited from transmitting an MM message and/or an SM message while the UUAA-MM procedure is performed. In other words, the UE may be controlled not to transmit an MM message and/or an SM message until the first communication and/or the UE configuration update procedure and/or the de-registration procedure are completed.

3.3.7.1.2. UUAA-SM

Next, a UUAA-SM procedure will be described with reference to FIG. 13. Hereinafter, the UUAA-SM procedure is also referred to as UUAA-SM or the present procedure. The present procedure may be a procedure performed during establishment of a PDU session.

Further, messages transmitted and/or received in the present procedure may be the same behavior as that described in the section of the PDU session establishment procedure. In addition, when the UE requests establishment of a PDU session, the PDU session may request UUAA authentication of the UAV.

In addition, when UUAA is revoked, the PDU session associated with all UAVs may be released. In other words, when authentication and authorization of UAVs are revoked, PDU sessions associated with all UAVs may be released.

In addition, UUAA-SM may be performed by the SMF during a PDU session establishment procedure. In addition, UUAA-SM may be performed based on SM subscription data obtained from UDM and based on the service-level device ID provided by the UE in a PDU session establishment request message.

Next, each step of UUAA-SM will be described.

First, the UE performs the PDU Session establishment procedure. Specifically, the UE transmits a PDU session establishment request message to the SMF (S2600).

Then, second communication is performed between the UE, the SMF and the USS (S2602). In the second communication, messages for authentication and authorization used by the USS may be transmitted and/or received between the UE, the SMF, and the USS.

Here, the UE and/or the SMF may recognize whether the UUAA-SM is successful through a message in the second communication. In other words, the UE and/or the SMF may recognize whether authentication and authorization of the UAV have been allowed through a message in the second communication.

Next, the SMF can perform sixth condition judgment. The sixth condition judgment is for a network (or the SMF) to determine whether UUAA-SM has succeeded. In a case that the sixth condition judgment is true, the SMF transmits a PDU session establishment accept message of (A) of FIG. 13 (S2604), whereas in a case that the sixth condition judgment is false, the SMF transmits a PDU session establishment reject message of (B) of FIG. 13 (S2606).

Further, the sixth condition judgment may be performed based on reception of the message used in the second communication, and/or subscriber information, and/or network capability information, and/or operator policy, and/or network state, and/or user registration information, and/or context stored in the AMF, and/or the like.

For example, in a case that the UUAA-SM has succeeded, the sixth condition judgment may be true, and in a case that the UUAA-SM has failed, the sixth condition judgment may be false. Furthermore, in a case that the transmitted and/or received identification information is allowed, the sixth condition judgment may be true, whereas in a case that the transmitted and/or received identification information is not allowed, the sixth condition judgment may be false. Further, conditions under which whether the sixth condition judgment is true or false may not be limited to the above-described conditions.

In addition, the SMF may indicate the result of the UUAA-SM to the UE through a message transmitted according to whether the sixth condition judgment is true or false.

In addition, each apparatus may complete the present procedure based on the second communication performed, transmission and/or reception of a PDU session establishment accept message, and/or a PDU session establishment reject message.

Figure 13:
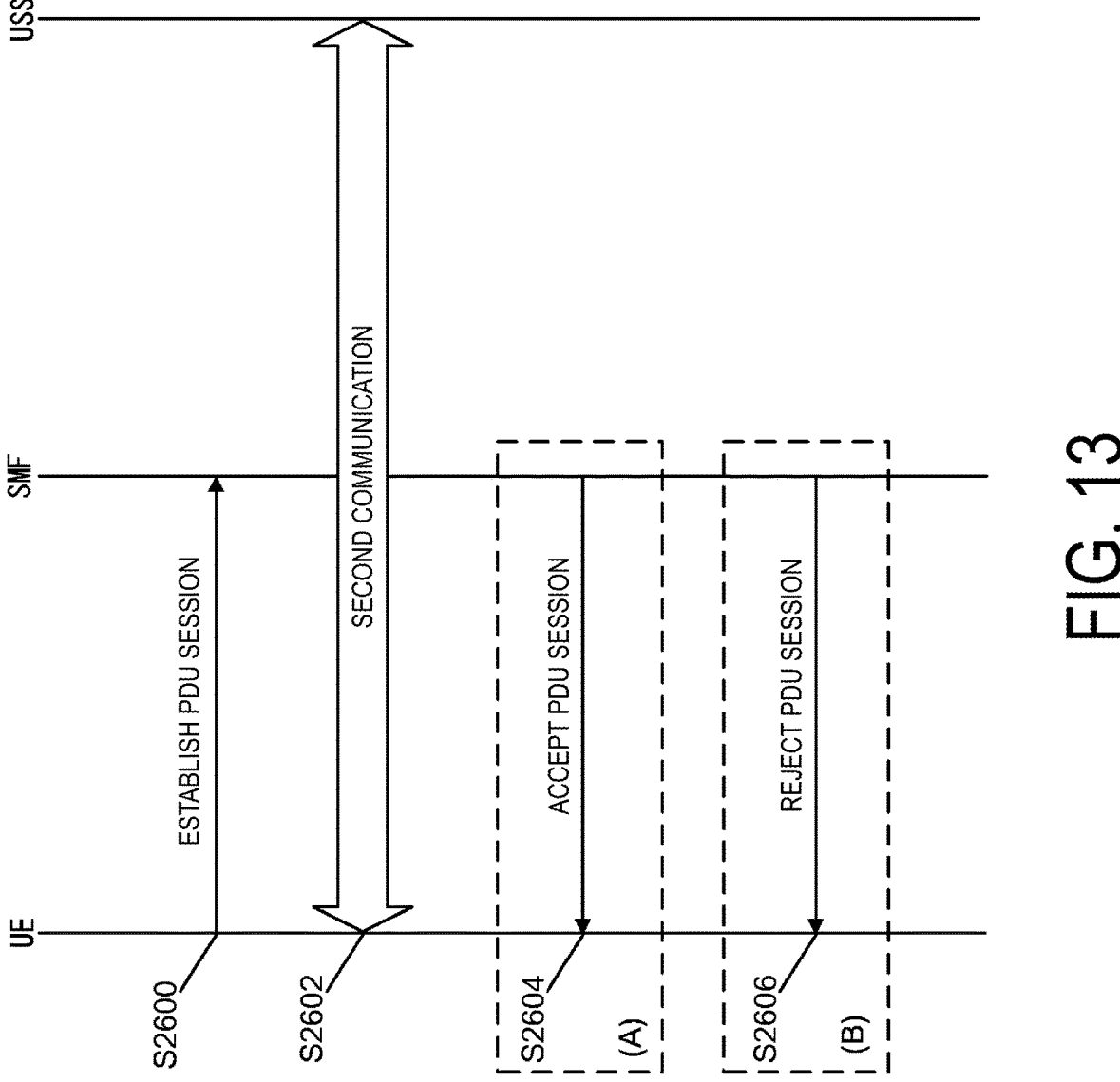
FIG. 13 is a diagram for describing a UUAA-SM procedure.

In addition, the UE may recognize the result of the UUAA-SM by receiving the message of (A) or (B) of FIG. 13. In addition, the UE may recognize the result of the UUAA-SM based on completion of the present procedure.

Further, in a case that C2 communication is authorized during the UUAA-SM procedure, the UE may recognize the result of the authorization of the C2 communication, and/or pairing of the UAV and the UAV-C, and/or authorization of a flight of the UAV.

The UE may be prohibited from transmitting an MM message and/or an SM message while the UUAA-SM procedure is performed. In other words, the UE may be controlled not to transmit an MM message and/or an SM message until the second communication and/or the PDU session establishment procedure are completed.

3.3.7.1.3. UUAA Revocation Procedure

Next, the UUAA revocation procedure will be described with reference to FIG. 14. Hereinafter, the UUAA revocation procedure is also referred to as a UUAA revocation procedure, a UAV authorization revocation procedure, or the present procedure. The present procedure may be a procedure performed during the registration procedure, and/or establishment of a PDU session.

In addition, the present procedure may be a procedure initiated by the core network or the USS. In addition, the present procedure may be a procedure for the network or the USS to revoke authentication and authorization of the UAV for the UE.

Next, each step of the present procedure will be described.

First, fourth communication is performed between the core network and the USS (S2800). In the fourth communication, a message for requesting revocation of the UAV may be transmitted and/or received between the core network and the USS.

Figure 14:
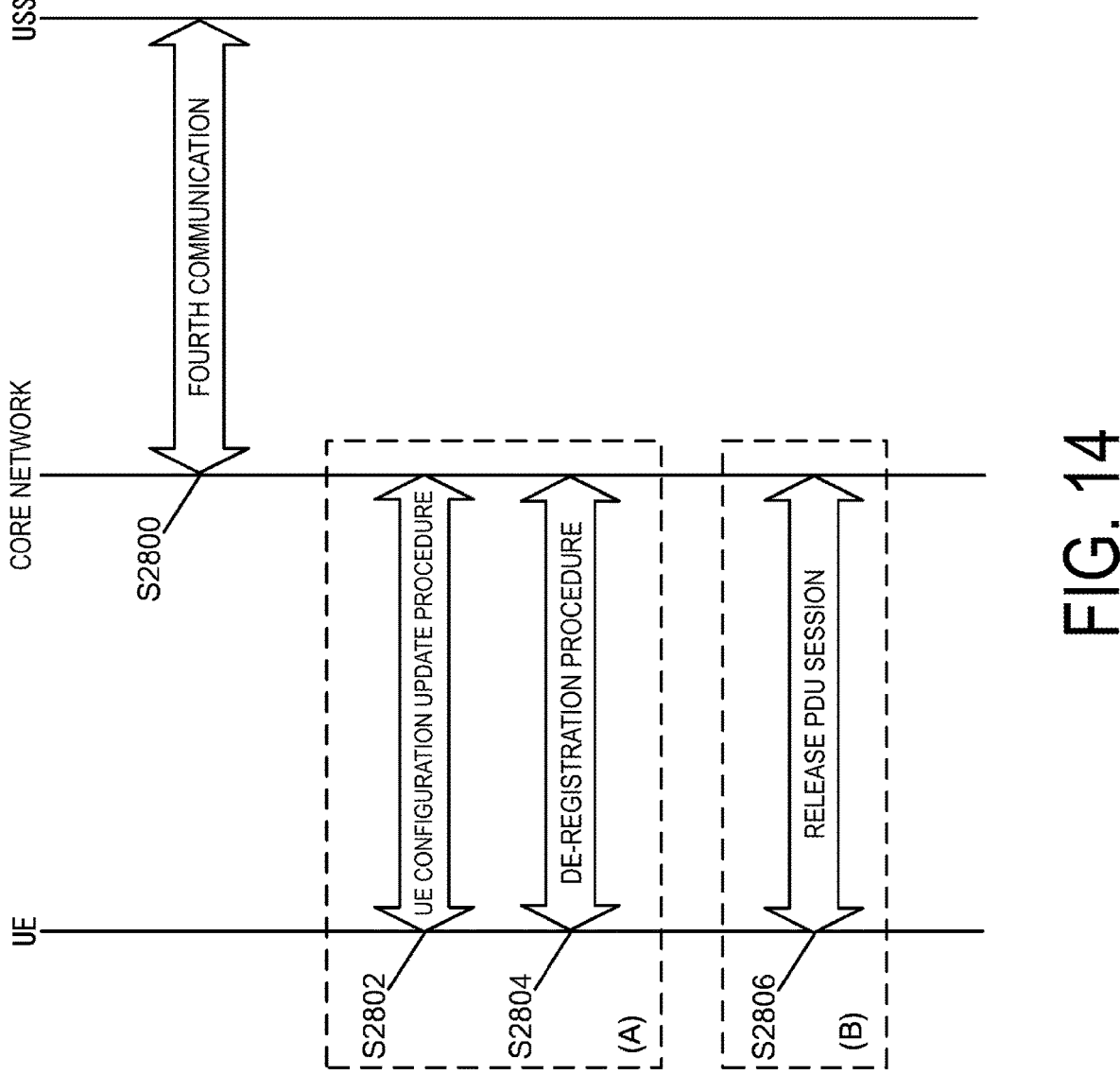
FIG. 14 is a diagram for describing a UUAA revocation procedure.

Next, the core network may initiate the procedure of (A) of FIG. 14 (S2802) (S2804) or may initiate the procedure of (B) of FIG. 14 (S2806).

Further, the core network may determine whether to perform the procedure of (A) of FIG. 14 or the procedure of (B) of FIG. 14 based reception of the message used in the first communication, and/or subscriber information, and/or network capability information, and/or operator policy, and/or network state, and/or user registration information, and/or context stored in the AMF, and/or the like.

For example, in a case that UUAA-MM has been performed, the procedure of (A) of FIG. 14 may be performed. In addition, in a case that UUAA-SM has been performed, the procedure of (B) of FIG. 14 may be performed. Further, determining which procedure of (A) or (B) of FIG. 14 is to be performed may not be limited to the above-described conditions.

In addition, the core network may indicate revocation of authentication and authorization of the UAV to the UE by performing the procedure of (A) or (B) of FIG. 14.

In addition, each apparatus may complete the present procedure based on the fourth communication and completion of the procedure of (A) or (B) of FIG. 14.

In addition, the UE may recognize the revocation of authentication and authorization of the UAV based on the completion of the present procedure.

3.3.8. DAA and Related Procedure

Next, a DAA and related procedure will be described with reference to FIG. 15. In this section below, the DAA and related procedure will also be referred to as the present procedures.

Here, the DAA and related procedure may be a registration procedure performed by the UE (UAV) or the UE (AAM) and the NW and the USS and/or a first communication and PDU session establishment procedure and/or a procedure performed by combining at least one second communication (S3000) (S3002), first broadcast (S3004), second broadcast (S3006), and DAA communication (S3010).

Here, each procedure executed during the present procedure may be the procedure described in Section 3.3, and each terminal and apparatus may transmit and/or receive the identification information described in each section. Here, for example, the registration procedure (S3000) (S3002) may be the procedure described in Section 3.3.1. Alternatively, for example, first communication (S3000) (S3002) may be the procedure described in Section 3.3.7.1, and more specifically, may be the procedure of Section 3.3.7.1.1. In addition, for example, second communication (S3000) (S3002) may be the procedure described in Section 3.3.7.1, and more specifically, may be the procedure of Section 3.3.7.1.2. In addition, for example, the PDU session establishment procedure (S3000) (S3002) may be the procedure described in Section 3.3.2. In addition, for example, direct link establishment procedure (S3008) may be the procedure described in Section 3.3.5.

Furthermore, for example, in the procedure (S3002) performed between the UE (AAM) and the network or the USS, the first communication and/or the second communication may or may not be performed.

Hereinafter, the first broadcast (S3004), the second broadcast (S3006), the direct link establishment procedure (S3008), and the DAA communication (S3010) will be described in detail later. Further, regarding the direct link establishment procedure, details of behaviors based on the identification information transmitted and/or received in the first broadcast and/or the second broadcast will be described.

3.3.8.1. First Broadcast

Next, the first broadcast will be described. Hereinafter, the first broadcast is also referred to as the present procedure. The present procedure may be a procedure performed based on the MBS procedure described in NPL 9.

The present procedure may be a procedure that is started when the USS/UTM requests NEF and/or Multicast/Broadcast Service Function (MBSF) within a 5G network for establishment of a broadcast session in a state in which no session for the first broadcast is established.

In addition, the present procedure may be a procedure that is started when the USS/UTM receives a report of the remote ID from the UAV in a state where no session for broadcast is established. In addition, the RID broadcasted in the first broadcast may be an NRID.

Figure 15:
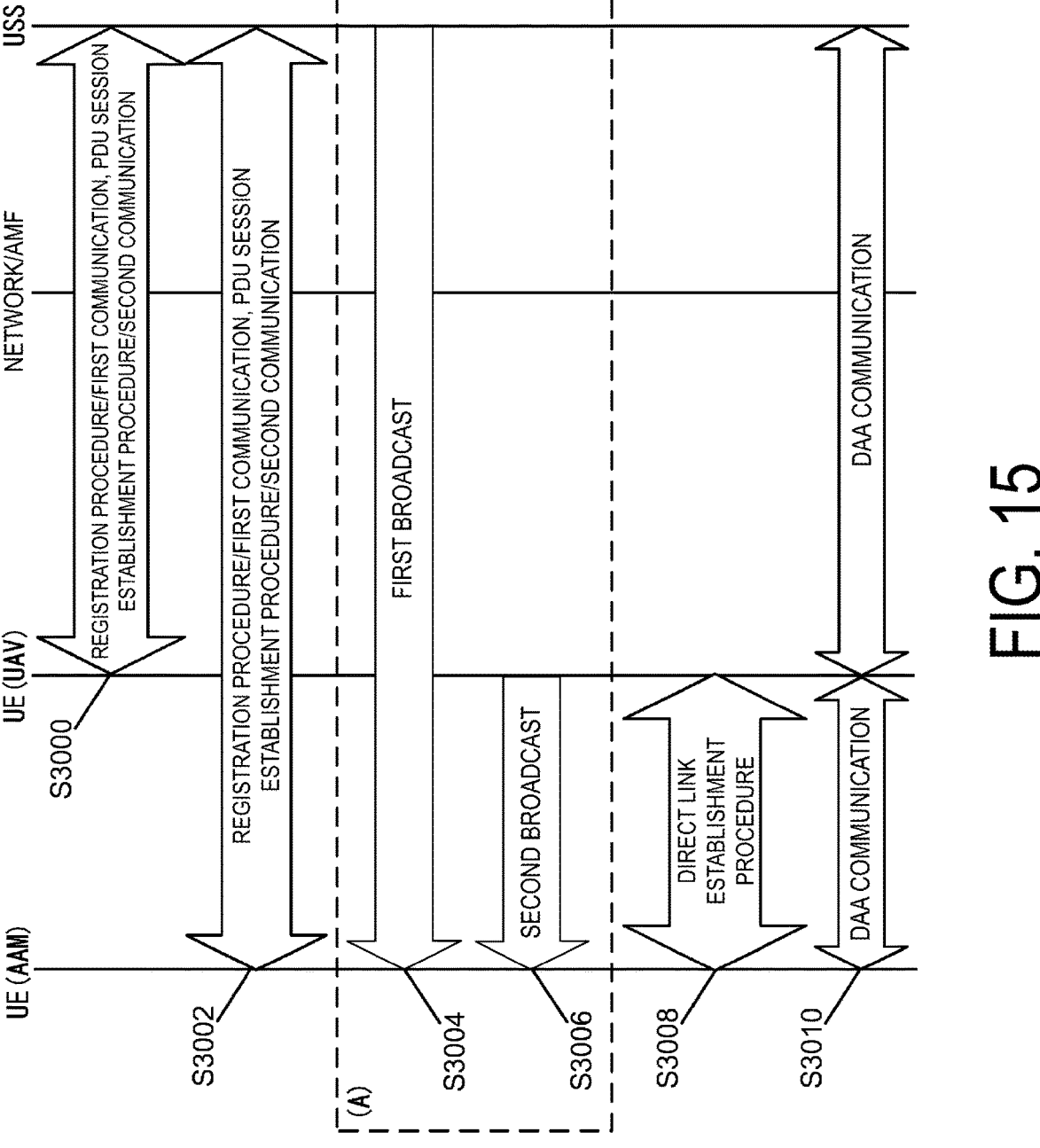
FIG. 15 is a diagram for describing a procedure for DAA.

Further, broadcast of a message via the broadcast link established in the present procedure may be as shown in the S3004 of FIG. 15.

In addition, the USS/UTM may broadcast a message including the remote ID of the UAV, and/or the 21st identification information, and/or the 22nd identification information, and/or information such as whether the PC5 direct communication function is supported, by using the session for the first broadcast established in the present procedure. In addition, the AAM may also receive the messages broadcasted from the USS/UTM.

Furthermore, the AAM having received the message in the first broadcast may determine whether to execute the direct link establishment procedure based on the remote ID of the UAV, and/or the 21st identification information, and/or the 22nd identification information, and/or whether the PC5 direct communication function is supported.

More specifically, for example, when the 21st identification information is received, the AAM may determine whether to perform the direct link establishment procedure. In addition, when the 22nd identification information is received, the AAM may determine whether to perform the direct link establishment procedure. In addition, when the 22nd identification information is received, the AAM may store the 22nd identification information. In addition, when the 22nd identification information is received, the AAM may update the 22nd identification information stored in the AAM. In addition, when it is determined not to perform the direct link establishment procedure, the AAM may delete the 22nd identification information stored in the AAM. In addition, when it is determined not to perform the direct link establishment procedure, the AAM may delete the information related to the UAV stored in the AAM.

The direct link establishment procedure will be described.

3.3.8.2. Second Broadcast

Next, the second broadcast will be described. Hereinafter, the second broadcast is also referred to as the present procedure.

Further, the present procedure may be a procedure performed by UE (UE, UAV, UAV-C, or AAM) allowed by a network based on the policy allowed to the network, without performing the procedure for establishing a communication path for broadcast.

In addition, the present procedure may be performed between UAVs or between a UAV and an AAM based on broadcast supported by E-UTRA-PC5 or NR-PC5. Furthermore, the broadcast according to the present procedure may be as shown in the S3006 of FIG. 15. In addition, the RID transmitted in the present procedure may be a BRID.

In addition, the UAV may also broadcast, in the second broadcast, a message, a packet, or data including information such as the remote ID of the UAV and/or the 21st identification information and/or the 22nd identification information. Further, the information broadcasted in this procedure may or may not include information related to DAA. In addition, the AAM may receive a message broadcasted from the UAV.

Furthermore, the AAM having received the information in the second broadcast may determine whether to perform the direct link establishment procedure based on the remote ID of the UAV, and/or the 21st identification information, and/or the 22nd identification information, and/or the like.

More specifically, for example, when the 21st identification information is received, the AAM may determine whether to perform the direct link establishment procedure. In addition, when the 22nd identification information is received, the AAM may determine whether to perform the direct link establishment procedure. In addition, when the 22nd identification information is received, the AAM may store the 22nd identification information. In addition, when the 22nd identification information is received, the AAM may update the 22nd identification information stored in the AAM. In addition, when it is determined not to perform the direct link establishment procedure, the AAM may delete the 22nd identification information stored in the AAM. In addition, when it is determined not to perform the direct link establishment procedure, the AAM may delete the information related to the UAV stored in the AAM.

In addition, the direct link establishment procedure will be described below.

3.3.8.3. Direct Link Establishment Procedure

Next, the direct link establishment procedure will be described. Hereinafter, the direct link establishment procedure will also be referred to as the present procedure. The direct link establishment procedure may be the procedure of S3008 of FIG. 15. Further, the present procedure may be a procedure for establishing a communication path for direct communication between UAVs and/or between a UAV and an AAM for DAA communication.

Further, the present procedure may be a procedure initiated by the AAM to establish a direct communication path with the UAV, or may be a procedure determined and started or performed by the AAM based on information included in the first broadcast and/or the second broadcast.

The present procedure may be a procedure started when the AAM receives the 21st identification information and/or the 22nd identification information and/or the PC5 direct communication function in the first broadcast during the procedure of (A) of FIG. 15, and the AAM recognizes that the UAV supports the DAA function and the PC5 direct communication function.

Alternatively, the present procedure may be a procedure started when the AAM receives the 21st identification information and/or the 22nd identification information via the PC5 direct communication path in the first broadcast during the procedure of (A) of FIG. 15 and the AAM recognizes that the UAV supports the DAA function.

Further, the AAM may determine an initiation of the present procedure based on the 21st identification information and/or the 22nd identification information and/or the information about support for the PC5 direct communication function received in either the first broadcast or the second broadcast, or may determine an initiation of the present procedure based on the 21st identification information and/or the 22nd identification information and/or the information about support for the PC5 direct communication function received in both the first broadcast and the second broadcast.

The present procedure may be performed based on the direct link establishment procedure described in Section 3.3.5. In addition, the direct link establishment procedure of this section may be a direct link establishment procedure for C2 communication, a direct link establishment procedure for communication other than C2 communication, or a direct link establishment procedure for DAA communication.

Further, although the establishment of a direct communication path for C2 communication has been described in Section 3.3.5, a direct communication path of the present procedure is not limited to the communication path for C2 communication. Detailed description is omitted in this section.

3.3.8.4. DAA Communication

Next, DAA communication will be described. Hereinafter, the DAA communication is also referred to as main communication.

The AAM and the UE that have completed the direct link establishment procedure (S3008) illustrated in FIG. 15 may perform communication for DAA through the direct communication path via PC5 established in the direct link establishment procedure.

Here, in DAA communication, the UAV may transmit a message, a packet, data, or the like related to DAA communication to the AAM via the direct communication path. Furthermore, the UAV may transmit capability information of the UAV itself to the AAM via the direct communication path, and for example, the UE may transmit DAA capability and/or U2X capability including the DAA capability and/or U2X capability not including the DAA capability. Furthermore, the UAV may transmit information of the associated UAV-C, and for example, may transmit pairing information including UAV-C ID or address information of the UAV-C stored by the UAV.

In addition, in a case that the main communication is no longer necessary, the UAV or the AAM may perform a procedure for opening the established communication path for direct communication. Here, the procedure for opening the communication path for direct communication may be started or performed based on the procedure of Section 3.3.6. Furthermore, the procedure for opening the communication path for direct communication may be a procedure initiated by either the UAV or the AAM. In other words, the procedure for opening the communication path for direct communication may be initiated by the UAV or initiated by the AAM to be started or performed.

4. EMBODIMENT

Now, an embodiment of the present disclosure will be described below.

Further, initiating UE may be an AAM and target UE may be a UAV in the present embodiment.

In addition, in each embodiment, the behavior performed by each terminal and apparatus in a case that the AAM has received a message including the remote ID of the UAV and/or the 21st identification information and/or the information related to support for the PC5 direct communication function in the first broadcast and/or the second broadcast will be described. In addition, the message transmitted in the second broadcast may not include the information indicating whether the PC5 direct communication function is supported.

4.1. First Embodiment

Now, a first embodiment of the present disclosure will be described with reference to FIG. 15. The first embodiment is hereinafter referred to as the present embodiment in this section. Further, contents of the various procedures used in the present embodiment are based on the procedures described in Section 3.3. In this section, only features of the present embodiment will be described. Further, although UAV-C is not shown in FIG. 15, UAV-C may also perform the registration procedure, the PDU session establishment procedure, the UUAA procedure, and the like before the procedure of (A) in the present embodiment, similarly to other UE (UAV and/or AAM) as described in Section 3.3.

In the present embodiment, the 22nd identification information may not be included in the message of the first broadcast and/or the second broadcast. In addition, the message of the second broadcast may as well not include the information indicating whether the PC5 direct communication function is supported. In other words, the message of the first broadcast and/or the second broadcast in the present embodiment may include the remote ID of the UAV and the 21st identification information.

In the present embodiment, the 21st identification information included in the message received by the AAM is capability information indicating that the UAV does not support DAA. In other words, the AAM may receive the message of the first broadcast and/or the second broadcast including the 21st identification information indicating that the UAV does not support DAA. The AAM that has received the 21st identification information indicating that the UAV does not support DAA may recognize that the UAV does not support DAA and determine not to perform the subsequent procedure.

That is, when the AAM or UE operating as the AAM according to the present embodiment receives the message, packet, or data including the 21st identification information indicating that the UAV does not support DAA in the first broadcast (S3004) and/or the second broadcast (S3006), the AAM may not perform the direct link establishment procedure (S3008) for the UAV.

In other words, the AAM having received the message including the 21st identification information which is the capability information indicating that the UAV does not support DAA from the network and/or the UAV may recognize that the UAV does not support DAA based on the reception of the 21st identification information or the content of the received 21st identification information, and may not initiate or perform the direct link establishment procedure with the UAV.

4.2. Second Embodiment

A second embodiment of the present disclosure will be described. The second embodiment is also referred to as the present embodiment in this section. Further, contents of the various procedures used in the present embodiment are based on the procedures described in Section 3.3. In this section, only features of the present embodiment will be described.

In the present embodiment, the message received by the AAM may include the 21st identification information and/or the 22nd identification information indicating that the UAV supports DAA. In other words, the AAM may receive the message of the first broadcast and/or the second broadcast including the 21st identification information and/or the 22nd identification information indicating that the UAV supports DAA. When the message of the first broadcast and/or the second broadcast includes the 21st identification information and/or the 22nd identification information indicating that the UAV supports DAA, the AAM may determine to initiate the direct link establishment procedure as a subsequent procedure.

That is, when the AAM or UE operating as the AAM according to the present embodiment receives the message, packet, or data including the 21st identification information indicating that the UAV supports DAA in the first broadcast (S3004) and/or the second broadcast (S3006), the AAM may perform the direct link establishment procedure (S3008) for the UAV.

In other words, the AAM having received the message including the 21st identification information which is the capability information indicating that the UAV supports DAA from the network and/or the UAV may recognize that the UAV supports DAA based on the reception of the 21st identification information or the content of the received 21st identification information, and may initiate or perform the direct link establishment procedure with the UAV.

4.3. Third Embodiment

A third embodiment of the present disclosure will be described. The third embodiment is referred to as the present embodiment in this section. Further, contents of the various procedures used in the present embodiment are based on the procedures described in Section 3.3. In this section, only features of the present embodiment will be described.

In the present embodiment, a message received by the AAM may include the 21st identification information indicating that the UAV supports DAA. In other words, the AAM may receive the message of the first broadcast and/or the second broadcast including the 21st identification information indicating that the UAV supports DAA. When the message of the first broadcast and/or the second broadcast includes the 21st identification information and/or the 22nd identification information indicating that the UAV supports DAA, the AAM may determine to initiate the direct link establishment procedure as a subsequent procedure.

That is, when the AAM of the present embodiment receives the message, packet, or data including the 22nd identification information in the first broadcast (S3004) and/or the second broadcast (S3006), the AAM may perform the direct link establishment procedure (S3008). Here, the AAM may use destination Layer-2 ID that is identification information of the UAV on the network indicated by the 22nd identification information received from the network and/or the UAV in the direct link establishment procedure, and the like. In other words, the AAM may initiate or perform the direct link establishment procedure for the UAV by transmitting the message including the 22nd identification information. Further, here, the AAM may include the identification information of the UAV on the network indicated by the 22nd identification information as a destination in the message and transmit the message. In addition, the message including the 22nd identification information by the AAM may be a direct communication request (DCR) message.

In other words, the AAM having received the message including the 22nd identification information from the network and/or the UAV may recognize that corresponding UE supports the DAA function based on the reception of the 21st identification information or the content thereof. Furthermore, the AAM may initiate or perform the direct link establishment procedure with the UAV by transmitting the message including the 22nd identification information received by the AAM to the UAV.

4.4. Fourth Embodiment

A fourth embodiment of the present disclosure will be described. The fourth embodiment is also referred to as the present embodiment in this section. Further, contents of the various procedures used in the present embodiment are based on the procedures described in Section 3.3. In this section, only features of the present embodiment will be described.

In the present embodiment, a message received by the AAM may include the 21st identification information and/or the 22nd identification information indicating that the UAV supports DAA. In other words, the AAM may receive the message of the first broadcast and/or the second broadcast including the 21st identification information and/or the 22nd identification information indicating that the UAV supports DAA. When the message of the first broadcast and/or the second broadcast includes the 21st identification information and/or the 22nd identification information indicating that the UAV supports DAA, the AAM may determine to initiate the direct link establishment procedure for the UAV as a subsequent procedure.

That is, when the AAM according to the present embodiment receives the 21st identification information and/or the 22nd identification information indicating that the UAV supports DAA in the first broadcast (S3004) and/or the second broadcast (S3006), the AAM may perform the direct link establishment procedure (S3008) for the UAV. Further, upon receiving the 22nd identification information, the AAM may include the identification information of the UAV on the network indicated by the 22nd identification information as a destination in a message and transmit the message in the direct link establishment procedure for the UAV. In addition, the message including the 22nd identification information by the AAM may be a direct communication request (DCR) message.

In other words, the AAM having received the message including the 21st identification information and/or the 22nd identification information which are the capability information indicating that the UAV supports DAA from the network and/or the UAV may recognize that the UAV supports DAA based on the received 21st identification information and/or reception of the 22nd identification information or the content thereof, and may initiate or perform the direct link establishment procedure with the UAV. Furthermore, upon receiving the 22nd identification information, the AAM may initiate or perform the direct link establishment procedure with the UAV by transmitting the received message including the 22nd identification information to the UAV. Here, the 22nd identification information may be included in the message as a destination of the message.

5. MODIFIED EXAMPLES

A program running on an apparatus according to an aspect of the present disclosure may serve as a program that controls a central processing unit (CPU) and the like to cause a computer to function in such a manner as to realize the functions of the embodiment according to the aspect of the present disclosure. Programs or information handled by the programs are temporarily stored in a volatile memory such as a random access memory (RAM), a non-volatile memory such as a flash memory, a hard disk drive (HDD), or another storage device system.

Further, a program for realizing the functions of the embodiment according to an aspect of the present disclosure may be recorded in a computer-readable recording medium. The functions may be realized by causing a computer system to read the program recorded on the recording medium to perform the program. It is assumed that the "computer system" refers to a computer system built into an apparatus, and the computer system includes an operating system and hardware such as a peripheral device. Furthermore, the "computer-readable recording medium" may be any of a semiconductor recording medium, an optical recording medium, a magnetic recording medium, a medium dynamically retaining the program for a short time, or any other computer-readable recording medium.

Furthermore, each functional block or various features of the apparatuses used in the aforementioned embodiment may be implemented or performed on an electric circuit, for example, an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or may be a processor of a known type, a controller, a micro-controller, or a state machine instead. The aforementioned electric circuit may include a digital circuit or may include an analog circuit. In a case that with advances in semiconductor technology, a circuit integration technology that replaces the present integrated circuits appears, it is possible for one or multiple aspects of the present disclosure to use a new integrated circuit based on the technology.

Further, the invention of the present application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

Although, the embodiments of the present disclosure have been described in detail above referring to the drawings, the specific configuration is not limited to the embodiments and includes, for example, design changes within the scope that does not depart from the gist of the present disclosure. Furthermore, various modifications are possible within the scope of claims, and embodiments that are made by suitably combining a technical device disclosed according to the different embodiments are also included in the technical scope of the present disclosure. Furthermore, a configuration in which elements described in the respective embodiments and having mutually the same effects, are substituted for one another is also included.

REFERENCE SIGNS LIST

1 Mobile communication system
10 UE_A
30 PGW-U
32 PGW-C
35 SGW
40 MME
45 eNB
50 HSS
60 PCRF
80 Access network_A (E-UTRAN)
90 Core network_A
120 Access network_B (5G AN)
122 gNB
130 UPF
132 SMF

65

66

140 AMF
150 UDM
160 PCF
190 Core network_B
235 UPF_A
239 UPF_C

The invention claimed is:

1. A user equipment (UE) comprising:

transmission and/or reception circuitry; and a controller, wherein, while the UE is operating as an area airspace manager (AAM):

the transmission and/or reception circuitry receives a message including first identification information and second identification information from an uncrewed aerial vehicle (UAV), wherein the first identification information comprises capability information indicating that the UAV supports Detect-And-Avoid (DAA), and the second identification information comprises a Civil Aviation Administration (CAA)-level UAV identifier (ID) allocated to the UAV, and the controller initiates a procedure for establishing a communication path using the second identification information for direct communication with the UAV based on the reception of the first identification information.

* * * * *